United States Patent [19]
Rosen

[11] Patent Number: 5,455,407
[45] Date of Patent: * Oct. 3, 1995

[54] ELECTRONIC-MONETARY SYSTEM

[75] Inventor: Sholom S. Rosen, New York, N.Y.

[73] Assignee: Citibank, N.A., New York, N.Y.

[*] Notice: NOTE-DISCLAIMER The portion of the term of this patent subsequent to Sep. 26, 2012 has been disclaimed.

[21] Appl. No.: 378,955

[22] Filed: Jan. 27, 1995

Related U.S. Application Data

[62] Division of Ser. No. 794,112, Nov. 15, 1991.

[51] Int. Cl.[6] ........................................... G06K 5/00
[52] U.S. Cl. ...................... 235/380; 235/379; 364/408; 902/24
[58] Field of Search ................... 235/380, 379; 902/24; 364/406

[56] References Cited

U.S. PATENT DOCUMENTS

| | | |
|---|---|---|
| 3,559,175 | 1/1971 | Pomeroy . |
| 3,573,747 | 4/1971 | Adams et al. . |
| 3,749,887 | 7/1973 | Giuliani . |
| 3,852,571 | 12/1974 | Hall et al. . |
| 3,906,460 | 9/1975 | Halpern . |
| 3,932,730 | 1/1976 | Ambrosio . |
| 3,934,122 | 1/1976 | Riccitelli . |
| 3,937,925 | 2/1976 | Boothroyd . |
| 3,971,916 | 7/1976 | Moreno . |
| 4,001,550 | 1/1977 | Schatz . |

(List continued on next page.)

FOREIGN PATENT DOCUMENTS

| | | |
|---|---|---|
| 172670A2 | 2/1986 | European Pat. Off. . |
| 391261B1 | 3/1990 | European Pat. Off. . |
| 421808A3 | 4/1991 | European Pat. Off. . |
| 8303018 | 9/1983 | WIPO . |
| 91106691 | 10/1991 | WIPO . |
| 9308545 | 4/1993 | WIPO . |

OTHER PUBLICATIONS

David Chaum, *Achieving Electronic Privacy*, Scientific American, Aug. 1992.
Dancoin Ltd., *The Company*, Danmont A/S month missing 1991.
O'Reilly, Ireland's Pocket Revolution: The Micro That Replaces Cash, Cheques, And Cards, *Retail Banker International*, Feb. 20, 1984, at 4.
Nakamoto, Japanese Take To The Top The Prepaid Plastic Card Business, *Financial Times*, Nov. 17, 1988, at 7.
Rowe, Au Revoir Le Cash?, *Banking Technology*, Jul.-Aug. 1991, at 46.

(List continued on next page.)

Primary Examiner—John Shepperd
Assistant Examiner—Michael G. Lee
Attorney, Agent, or Firm—Thomas P. Dowling; Laurence J. Bromberg

[57] ABSTRACT

An improved monetary system using electronic media to exchange economic value securely and reliably. The invention provides a complete monetary system having electronic money that is interchangeable with conventional paper money comprising (1) issuing banks or financial institutions that are coupled to a money generator device for generating and issuing to subscribing customers electronic money including electronic currency backed by demand deposits, or electronic credit authorizations; (2) correspondent banks that accept and distribute the electronic money; (3) a plurality of transaction devices that are used by subscribers for storing electronic money, for performing money transactions with the on-line systems of the participating banks or for exchanging electronic money with other like transaction devices; (4) teller devices, associated with the issuing and correspondent banks, for process handling and interfacing the transaction devices to the issuing and correspondent banks, and for interfacing between the issuing and correspondent banks themselves; (5) a security arrangement for maintaining the integrity of the system; and (6) reconciliation and clearing processes to monitor and balance the monetary system.

9 Claims, 69 Drawing Sheets

U.S. PATENT DOCUMENTS

| | | |
|---|---|---|
| 4,007,355 | 2/1977 | Moreno . |
| 4,053,735 | 10/1977 | Fondos . |
| 4,120,452 | 10/1978 | Kimura et al. . |
| 4,172,552 | 10/1979 | Case . |
| 4,179,064 | 12/1979 | Yoshioka et al. . |
| 4,214,230 | 7/1980 | Fak et al. . |
| 4,218,582 | 8/1980 | Hellman et al. . |
| 4,224,666 | 9/1980 | Giraud . |
| 4,256,955 | 3/1981 | Giraud et al. . |
| 4,270,042 | 5/1981 | Case . |
| 4,277,837 | 7/1981 | Stuckert . |
| 4,302,810 | 11/1981 | Bouricius et al. . |
| 4,305,059 | 12/1981 | Benton . |
| 4,320,387 | 3/1982 | Powell . |
| 4,321,672 | 3/1982 | Braun et al. . |
| 4,341,951 | 7/1982 | Benton . |
| 4,404,649 | 9/1983 | Nunley et al. . |
| 4,405,829 | 9/1983 | Rivest et al. . |
| 4,442,345 | 4/1984 | Mollier et al. . |
| 4,443,027 | 4/1984 | McNeeley et al. . |
| 4,453,074 | 6/1984 | Weinstein . |
| 4,454,414 | 6/1984 | Benton . |
| 4,460,965 | 7/1984 | Trehn et al. . |
| 4,467,139 | 8/1984 | Mollier . |
| 4,498,000 | 2/1985 | Decavele et al. . |
| 4,511,970 | 4/1985 | Okano et al. . |
| 4,523,087 | 6/1985 | Benton . |
| 4,523,297 | 6/1985 | Ugon et al. . |
| 4,529,870 | 7/1985 | Chaum . |
| 4,536,647 | 8/1985 | Atalla et al. . |
| 4,549,075 | 10/1985 | Saada et al. . |
| 4,614,861 | 9/1986 | Pavlov et al. . |
| 4,625,276 | 11/1986 | Benton et al. . |
| 4,629,872 | 12/1986 | Hallberg . |
| 4,630,201 | 12/1986 | White . |
| 4,634,845 | 1/1987 | Hale et al. . |
| 4,642,768 | 2/1987 | Roberts . |
| 4,650,978 | 3/1987 | Hudson et al. . |
| 4,667,088 | 5/1987 | Kramer et al. . |
| 4,673,802 | 6/1987 | Ohmae et al. . |
| 4,689,478 | 8/1987 | Hale et al. . |
| 4,692,601 | 9/1987 | Nakano . |
| 4,697,073 | 9/1987 | Hara . |
| 4,705,211 | 11/1987 | Honda et al. . |
| 4,722,055 | 1/1988 | Roberts . |
| 4,727,243 | 2/1988 | Savar . |
| 4,727,244 | 2/1988 | Nakano et al. . |
| 4,734,568 | 3/1988 | Watanabe . |
| 4,736,094 | 4/1988 | Yoshida . |
| 4,742,215 | 5/1988 | Daughters et al. . |
| 4,748,668 | 5/1988 | Shamir et al. . |
| 4,750,119 | 6/1988 | Cohen et al. . |
| 4,751,640 | 6/1988 | Lucas et al. . |
| 4,752,676 | 6/1988 | Leonard et al. . |
| 4,752,877 | 6/1988 | Roberts et al. . |
| 4,757,185 | 7/1988 | Onishi . |
| 4,759,064 | 7/1988 | Chaum . |
| 4,766,539 | 8/1988 | Fox . |
| 4,767,920 | 8/1988 | Kitta et al. . |
| 4,799,156 | 1/1989 | Shavit et al. . |
| 4,823,264 | 4/1989 | Deming . |
| 4,825,052 | 4/1989 | Chemin et al. . |
| 4,827,112 | 5/1989 | Yoshino et al. . |
| 4,837,422 | 6/1989 | Dethloff et al. . |
| 4,839,504 | 6/1989 | Nakano . |
| 4,877,947 | 10/1989 | Mori . |
| 4,879,747 | 11/1989 | Leighton et al. . |
| 4,906,828 | 3/1990 | Halpern . |
| 4,914,698 | 4/1990 | Chaum . |
| 4,926,480 | 5/1990 | Chaum . |
| 4,949,380 | 8/1990 | Chaum . |
| 4,962,530 | 10/1990 | Cairns . |
| 4,964,164 | 10/1990 | Fiat . |
| 4,968,873 | 11/1990 | Dethloff et al. . |
| 4,973,828 | 11/1990 | Naruse et al. . |
| 4,977,595 | 12/1990 | Ohta et al. . |
| 4,985,833 | 1/1991 | Oncken . |
| 4,987,593 | 1/1991 | Chaum . |
| 4,991,210 | 2/1991 | Chaum . |
| 4,992,646 | 2/1991 | Collin . |
| 4,995,081 | 2/1991 | Leighton et al. . |
| 4,996,711 | 2/1991 | Chaum . |
| 5,191,193 | 3/1993 | LeRoux . |

OTHER PUBLICATIONS

Okamoto and Ohta, Universal Electronic Cash, *Cryptography Symposium* month missing (1991).

Article 4A, Uniform Commerical Code, Callaghan & Company, dated Apr. 1990.

"Security Without Identification: Transaction Systems To Make Big Brother Obsolete" Chaum, D., *Communication of the ACM,* 28:10, Oct. 1985.

"Disposable Zero–Knowledge Authentications and Their Applications To Untraceable Electronis Cash", Okamoto, T. et al., 481–496, undated month & year missing.

1984 International Zurich Seminar On Digital Communications, *Electronic Wallet,* S. Even, O. Goldreich, Y. Yacobi, month missing 1984.

Privacy Protected Payments Unconditional Payer and/or Payee Untraceability, D. Chaum, *Smart Card 2000, month missing 1989.*

Security Without Identification: Card Computers To Make Big Brother Obsolete, D. Chaum, month missing 1987.

Untraceable Electronic Cash, D. Chaum, et al. month and year missing.

Thomas M. Atwood, *The case for object–oriented databases,* IEEE Spectrum, Feb. 1991.

David Chaum, *Online Cash Checks,* Centre for Mathematics and Computer Science, Amsterdam month and year missing.

NETWORK 25 (NOT SHOWN)

ELECTRONIC MONETARY SYSTEM

TRANSACTION MONEY MODULE

FIG. 8

| EXTERNAL INTERFACE | | | 56 |
|---|---|---|---|
| COMMUNICATION SESSION MANAGER | | | 57 |
| APPLICATION SERVICES | | | |
| 58 MANAGE NETWORK SIGN-ON | 59 SYNCHRONIZE TIME/ DATE | ROUTE 60 MESSAGE | DIRECT TO 61 BANK SERVICE |

| NETWORK SERVER |
|---|

SECURITY SYSTEM

FIG. 10

| EXTERNAL INTERFACE | | | 54 |
|---|---|---|---|
| SESSION MANAGER | | | 55 |
| 50 CREATE CERTIFICATE | 51 CREATE ACCOUNT PROFILE | 52 DISTRIBUTE CERTIFICATION KEYS | 53 CONTROL BAD MONEY MODULE LIST |
| SERVICES | | | |
| 43 CLOCK/ TIMER | CRYPTOGRAPHY | | |
| | 44 PUBLIC KEY ALGORITHMS | 45 SYMMETRIC KEY ALGORITHMS | 46 RANDOM NUMBER GENERATOR |

SECURITY SERVER

FIG. 18

| TYPE OF TRANSACTION | STEP | CLEARING BANK | ISSUING BANK | ACCOUNTING TRANSACTION |
|---|---|---|---|---|
| TRANSFER NOTES FROM CLEARING BANK TO ISSUING BANK | (1) | $100 → TRANSFER NOTES → $50 (DEPOSITED AT ISSUING BANK) | | D $100 A |
| | | $100 CR (ON ACCOUNT A) | 0 | D $150 MI |
| | | | $150 | C $50 MD |
| | | 0 | $100 CR | C $200 DC |

KEY: ( ) - ALTERNATE VALUES AND STEPS

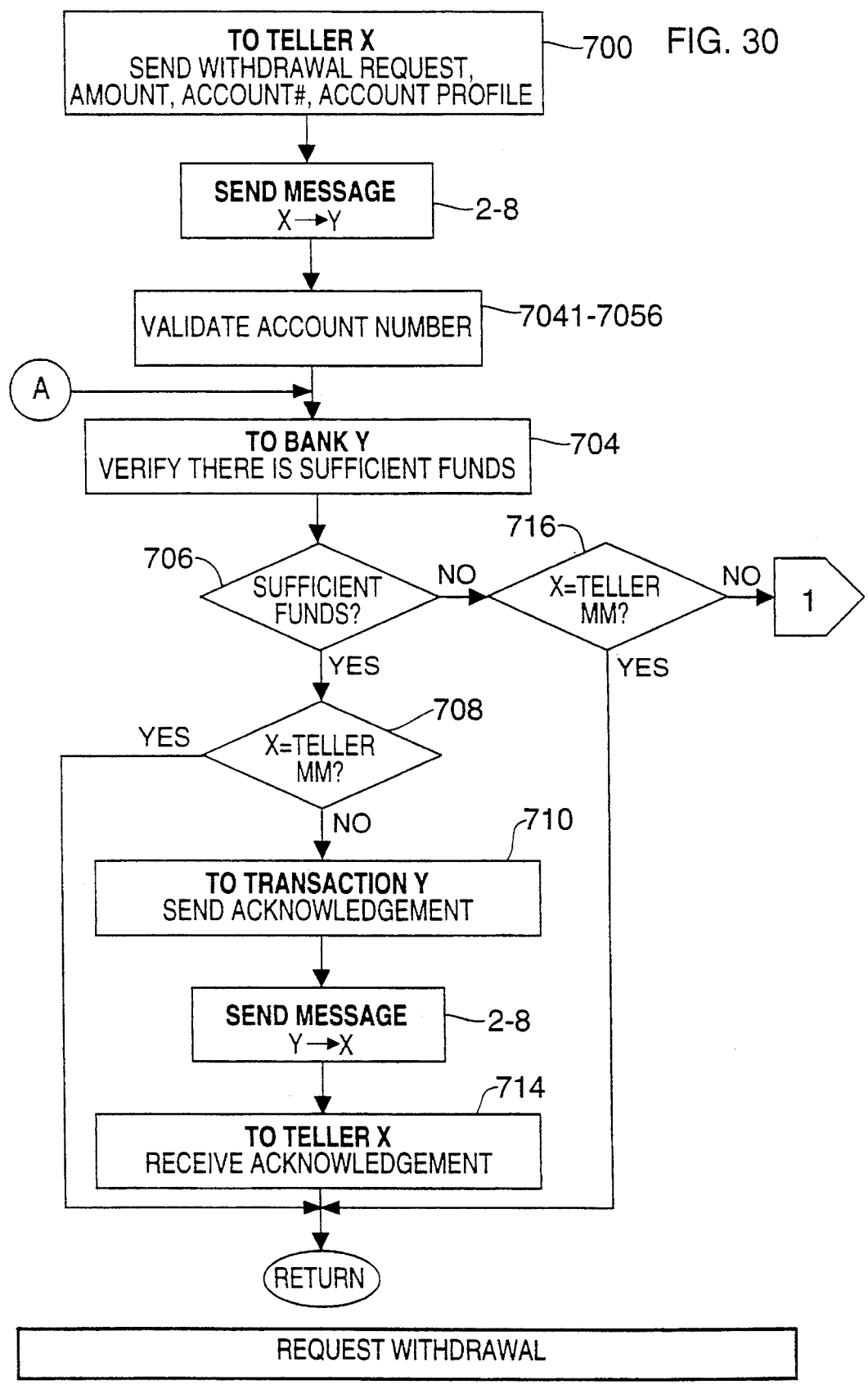

REQUEST WITHDRAWAL (CONTINUED)

SUBSCRIBER MONEY MODULE SIGN ON

SUBSCRIBER MONEY MODULE SIGN ON (CONTINUED)

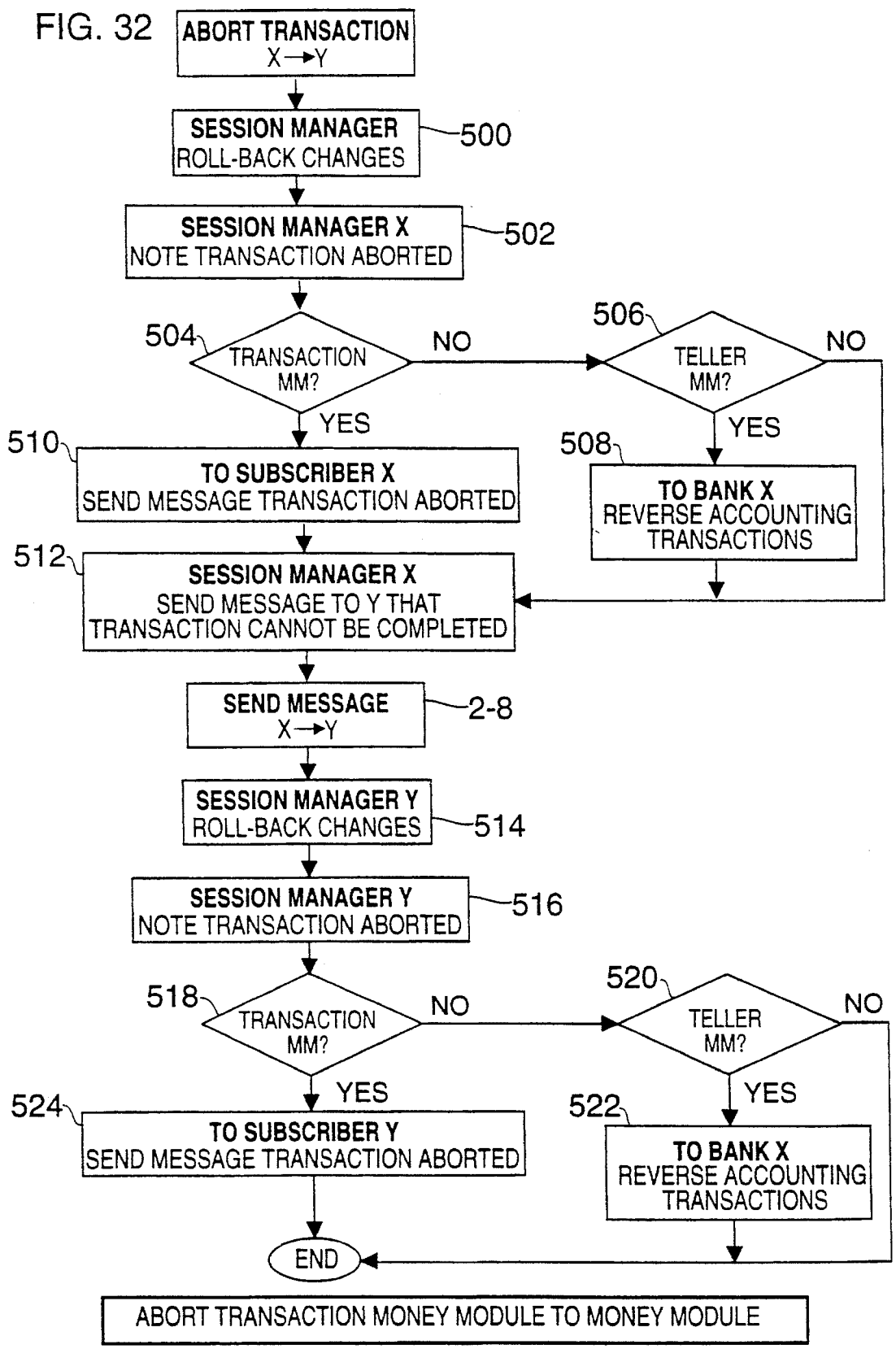

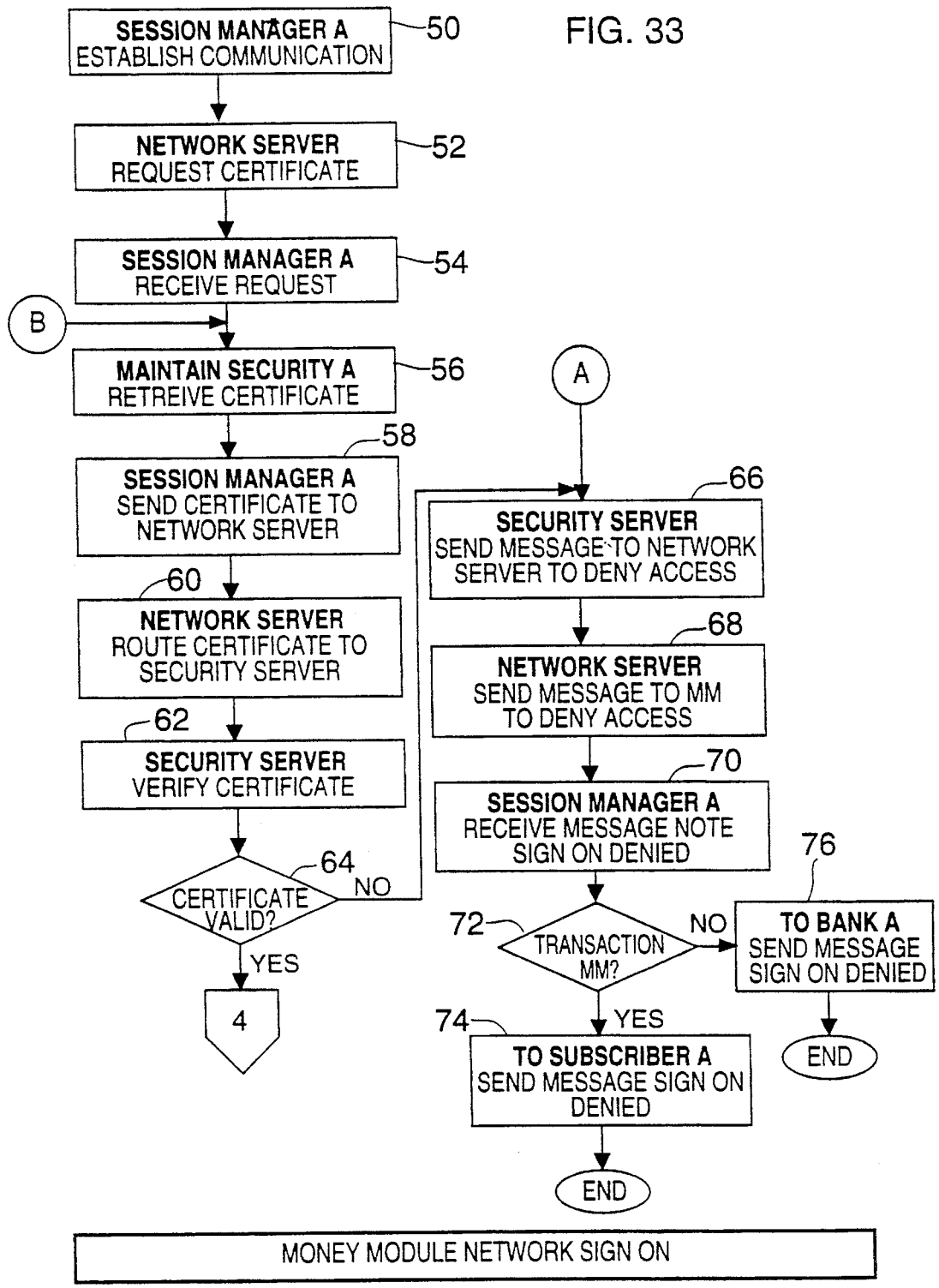

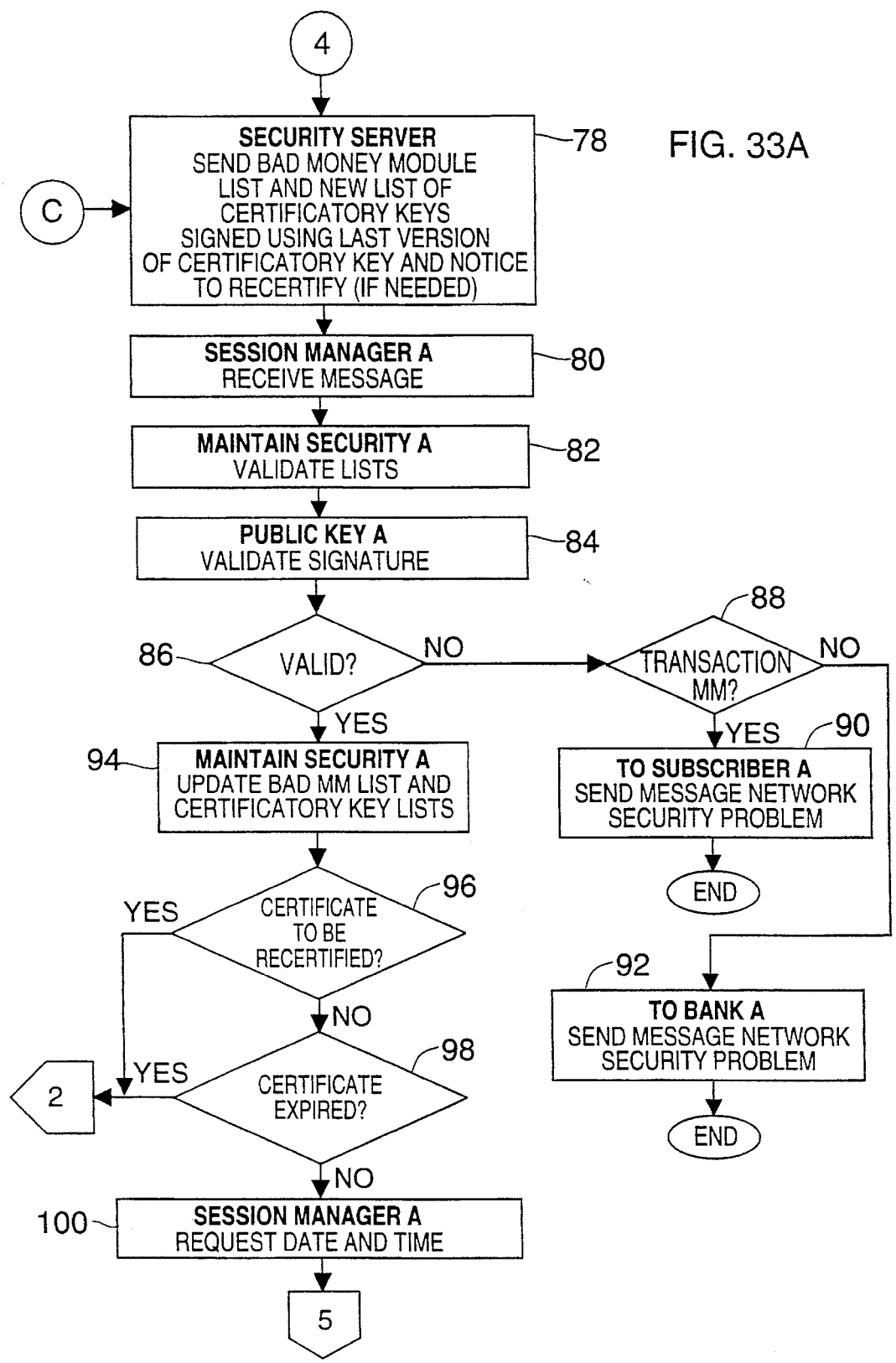

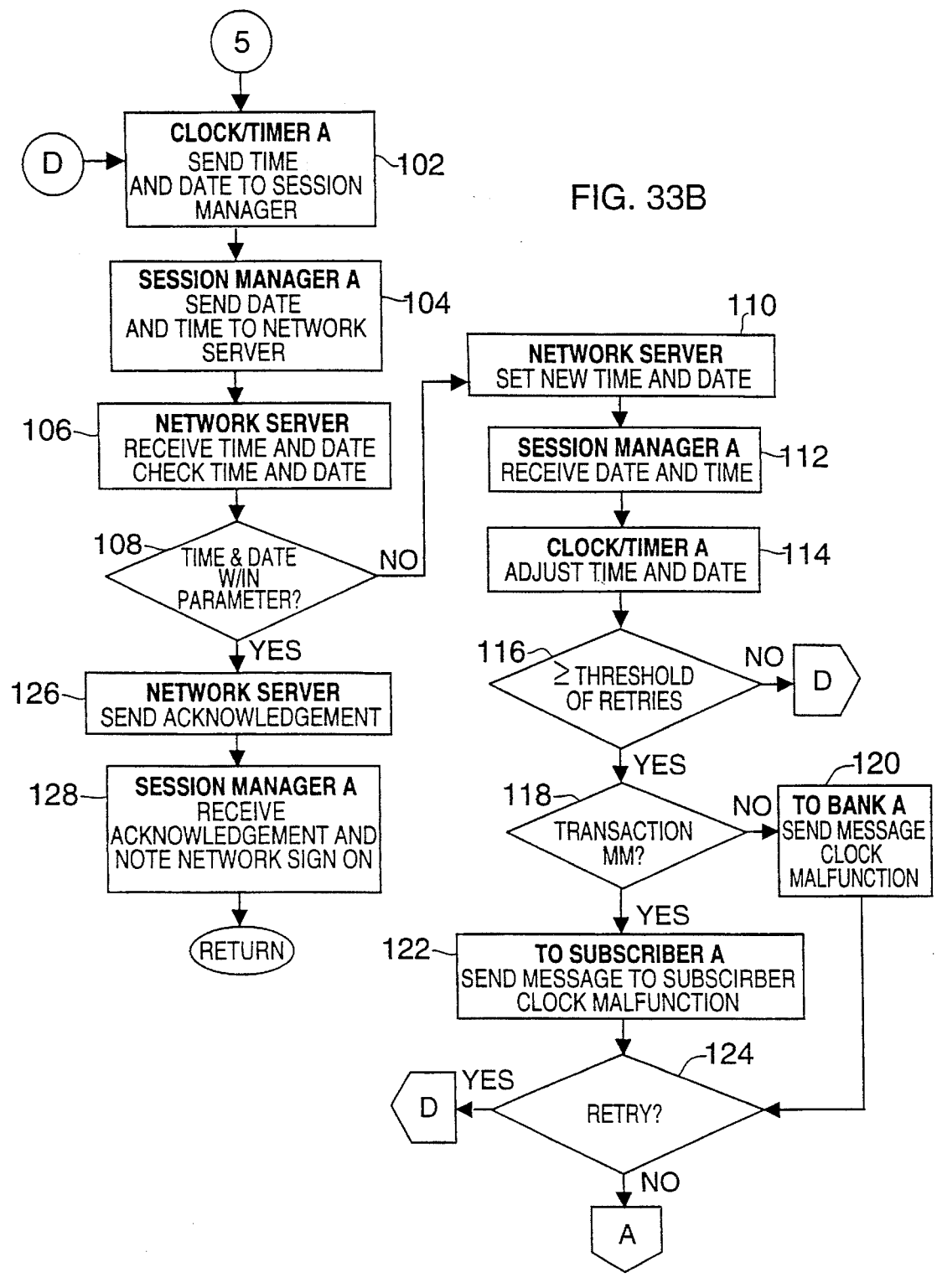

MONEY MODULE NETWORK SIGN ON (CONTINUED)

ESTABLISH SESSION-MONEY MODULE TO MONEY MODULE (CONTINUED)

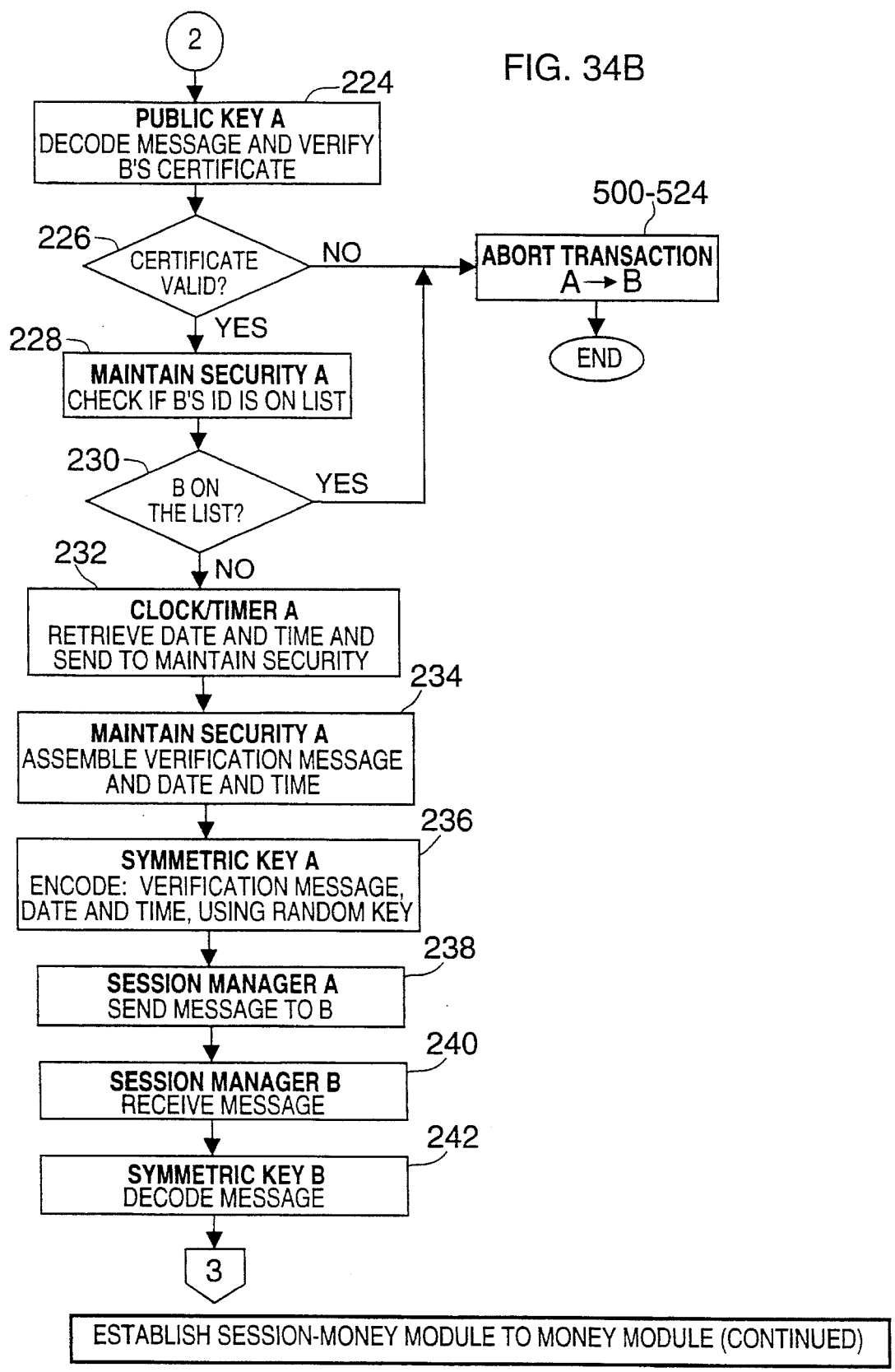

ESTABLISH SESSION-MONEY MODULE TO MONEY MODULE (CONTINUED)

WITHDRAWAL FROM CORRESPONDENT BANK (CONTINUED)

SEND ENCODED MESSAGE - MONEY MODULE TO MONEY MODULE

DEPOSIT TO ISSUING BANK

DEPOSIT TO CORRESPONDENT BANK (CONTINUED)

DEPOSIT TO CORRESPONDENT BANK (CONTINUED)

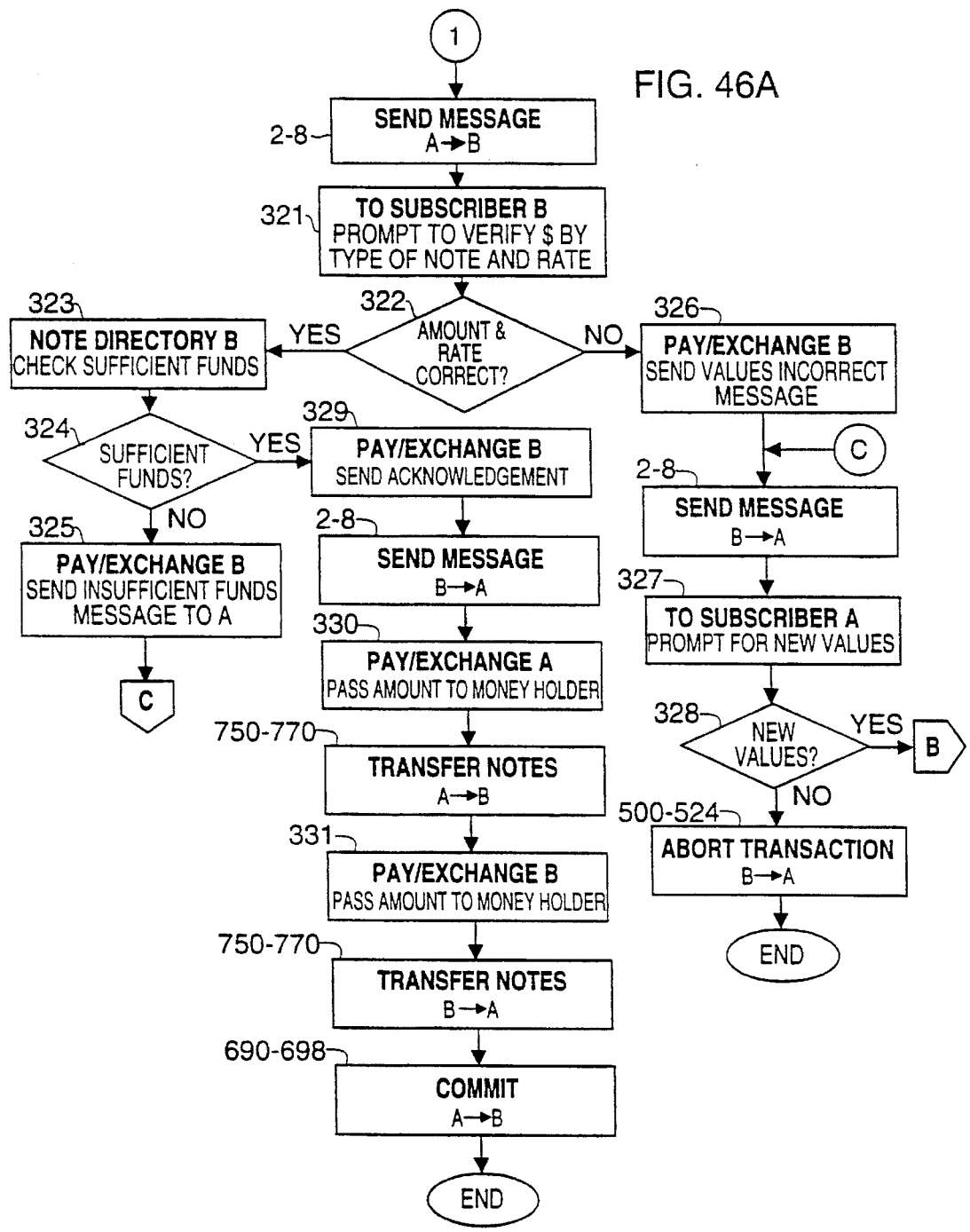

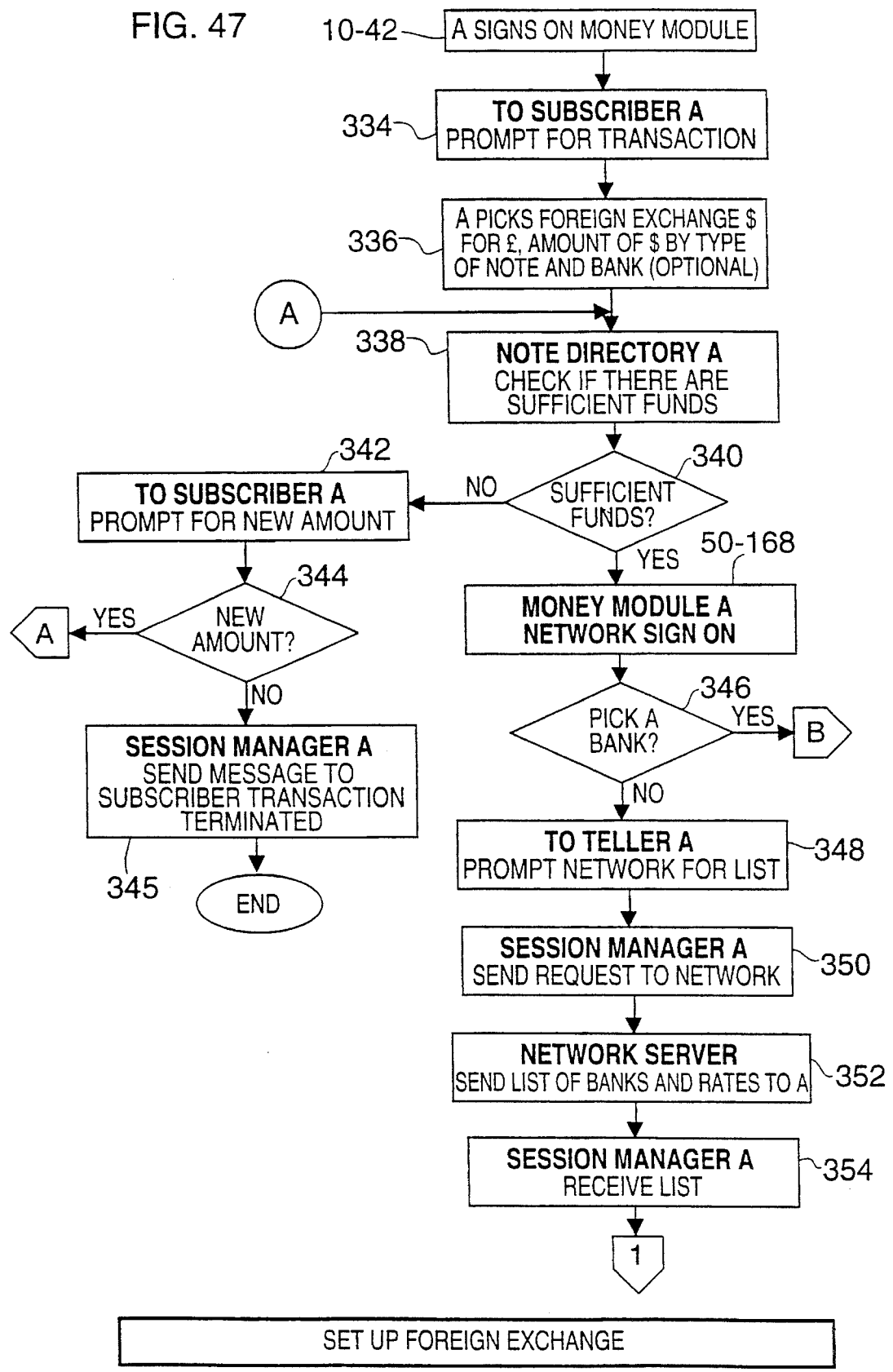

FOREIGN EXCHANGE - CORRESPONDENT BANK

UPDATE MONEY MODULE NOTES AND CERTIFICATE (CONTINUED)

ELECTRONIC-MONETARY SYSTEM

This is a divisional of co-pending application Ser. No. 07/794,112 filed Nov. 15, 1991.

BACKGROUND OF THE INVENTION

The present invention relates to an electronic monetary system for implementing electronic money payments as an alternative medium of economic exchange to cash, checks, credit and debit cards, and electronics funds transfer. The Electronic-Monetary System is a hybrid of currency, check, card payment systems, and electronic funds transfer systems, possessing many of the benefits of these systems with few of their limitations. The system utilizes electronic representations of money which are designed to be universally accepted and exchanged as economic value by subscribers of the monetary system.

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need of having the correct amount or providing change therefor. Furthermore, the handling and managing of paper cash and coins is inconvenient, costly and time consuming for both individuals and financial institutions alike.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Automated Clearing House (ACH) and point of sale (POS) systems are examples of electronic funds transfer systems that have become used by retail and commercial organizations on a substantial basis in recent years. However, the payments made through these types of EFT systems are limited in that they cannot be performed without the banking system. Moreover, ACH transactions usually cannot be performed during off business hours.

Home Banking bill payment services are examples of an electronic funds transfer system used by individuals to make payments. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used with an on-line system to transfer money between accounts, such as between the account of a merchant and that of a customer, cannot satisfy the need for an automated transaction system that provides for the transfer of universally accepted economic value outside of the banking system.

To implement an automated, yet more convenient transaction system that does not require the banking system to intermediate the transfer, and that can dispense some form of economic value, there has been a trend towards off-line electronic funds transfer. For example, numerous ideas have been proposed for some form of "electronic money" that can be used in cashless payment transactions as alternatives to the traditional currency and check types of payment systems. See U.S. Pat. No. 4,977,595, entitled "METHOD AND APPARATUS FOR IMPLEMENTING ELECTRONIC CASH," and U.S. Pat. No. 4,305,059, entitled "MODULAR FUNDS TRANSFER SYSTEM."

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

However, these proposed systems suffer from a failure to recognize fully the significance of bank deposits as money, and their necessity to back any form of universally accepted monetary representations that may be issued. In the systems disclosed thus far, representations of economic value, whether electronic or paper, are issued without the backing of equal valued liabilities as the counterpart to their assets.

None of the paperless payment systems that have been proposed so far are comprehensive enough so as to implement a multipurpose electronic monetary system that includes not only the automated devices that allow subscribers to transfer electronic funds or money between them without any intermediating system, but that also encompasses and includes an entire banking system for generating the value represented by the electronic money and for clearing and settling the electronic money accounts of the banks and financial institutions involved to maintain a monetary balance within the system.

Thus, there is a need for a system that allows common payor to payee economic exchanges without the intermediation of the banking system, and that gives control of the payment process to the individual. Furthermore, a need exists for providing a system of economic exchange that can be used by large organizations for commercial payments of any size, that does not have the limitations of the current EFT systems.

Accordingly, it is an object of the present invention to provide a complete electronic monetary system which utilizes electronic money that is interchangeable with traditional cash and is universally accepted.

It is another object of the present invention to provide a method of securely transferring economic value including currency and credit among subscribers, among financial institutions, and between subscribers and financial institutions.

A further object of the present invention is to provide a multipurpose paperless payment system whereby transactions can be carried out in both an on-line and an off-line mode between subscribers.

It is yet another object of the present invention to provide a payment system that reduces the cost of central electronic funds transfer systems by off loading much of the payments to off-line devices.

It is still another object of the present invention to provide a system of inexpensive electronic transfers to reduce an institution's cost of managing paper cash, checks and coins.

It is still a further object of the present invention to provide a user friendly electronic payment system that may be used reliably and securely for real time transfers of money between members of the general public, between members of the general public and commercial organizations, and between commercial organizations.

It is still another object of the present invention to provide a system for depositing and withdrawing economic value which may be integrated with a wide variety of data processing and data communication systems including currently available home banking services.

It is still a further object of the present invention to provide an electronic monetary system which utilizes electronic money in the form of multiple currencies.

It is yet a further object of the present invention to provide a system for safely transferring economic value in transactions of virtually any size denomination.

It is yet another object of the present invention to provide a medium of economic exchange that is fungible, easily transferable, undeniably redeemable, and secure from reuse, duplication, and counterfeiting.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel methods, arrangements, combinations and improvements herein shown and described.

SUMMARY OF EXEMPLARY EMBODIMENT

To achieve the foregoing, and other objects, the method and apparatus of the present invention employ a preferred embodiment in the form of an electronic-monetary system having (1) banks or financial institutions that are coupled to a money generator device for generating and issuing to subscribing customers electronic money including electronic currency backed by demand deposits and electronic credit authorizations; (2) correspondent banks that accept and distribute the electronic money; (3) a plurality of transaction devices that are used by subscribers for storing electronic money, for performing money transactions with the on-line systems of the participating banks or for exchanging electronic money with other like transaction devices in off-line transactions; (4) teller devices, associated with the issuing and correspondent banks, for process handling and interfacing the transaction devices to the issuing and correspondent banks, and for interfacing between the issuing and correspondent banks themselves; (5) a clearing bank for balancing the electronic money accounts of the different issuing banks; (6) a data communications network for providing communications services to all components of the system; and (7) a security arrangement for maintaining the integrity of the system, and for detecting counterfeiting and tampering within the system.

In the preferred embodiment, the functions of the money generating devices, the transaction devices, and the teller devices will be performed by a combination of tamper-proof computer hardware and application software modules that may be networked together. Information is transmitted in an encrypted form to provide security from unauthorized inspection. The electronic money is transmitted with digital signatures to provide authentication, and security from modification or counterfeiting.

The electronic money exchanged by these devices may be an electronic representation of currency or credit. An important aspect of the electronic currency is that it is the equivalent of bank notes and is interchangeable with conventional paper money through claims on deposits in an issuing bank, but can be withdrawn or deposited both at an issuing bank and at a correspondent bank. However, only the issuing banks can generate the electronic currency, and will be liable for its redemption.

The issuing banks later utilize inter-bank clearing and settling processes to maintain the monetary balance in the banking system, as is currently practiced by today's banking industry.

The electronic money representations are fungible, universally accepted, and undeniably redeemable from the issuing banks, i.e., they have the characteristics of money transactions. To preserve the integrity of the electronic monetary system, each exchange of electronic money includes, along with other information, data identifying the monetary unit of the credit or currency, (i.e., dollars, yen, etc.) the amount by unit of credit or currency, the bank issuing the electronic credit or currency, and several digital signatures.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, an electronic monetary system provides for transactions utilizing electronic money including electronic currency backed by demand deposits in a bank in lieu of cash transactions, and electronic credit authorizations. The invention comprises a money module for generating the electronic money; a money module for issuing, distributing, and accepting the electronic money; and a money module for accepting, storing, and transferring the electronic money between other accepting money modules and between the accepting money module and the issuing money module.

According to a further aspect of the invention, an electronic monetary system is provided for implementing and maintaining electronic money which includes electronic currency that is interchangeable with conventional money through claims on deposits in a bank and electronic credit authorizations.

The system includes a plurality of issuing banks; a generator module for creating electronic money; teller modules coupled to the generator module, for performing teller transactions and for interfacing with other teller modules, such transactions including the accepting and the distributing of the electronic money; a security system for providing the overall integrity of the electronic monetary system; a clearing and settling process for balancing the electronic money accounts of the separate issuing banks and for clearing the electronic money issued by the issuing banks; and a plurality of transaction modules owned by authorized users, for transferring the electronic money between the transaction modules and between the transaction modules and the teller modules.

In accordance with another aspect of the invention, the functions of the generator modules, the transaction modules, and the teller modules will be performed by a combination of tamper-proof computer hardware and application software that may be networked together.

The electronic money exchanged by these modules, which may be an electronic representation of currency backed by demand deposit accounts at the issuing bank or credit authorizations, may be transmitted with digital signatures to provide security from unauthorized modification or counterfeiting. In a preferred embodiment, security from counterfeiting and tampering is also provided by requiring the modules and the individual units of electronic money to be renewed periodically. Offending modules or counterfeit electronic money can be removed from circulation as soon as they are discovered.

Briefly, a process in accordance with the invention comprises the steps of (1) providing a generating module to generate electronic representations of economic value backed by demand deposits or by a credit line;

(2) providing a teller module to accept the generated electronic representations of economic value and to issue the electronic representations of economic value;

(3) providing the authorized users with a transacting module for accepting, storing and transferring the electronic representations of economic value to other authorized users having the transacting module and to the teller processing module;

(4) accepting and transferring the electronic representations of economic value to other authorized users having a transacting module and to the teller module; and (5) providing a security system to allow the transfer of electronic representations of economic value in a secure manner between the generating module, the teller module and the transacting module.

BRIEF DESCRIPTION OF THE DRAWINGS

Other objects and advantages of the present invention will become more apparent by the following description with reference to accompanying drawings, in which:

FIG. 8 is a block diagram of a Network Server, according to the invention.

FIG. 10 is a block form diagram of a security server, according to the invention.

FIGS. 11–24 are flow diagrams of accounting examples, according to the invention.

FIGS. 28–30, 30A, 31, 31A, 32, 33, 33A–D, 34, 34A–C, 35, 35A, 36, 36A, 37, 38, 38A, 39, 39A, 40–45, 45A–B, 46, 46A, 47, 47A, 48–50, 50A are flow charts of transaction examples, according to the invention.

DISCLOSURE OF THE PREFERRED EMBODIMENT OF THE INVENTION

The present invention contemplates an improved monetary system using electronic media to securely and reliably exchange economic value. The system can be implemented by integrating novel data processing systems with other procedures which can be implemented with the current worldwide banking systems.

Throughout this description, "electronic money" may also be referred to by the abbreviation "E-M." Additionally, the term "bank" is used hereinafter to indicate any banking, financial institution or the like which is a participant of the present invention.

Figure 1:
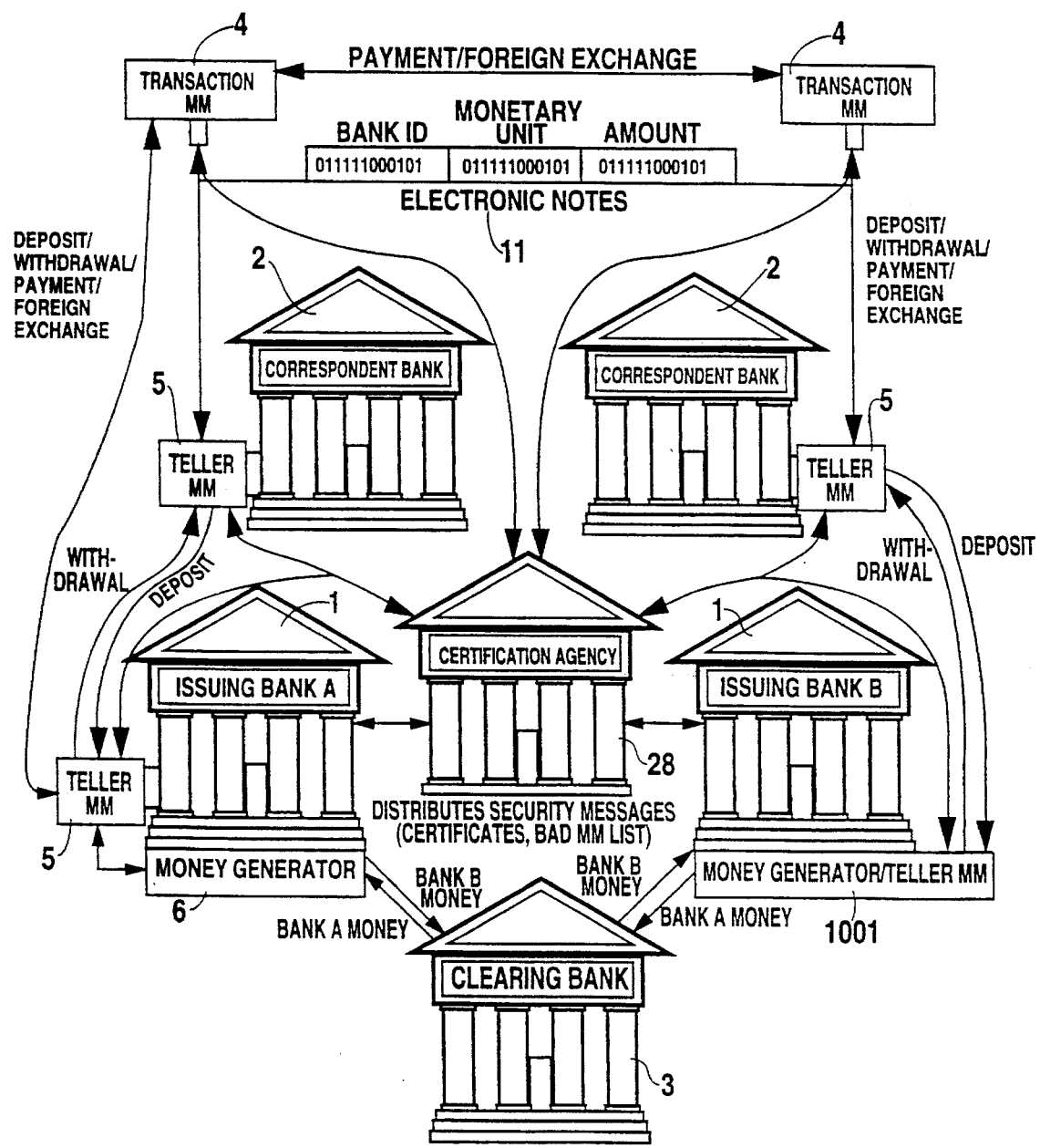
FIG. 1 is a diagram illustrating general aspects of the invention.

Referring now to the drawings, wherein like numerals refer to like components, there is disclosed in FIG. 1, in block form, broad aspects of the preferred embodiment. In FIG. 1, the general relationship among the features of the system is shown. The system includes Issuing Banks 1 each having a Teller money module 5 and a Money Generator module 6; Correspondent Banks 2 each having a Teller money module 5; an electronic money Clearing Bank 3: a Certification Agency 28 and a plurality of Transaction money modules 4 owned by subscribers of the system. Though money generator module 6 and teller module 5 are preferably embodied separately, the functions of these modules may be embodied in a unitary device under processor control.

Electronic notes 11, the media for transferring electronic money, are generated by the Money Generator module 6 for an Issuing Bank 1. These notes 11 are then transferred by a Teller money module 5 to a subscriber utilizing a Transaction money module 4. Electronic notes 11 may be representations of currency or credit authorizations. For security reasons, all electronic notes 11 will expire after a preset time period. Once expired, the notes 11 must be redeemed at a participating bank for updated ones before they can be transferred.

An Issuing Bank 1 generates and distributes the electronic notes 11, and is liable for their redemption. An Issuing Bank 1 performs deposits, withdrawals, payments to loans and inquiries for other money modules.

A Correspondent Bank 2 is a participating bank which distributes electronic money through accounts it maintains at Issuing Banks 1, but does not generate any electronic money, and is not liable for its redemption. Because it cannot generate any electronic money, the Correspondent Bank 2 in the preferred embodiment must make real-time requests of electronic money from an account it maintains at an Issuing Bank 1 whenever a subscriber wishes to withdraw electronic money at a Correspondent Bank 2.

Conversely, a Correspondent Bank 2 deposits all electronic money deposited by subscribers, to the accounts the Correspondent Bank 2 holds at Issuing Banks 1. These accounts will be described hereinafter. A Correspondent Bank 2, like an Issuing Bank 1, will perform deposits withdrawals, payments to loans and bank inquiries.

Notably, an Issuing Bank 1 may also be a Correspondent Bank 2 for the monetary units that it does not generate. For example, an Issuing Bank 1 for electronic dollar notes 11 may be a Correspondent Bank 2 for electronic notes 11 of yen, marks, etc., issued by other banks.

It is also important to note that the system of the invention can function without Correspondent Banks 2. For example, a subscriber can eliminate the use of a Correspondent Bank 2 by communicating directly with his/her Issuing Bank 1 when making a deposit, withdrawal, etc. Correspondent Banks 2 are included in the preferred embodiment for the practical purpose of expanding distribution of the system while reducing the risks that are inherent in any banking system, such as the risks caused by the collapse of a bank issuing money.

The Clearing Bank 3 is utilized when more than one bank is issuing electronic money. According to the invention, it is anticipated that more than one bank will be issuing electronic money. Thus, the Clearing Bank 3 is provided to clear the electronic money deposited and to balance accounts it maintains for the Issuing Banks 1. The Clearing Bank 3 maintains demand accounts for each Issuing Bank 1 in the system.

The Certification Agency 28, is the centerpiece of the system security. It provides a process that "certifies" the validity of a money module for a certain period of time by issuing a certificate to each money module. A money module must have a valid certificate in order to be able to transact with other money modules 4, 5, 6.

Before the certificate expires, it must be updated so that a subscriber can continue to use his/her transaction money module 4. This process makes users of the system establish periodic contact with the Certification Agency 28.

Periodic contact allows for faster response when tampering with the money modules of the system is detected. To this end, the Certification Agency 28 also provides a list of offending or compromised money modules to other money modules so that transactions with the bad units may be blocked.

Figure 2:
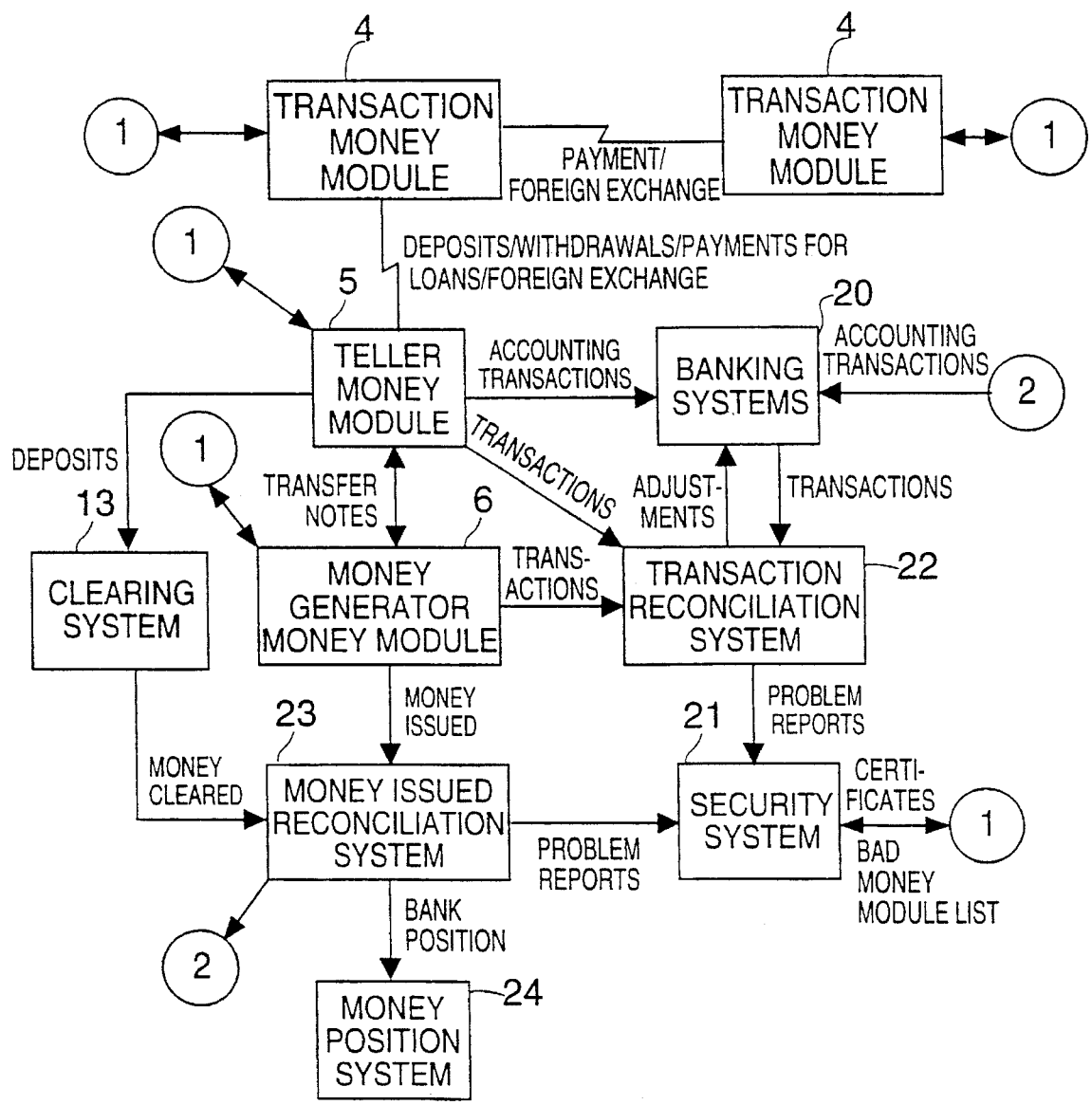
FIG. 2 is a schematic diagram of the operative arrangement of the components, according to the invention.

The components shown in FIG. 1 are best understood by referring to the system's operative arrangement illustrated in FIG. 2. As illustrated in FIG. 2, the preferred embodiment provides for supplements to the current banking systems that include the following additional components: a plurality of the Transaction money modules 4, the Teller money modules 5, and the Money Generator modules 6, for creating, transferring and storing the electronic notes 11 (money); a Clearing System 13 to balance the accounts of banks issuing currency and credit; a security system 21 to maintain the integrity of the electronic notes 11; the current banking systems 20; a network 25 (exemplified by the lines interconnecting modules and systems) to mediate transactions between money modules 4,5,6, the participating banks 1,2,3 of system 20 and the security system 21; a Transaction Reconciliation system 22 to detect money module malfunctions and insider tampering of the system; a Money Issued Reconciliation System 23 to detect counterfeiting and reuse of electronic money; and a Money Position System 24 to keep track of the electronic money in circulation.

Playing major roles in the preferred embodiment are three classes of "money modules" for creating, storing, and transferring the electronic objects that represent economic value. These include the Transaction money modules 4, the Teller money modules 5, and the Money Generator modules 6. It is contemplated that these money modules 4,5,6 will be a combination of tamper-proof hardware and application software that are meant to be components of a larger processing environment.

Referring to the top right-hand side of FIG. 2, a Transaction money module 4 containing electronic notes 11 stored therein (not shown) may be used to exchange foreign currency or make a payment with another Transaction money module 4, using a secure, encrypted protocol either by a telephonic link, or a proximate communication link. Because it is contemplated that an electronic note 11 will be fungible, i.e., it can be broken into any desired amount, the amount transacted between the Transaction money modules 4 may be of any amount up to the amount stored in the payor's Transaction money module 4.

A payee's Transaction money module 4 that has received the electronic notes 11 as a payment may, in turn, be used to transfer all or any amount of the electronic money contained therein to another subscriber's Transaction money module 4. Alternatively, the payee may deposit the electronic money into his/her bank account.

The value of the electronic money stored in the Transaction money module 4 may also be redeemed at any participating bank (e.g., Correspondent Bank 2 or Issuing Bank 1) for paper money by transferring any amount of the electronic money to a bank's Teller money module 5, whereby a teller or an Automated Teller Machine (ATM) will return an equal amount of paper money. Naturally, it is anticipated that paper money may also be exchanged for equal valued electronic money.

As will be appreciated, the Transaction money module 4 may be configured to make deposits, withdrawals, loan payments, inquiries and exchanges of currencies of electronic notes 11 directly through a Teller money module 5 at an Issuing 1 or Correspondent Bank 2 or remotely through a telephonic connection to an Issuing 1 or Correspondent Bank 2 Teller money module 5 (thereby providing, among other things, the transactions not available in current home banking systems). Upon a request to transact with a bank, the Teller money module 5 mediates the transactions for the subscriber's bank account as well as the banking system's electronic money accounts.

It should be noted that a subscriber will not be required to maintain a bank account in order to own and use a Transaction money module 4. For instance, a subscriber may obtain a stand-alone computing device that contains a Transaction money module 4 and use the device only in off-line peer-to-peer transactions with other devices containing a Transaction money module 4, such as a merchant's point-of-sale terminal. Of course, the merchant may then transfer the electronic money to another commercial organization to meet its obligations, or it may deposit the electronic money at its own bank.

In the preferred embodiment, electronic money deposited at any Issuing Bank 1 other than the original Issuing Bank 1 itself will subsequently be settled for value with the original Issuing Bank 1 through the central clearing and settling process performed by the Clearing System 13. It is anticipated that the clearing and settling processes will be managed by the Clearing Bank 3 (FIG. 1). Each Issuing Bank 1 Teller money module 5 sends all the electronic notes 11 deposited at its bank but issued from other Issuing Banks 1 to the Clearing Bank 3 in order to settle for the value posted to their customers' accounts.

When a withdrawal, an exchange for foreign currencies, an exchange of paper cash for electronic money, or an updating of the electronic money occurs, the Money Generator module 6, FIG. 2, creates and digitally signs electronic objects having economic value—either currency or credit notes 11 (FIG. 1)—that are to be sent to the Transaction money modules 4 through the participating bank's Teller money modules 5 in the form of a packet of electronic notes 11. As mentioned above, the electronic currency notes 11 are the equivalent of bank notes that are backed by deposits, and can be traded between Transaction money modules 4.

During the withdrawal transaction, the Teller money module 5 and the Transaction money module 4 may establish a communications link using an encrypted protocol to securely transfer the notes 11 from the Teller money module 5 to the Transaction money module 4.

Records of the notes 11 generated and conveyed by the Money Generator module 6 are sent to the local bank's Transaction Reconciliation System 22 and an Issuing Bank's 1 Money Issued Reconciliation System 23 for maintaining statistical and housekeeping functions. Records of the electronic notes 11 cleared and settled at the Clearing Bank 3 are also provided to the Money Issued Reconciliation System 23. From these compilations, a financial position of the system can be produced by the Money Position System 24.

Discrepancies and malfunctions are reported to the Security System 21 which downloads the lists of problem money modules to all money modules in the system when they are connected to the Network 25. By carrying this list, a Transaction money module 4 will be inhibited from transacting with other suspect Transaction money modules 4.

Having thus provided an overview of the preferred embodiment, there will now follow a more detailed description of the individual elements and the transactions between them.

Money Modules

Figure 3:
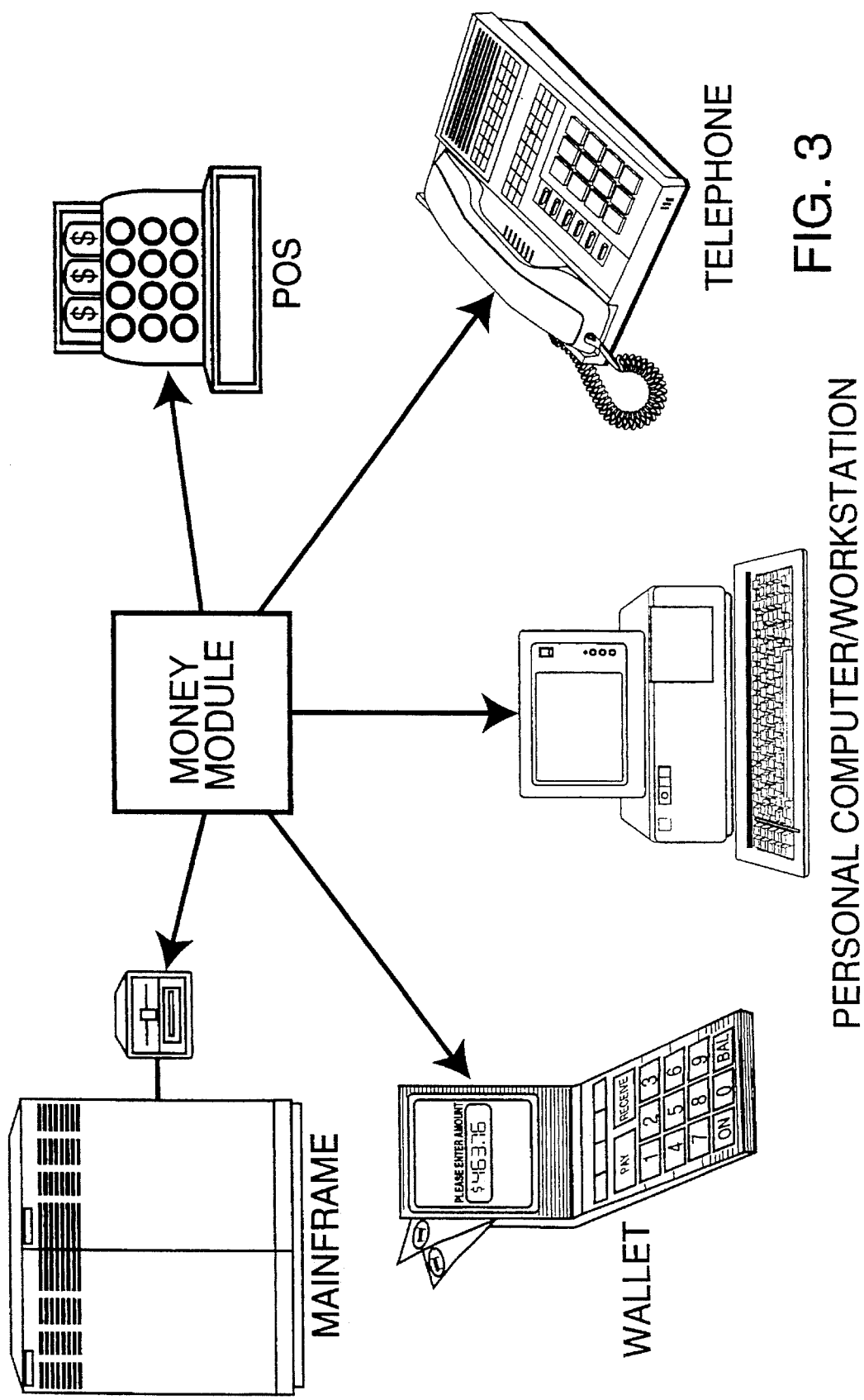
FIG. 3 is a perspective diagram of several embodiments of external systems that may house a money module, according to the invention.

FIG. 3 provides several embodiments of external systems or devices for housing money modules.

In the preferred embodiment, the external system or device will typically contain data display means, data input means, data processing means, memory storage means, direct connection or contactless bidirectional communications means, and the money module packaged in a tamper-proof housing, all interfaced by suitable means for information transfer, such as are well known in the art.

As will be understood, a money module may be embodied as a modular component of any larger processing environment while still performing the same functions. For example, Transaction money modules 4 may work as co-processors embedded in personal portable computing devices like the Hewlett-Packard 95LX, or as co-processors in mainframe computers, workstations, point-of-sale terminals or telephone devices (fixed or portable) connected to a network.

A Teller money module 5 may be embodied as a co-processor in the bank's financial computer systems. The Money Generator module 6 could be a separate processing unit networked to the bank, a co-processor in a general purpose computer, or it may be combined with an Issuing Bank's 1 Teller money module 5 in a larger processor as illustrated by the unitary device 1001 of FIG. 1.

Because it is anticipated that a money module will be implemented in a separate processing device, it is assumed that corresponding interface circuitry would be provided in the host processing device to provide communication between the processing device and the money module.

Notably, all classes of money modules contemplated by the invention may be implemented programmatically or by direct electrical connection through customized integrated circuits, or a combination of both, using any of the methods known in the industry for providing the functions described below without departing from the teachings of the invention. Those skilled in the art will appreciate that from the disclosure of the invention provided herein, commercial semiconductor integrated circuit technology would suggest numerous alternatives for actual implementation of the inventive functions of the money module that would still be within the scope of the invention.

Transaction Money Module

In one embodiment, the Transaction money module 4 may be imbedded in any computer of any size or use, like those serving as general purpose computers or work-stations, to provide functions not limited to E-M transaction use. This latter application will allow for such uses as real-time, off-line payments between personal computing devices, or on-line payments for network services such as information retrieval, telephone calls, or for purchasing airline tickets, theater tickets, etc.

In another embodiment, the Transaction money module 4 may be imbedded in an individual hand-held integrated circuit unit, such as a personalized hand-held computer that may be readily carried by an individual as though it were a wallet. As an illustration, the device of the preferred embodiment may include a keyboard, a pen or stylus, a touch screen or voice recognition circuitry as a data input means, an alphanumeric LCD dot matrix display as a display means, an infrared optical transceiver as a contactless bidirectional communications means, and an RJ-11 telephone jack coupled to modem circuitry as a telephonic communications means. Additionally, the device may also include various electronic processing and storage means for providing calculator capabilities, for storage and processing data of the owner, etc.

It is important to note that the particular design of the external device is not critical to the invention, and other technologies suitable for accomplishing the foregoing functions may also be used. For example, an LED instead of an LCD display panel may be used; radio, inductive or capacitive communications methods may be used instead of direct connection; optical communications methods may be used; etc.

In general, it is anticipated that any Transaction money module 4 owned by a subscriber will be embodied in a self-contained, tamper-resistant unit that contains components which are difficult to access, and thus prevent any person from improperly examining, counterfeiting or modifying any of its contents or arrangements. For example, integrated semiconductor circuits, whose contents are difficult to examine, encased in a tamper-resistant package such as that formed by an epoxy or plastic lamination may provide a high degree of physical security while providing the necessary storage, computation, timing, and, other data processing functions.

However, the invention is not limited to any particular tamper-resistance means, inasmuch as there are a number of methods known in the industry for providing such security. Such tamper-resistance will also prevent the owner, who can control only some of the internal operations of the Transaction money modules 4, from certain accesses to thereby provide security from abuse to other relevant institutions and individuals.

Each Transaction money module 4 will have a way of ensuring its own association with a particular subscriber, so that its use by other individuals may be limited. In addition to the use of Personalized Identification Number (PIN) methods that are well known in the art, the Transaction money module 4 may also include means such as a fingerprint reader, voiceprint analyzer, written signature analyzer, or other so-called biometrics means, to determine the physical identity of an authorized subscriber.

Additionally, the Transaction money module 4 may utilize personalized interactive proofs using questions that only a true owner would be able to correctly answer, such as the owner's mother's maiden name, his/her favorite color, etc. Any such techniques may provide additional security for organizations, and may also be to the advantage of the authorized user since such security can protect the subscriber's data from inspection and use by someone else coming into possession of the Transaction money module 4.

Because the Transaction money module 4 can take on a variety of physical representations, it will be described by the functions performed in addition to the pertinent physical characteristics of a preferred embodiment.

Figure 4:
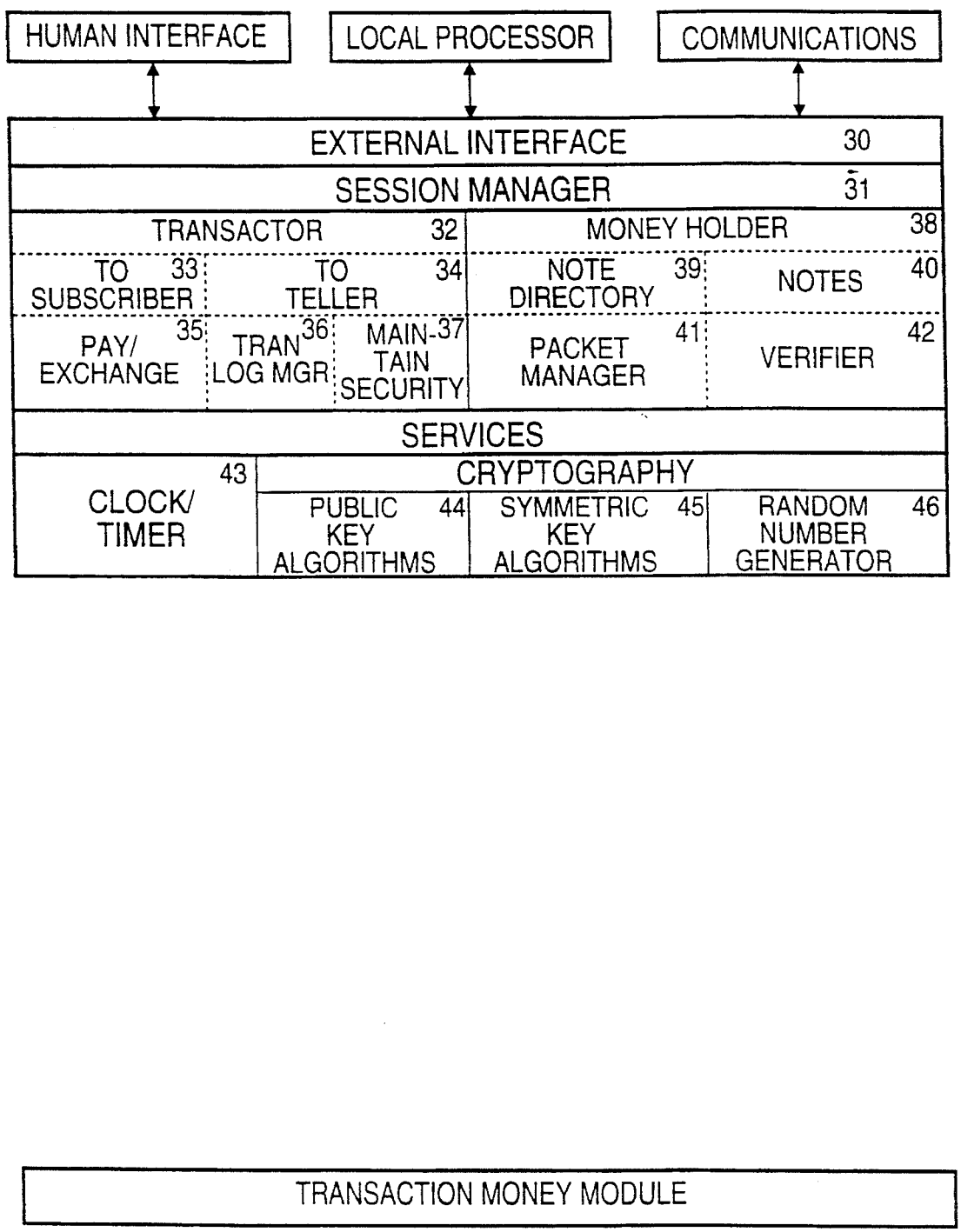
FIG. 4 is a block form diagram of a Transaction money module, according to the invention.

Referring now to FIG. 4, a Transaction money module 4 is shown diagrammatically in block form. Specifically, a Transaction money module 4 has (1) an external interface 30 that interfaces the Transaction money module 4 to the module's data processing means, the input/output means (human interface) and the communications circuitry of the external device; (2) a session manager 31 to control and commit (i.e., finalize) or abort a transaction session; (3) a transactor 32 to manage application functions; and (4) a money holder 38 to contain and manage the electronic representations of money.

According to the invention, the following application functions may be implemented in the preferred embodiment of the present invention:

The To Subscriber application 33 performs the function of comparing the owner identification characteristics, such as a user's personal identification number (PIN) and biometrics characteristic (e.g., fingerprint, voiceprint, etc.), that are stored in the memory of the Transaction money module 4, to those of the individual who is attempting to gain access to the Transaction money module 4. After the proper ownership is verified, the Transaction money module 4 may be activated, and the user is allowed certain accesses to the Transaction money module's 4 stored contents. Messages to the subscriber, and subscriber inquiries as to the information contained within the Transaction money module 4 are also handled by this application function.

The To Teller application 34 interfaces the Transaction money module 4 to the Teller money modules 5 for initiating and performing deposit, withdrawal, loan payment transactions, and bank inquiries with such Teller money modules 5.

The Pay/Exchange application 35 supervises the sending and receiving of electronic notes 11 between Transaction money modules 4 managing the process in which the electronic notes 11 are properly "packaged" as to amount, digital signatures, etc. This application provides that the electronic notes 11 are transferred in a recognized, valid format. Notably, this is the application that allows a money module to perform payments and foreign exchanges. Without this application in the preferred embodiment, a Transaction money module 4 cannot make a payment to another Transaction money module 4.

The Tran Log Mgr. application 36 provides the management and overseeing of a log that records completed transactions undertaken by the money module. For each completed transfer of electronic money, an illustrative Tran Log records:

(1) the type of transfer (i.e., payment, deposit, foreign exchange, etc.), (2) the date of transfer, (3) the amount of transfer, (4) the Issuing Bank 1 identifier (5) the note identifier, (6) the monetary unit, (7) the identifier of the other money module involved in the transaction, and for deposits, withdrawals and loan payments:

(8) the bank account number, (9) the bank identifier, and

(10) the amount of the transaction.

In the preferred embodiment, every money module will have an identifier. A money module identifier may be thought of as the "serial number" of the money module and is never changed.

It is anticipated that a subscriber may have access to several of the fields of data stored in the Tran Log application, such as histories of the amount, date, and type of transfer. Information as to the expiration date of a certificate may also be accessed by the subscriber so that he/she will be informed as to the need to update or revalidate the money module's certificate.

The Maintain Security application 37 manages a list of money module identifiers that are known to have been generally compromised. In particular, this is a list that is distributed to each money module when it communicates with the Network 25, and is a list of money modules that have passed an invalid or counterfeit electronic note 11 or have performed acts deemed detrimental to the system.

When establishing a session between money modules, each money module checks its list of bad money modules to see if the other is an offending money module. If the other money module's identifier appears on the list, the communication is broken off.

This application also provides the process for obtaining the certificate unique to the money module, for synchronizing an internal clock, and for managing the creation of new cryptography keys.

The Note Directory 39 application performs the function of keeping track of the location, identification and value of each of the electronic notes 11 stored within the money module. A note 11, whether it is an electronic currency note or an electronic credit note, is the basic unit of electronic money. It is the electronic object representing the economic value, the electronic bits that contain the amount, expiration date, note identifier etc. (described in detail below) that gets digitally signed (described below) and encrypted when being transferred. Both electronic currency notes 11 and electronic credit notes 11 may be located by the Note Directory 39.

The Note Directory application 39 updates the current amounts of electronic notes 11 (both currency and credit), after every transfer. A date-of-expiration, a note identification number and an Issuing Bank identifier is also recorded with the location of each note 11.

In summary, the Note Directory 39 keeps track of the note identification number, the Issuing Bank 1 identifier, the date-of-expiration of the note 11, the location of the note 11 as stored in the Transaction money module 4, and the current amounts of the value of the notes 11 stored. These records are maintained for both electronic currency and electronic credit. For a credit note 11, the account number of the credit line is also maintained.

The Notes application 40 manages the storage of the representations of the electronic notes 11 themselves, both currency and credit notes 11. This application also generates the transfers when notes 11 are to be conveyed.

The Packet Manager application 41 manages the construction and formatting of a packet of electronic notes 11 that are to be transferred to another money module. For example, the Packet Manager 41 will utilize an algorithm so that the least number of electronic notes 11 are used to fulfill the requested amount of transfer, with the earliest dated electronic notes 11 being used first. Alternatively, when a packet of notes 11 is transferred to the receiving money module, the Packet Manager 41 application "disassembles" the packet, verifying the date and separating the data fields that represent the different electronic notes 11.

The formatted packet gets several data fields appended to it when electronic notes 11 are "assembled." An identifier data field provides the indicia that identifies it as a packet. Additionally, data fields for the total value of the notes 11, the number of notes 11, and the individual locations of the notes 11 are provided.

The Verifier application 42 verifies that a received packet contains valid electronic notes 11 before a receiving money module accepts them. The Verifier 42 also checks that the total amount received is equal to the sum of the electronic notes 11 that are to be transferred. If the total amount and the individual electronic notes 11 are valid, an acknowledgment is returned to allow for completion of the transfer. Otherwise, an "invalid" message is sent, and the transfer may be aborted.

Services applications that are provided fall under two categories: Clock/Timer 43 and Cryptography. The Clock/Timer 43 provides output pulses for controlling a transaction timeout, such as the time between the sending of a message and the return of a corresponding message.

As will be appreciated, when two money modules are communicating, they may be monitoring a time-out protocol. For example, after a first money module has sent a message to a second money module, the Session Manager 31 of the first money module ("A") may set a timer for a reply if the Transactor 32 indicates that a reply is required. The Session Manager 31 may also number the message sent. This number would appear in the reply message from the Session Manager 31 of the second money module ("B").

If the timer expires before the message has been received, then Session Manager A 31 will query Session Manager B 31 to determine if the transaction is still running in B. If B does not reply then Session Manager A 31 will abort the transaction. If a reply is received that the transaction is proceeding, then the timer will be reset to a new time. If A queries B a predetermined number of times without receiving a reply to the original message, then A may abort the transaction.

Separately, this application also maintains the current date and time, both for user display and for verifying that an electronic note 11 to be received is not an expired one, along with other general clock functions that are commonly used in the industry.

The Cryptography application contains a Public Key 44 operation, a Symmetric Key 45 operation, and a Random Number Generator 46. While the tamper-resistance of the Transaction money module 4 and its components makes it difficult for a person to modify the structure of the device or its contents, known cryptographic techniques are also employed to provide secure communications and payment transfers between money modules.

Public key cryptography 44, as is well known in the art, may be employed by this application to provide public key digital signatures, which are called "digital signatures" or simply "signatures" for brevity. The data in electronic notes 11, may be represented by a digital number. The electronic notes 11, are signed by digital signatures formed from this number. A digital signature can then be checked as corresponding to a particular message by anyone knowing the corresponding public key, which in the preferred embodiment would be all other money modules.

This application provides each money module with the ability to check the digital signature for authenticity. A money module receiving the digitally signed electronic note 11 can in turn sign and transfer it to others, who could also check, sign and distribute it.

Because of the "one way" nature and computational complexity of public-key digital signatures, it is thought to be infeasible to decipher and duplicate them within a feasible period of time, making such a security system resistant to forgery.

Lastly, this application also creates new public and private keys when needed.

Symmetric Key cryptography 45 provides private key algorithms that are well known in the art, for individual session security and privacy between money modules. In the preferred embodiment, this application provides encryption/decryption means in order to secure information being exchanged between two money modules.

Any well known symmetric key cryptography technique, such as the National Data Encryption Standard (DES) system or other cryptography techniques, may be provided in this application. For example, due to the increasing interest in providing cryptographically secured communications, manufacturers are providing various semiconductor integrated circuit devices which perform the encryption and decryption of data. Cylink corporation's CIDEC data encryption devices are examples of commercially available encryption/decryption circuitry that would be suitable in the present invention for this application. Due to the federally mandated use of the DES algorithm, devices such as these are widely utilized to implement that algorithm.

It is important to note that the details of the particular cryptographic methodology utilized by the money modules are not critical and are not limited to a particular cryptographic technique.

The Random Number Generator 46 generates random like numbers for creating new public/private keys for the Public Key application 44 and new private keys for the Symmetric Key 45 application. This application is utilized to vary in an unpredictable way the generation of temporary session keys.

Circuitry for providing such random number generation capability are well known in the art. For instance, a circuit utilizing a "noisy" diode may provide random values, as is well known in the industry. Random numbers may also be provided by a pseudorandom number generator circuit which implements a mathematical algorithm, such as the power-residue algorithm, that generates apparently random values from a "seed" number. The use of clocks or counters provides another often used source of random data. As will be understood, the Random Number Generator 46 may use techniques that are well known to a person of ordinary skill in the art to generate the temporary numbers, and thus need not be further described.

It should be further understood that the foregoing functions disclosed herein may be performed by known programming techniques and/or dedicated hardware and in some cases may be combination of both or shared resources from each. As may be appreciated by a person skilled in the art, many changes in form and detail can be made in dependance on specific application requirements without departing from the essential features of the money modules.

Teller Money Module

The banking systems 20 of both the Issuing Banks 1 and the Correspondent Banks 2 interface to the system of the invention through a Teller money module 5. The Teller money module 5 may be imbedded in any general purpose computer or workstation. The particular design of the Teller money module 5, like the Transaction money module 4, may be implemented in readily known programming techniques or dedicated computer hardware, or a combination of both. As will be appreciated by a person skilled in the art, various designs of the Teller money module 5 may be employed to implement the functions described herein.

Figure 5:
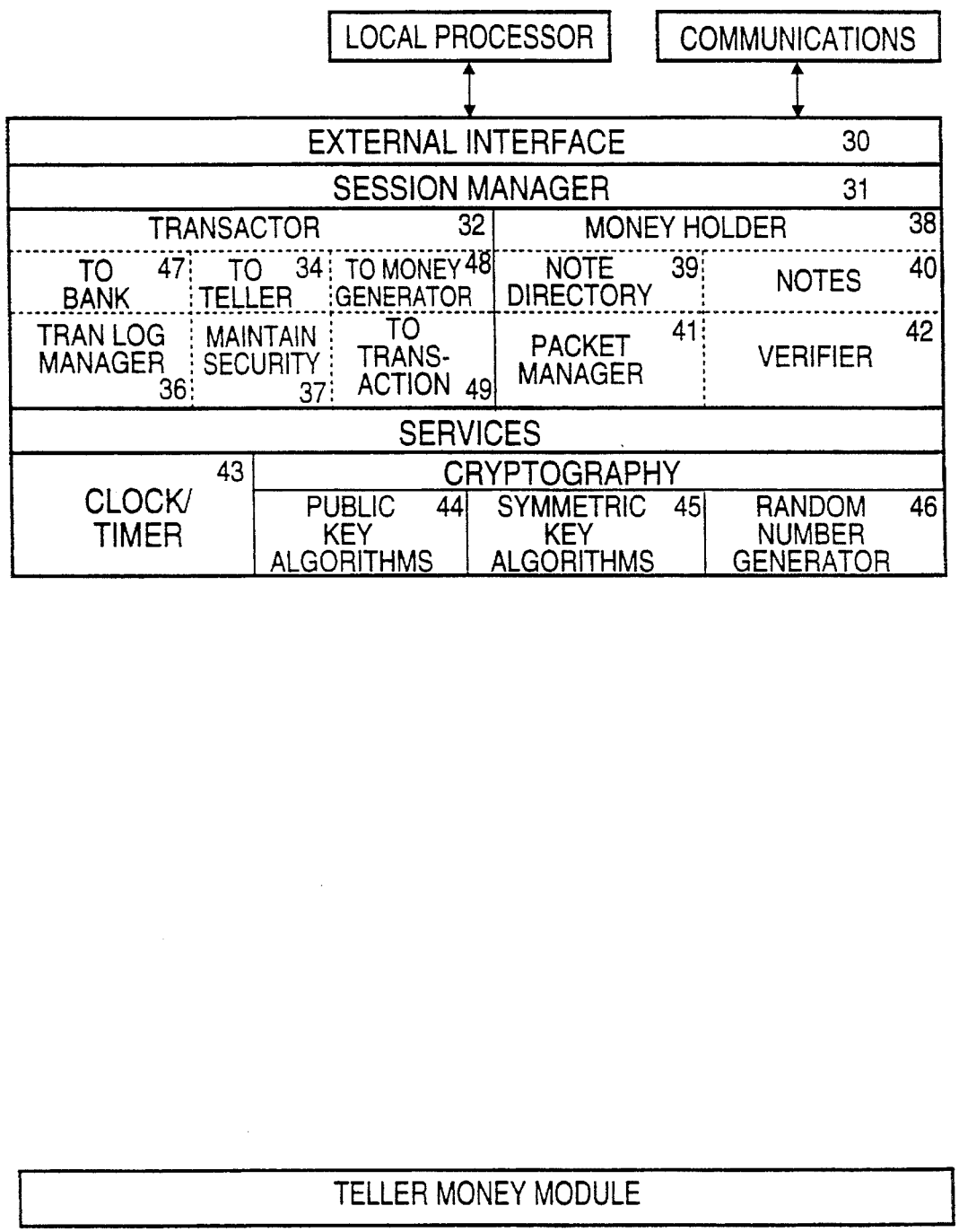
FIG. 5 is a block form diagram of a Teller money module, according to the invention.

The details of one embodiment of the Teller money module 5 is shown in block form in FIG. 5. The Teller money module 5 contains many of the same components and application functions of the Transaction money module 4 described above. Therefore, the identical components will only be repeated briefly here, while the distinguishing components will be fully described. It should be noted that the Teller money module 5, like other money modules of the system, is also contained within a tamper-proof enclosure of the type common in the industry, so as to ensure the necessary security involved.

The Teller money module 5 contains an External Interface 30, a Session Manager 31, a Transactor 32 and a Money Holder 38 that perform similar functions to the corresponding components in the Transaction money module 4 described above.

Briefly, the External Interface 30 interfaces the Teller money module 5 to other processing and communications means within the Teller money module 5 host processor; the Session Manager 31 acts to control and commit (i.e., finalize) or abort a transaction session between the Teller money module 5 and another money module; the Money Holder 38 manages the storing and retrieval of electronic money; and the Transactor 32 manages the application functions of a To Teller 34, the Tran Log Mgr. 36, the Maintain Security 37, the To Bank 47, a To Money Generator 48, and the To Transaction 49.

The following list describes in brief, the applications contained in the Teller money module 5 that are functionally identical to the applications found in the Transaction money module 4:

— To Teller 34: Interfaces deposit and withdrawal functions to another Teller money module 5.

— Tran Log Mgr. 36: Transaction log manager for recording transaction details.

— Maintain Security 37: Manages the list of compromised money modules, applies for certificates, synchronizes the clocks, and manages the creation of new digital keys.

— Note Directory 39: Keeps track of the location, value and identification of notes 11 by monetary unit. Summary totals are also maintained.

— Notes 40: Manages storage for the electronic notes 11 of exchange, and creates the transfers for the notes 11.

— Packet Manager 41: Manages the assembly and disassembly of a packet to be transferred to a different money module.

— Verifier 42: Verifies that a received packet contains valid electronic notes 11.

— Clock/Timer 43: Controls transaction timeout, expiration of the validity of the electronic notes 11, expiration of the certificate, and general clock functions.

— Cryptography
  (i) Public key 44: used for signatures to sign and validate notes 11 and to set up a secure transaction session.
  (ii) Symmetric key 45: Controls the security of a transaction session.
  (iii) Random number generator 46: Generates random like numbers for new cryptographic keys.

Some of the distinguishing applications are the To Bank 47 and To Transaction 49 applications. The To Bank application 47 provides the interfacing means whereby the Teller money module 5 can perform exchanges of data for inquiries and account postings with the on-line systems of a bank. This application is also utilized for crosschecking the customer's account number with the accounts and type of transaction being requested.

The To Transaction application 49 performs deposits, withdrawals and payments to loans. This application operates whenever a Teller money module 5 is transacting with a subscriber's Transaction money module 4.

As mentioned above, a Teller money module 5 may be associated with an Issuing Bank 1 or a Correspondent Bank 2. When the Teller money module 5 is associated with a Correspondent Bank 2, it is utilized for intermediating deposits, withdrawals, and payments to loan accounts between a Transaction money module 4, the Correspondent Bank's 2 on-line systems, and an Teller money module 5 at an Issuing Bank 1.

When operating in an Issuing Bank 1 mode, the Teller money module 5 is used for intermediating deposits, withdrawals, and payments to loan accounts between other money modules and the Issuing Bank's 1 on-line systems. Additionally, when the Teller money module 5 is performing in an Issuing Bank 1 mode, a To Money Generator application 48 may be employed when requesting new notes 11.

Basically, the To Money Generator application 48 performs banking functions dealing with requests for electronic notes 11. It interfaces an Issuing Bank's 1 Teller money module 5 to a Money Generator Module 6.

All of the other elements performed in an Issuing Bank's 1 Teller money module 5 are essentially identical to the similarly named components and application functions described above.

Money Generator Module

Figure 6:
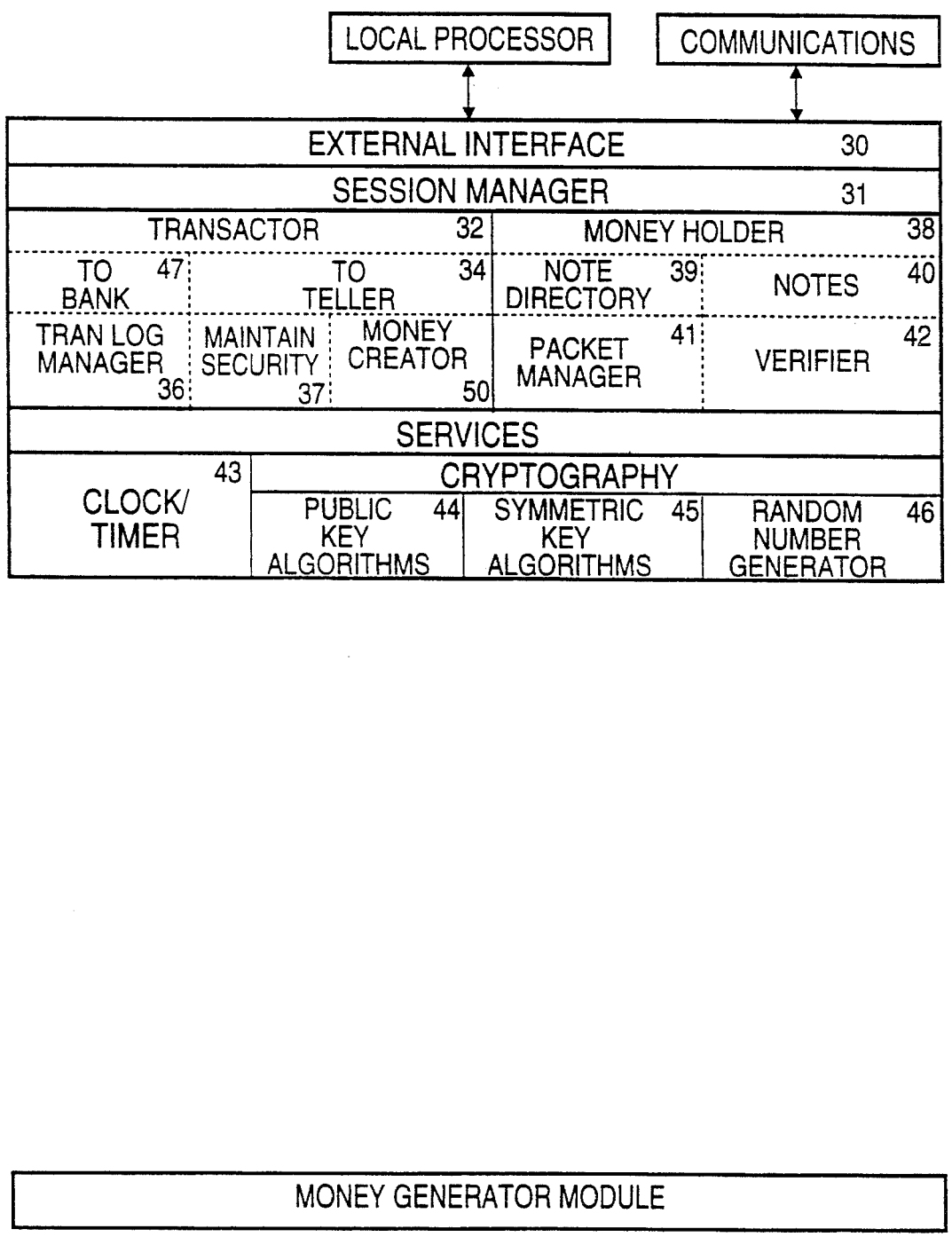
FIG. 6 is a block form diagram of a Money Generator module, according to the invention.

FIG. 6 is a block diagram illustrating the application functions of a Money Generator module 6. Money Generator modules 6 provide the mechanism that Issuing Banks 1 utilize to issue electronic money. A Money Generator module 6 is also encased in a tamper-resistant package for the same security reasons stated above for other money modules.

A Money Generator module 6 generates the electronic money (in the form of electronic notes 11, to be described in further detail below), and distributes them to other money modules through the Teller money module 5 of an Issuing Bank 1. The Money Generator module 6 includes a unique application not present in other money modules for responding to requests for electronic money. This is the Money Creator application 50.

The Money Creator application 50 creates and formats the electronic objects representing value—either currency backed by demand deposits, or credit authorizations—and digitally signs these "electronic notes 11" using public key cryptography in conjunction with its secret key, so that it may be sent to an Issuing Bank's Teller money module 5.

Notably, in a Money Generator module 6 the To Bank application 47 notifies the bank systems of any irregularities, off-loads transaction records in the Tran Log to the Transaction Reconciliation System 22 and transfers electronic notes 11 to the Money Issued Reconciliation System 23. All of the other applications of the Money Generator module 6 are identical to the similarly named applications of the money modules described above.

The Network

Figure 7:
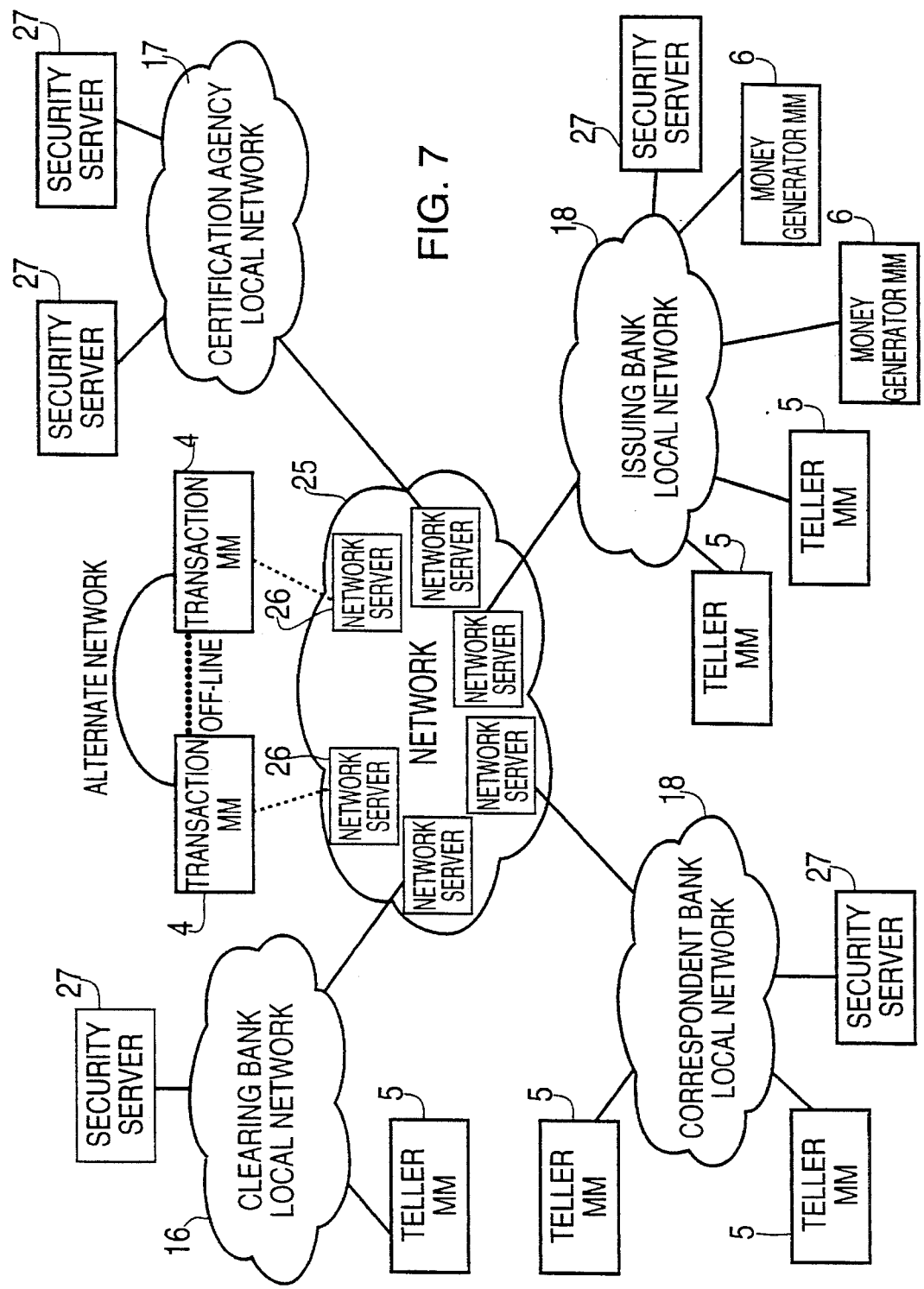
FIG. 7 is a block diagram of the network arrangement, according to the invention.

According to one embodiment of the invention, the individual components of the present invention may communicate over a Network 25, as shown in FIG. 7. The Network 25 will link together the Issuing Banks 1, Correspondent Banks 2, the Clearing Bank 3 and the Certification Agency 28.

Transaction money modules 4 may be coupled to the Network 25 over the telephone exchange or via special terminal facilities at bank locations (e.g., additional contactless or cable connections at an ATM booth). A communication layer will carry transaction requests (e.g., deposits, withdrawals), packets of notes 11 and new certificates securely across the Network 25. In the preferred embodiment, the Network 25 will also provide directories of financial services, and update the money module clocks and the bad money module list of all money modules.

As will be understood, the Network 25 may use well known data link or communications systems and techniques that utilize, for example, telephone lines, fiber-optic land lines, and satellites and that include connective timing and control software and circuitry for allowing access and transmitting digital information. The Network 25 may use commercially available protocols and operating techniques such as those set forth by the International Standards Organization ("ISO") for Open Systems Interconnect network standards. It is important to note that the particular design of the Network 25 is not critical and suitable technologies for accomplishing the foregoing data communications functions may be used.

Each entity (Banks 1 and 2, Certifying Agency 28, or Clearing Bank 3) is also assumed to have an individual local network 16, 17, 18 and a gateway to the larger system Network 25. The larger Network 25 will provide directory services for the routing of messages to connect to the appropriate local network 16, 17, 18. The local network 16, 17, 18 has the responsibility of routing messages to the correct money module or a Security Server 27. A Security Server 27 is associated with each participating bank and the Certification Agency 28, and is used for implementing the security of the system.

FIG. 7 illustrates the preferred embodiment of the Network 25 generally, indicating that money modules of any participating bank may be intercoupled to the money modules of other banks and financial institutions, or another subscriber's Transaction money module 4 via a communications link directly connected into switching and processing centers and alternatively connected to a local network 16, 17, 18 at each entity.

A money module need only identify the local network 16, 17, 18 destination (typically a bank subnetwork) for the transmission of most messages. The local network 16, 17, 18 will route the message to an appropriate money module for establishing a session. Once a session is established, the Network 25 directs all messages between the two money modules. The Network 25 also controls messages between money modules and Security Servers 27.

Transaction money modules 4 may communicate over the Network 25 for deposits, withdrawals, payments to loan accounts, updates or inquiries. The Teller 5 and Money Generator modules 6 will sign on the Network 25 periodically to update security information. The sign-on will be initiated by the money module Session Manager 31, or by the bank Security Server 27 if recertification is required or if there are changes to the bad money module list.

A bank services directory may be available to the money modules primarily for updating the electronic notes 11 and performing foreign exchange. A list of participating banks for either service will be available from the Network 25.

In the preferred embodiment, the Network 25 will provide time services to the individual components of the present invention. Transaction 4, Teller 5 and Money Generator modules 6 and Security Server 27 clocks may be updated from a Network Server 26 in the Network 25 every time that the respective money module accesses the Network 25.

Network Servers 26 may provide the money module services described below, and gateway services to the local networks 16, 17, 18. The application functions of the preferred embodiment of the Network Server 26 are shown in the block diagram of FIG. 8. The following application functions are contemplated for the Network Server 26:

(1) External Interface 56—a communications layer which interfaces to the Network 25; and (2) Communication Session Manager 57—manages a communication session between money modules, and between a money module and the Security Server 27.

Application Services are provided by:

(3) Manage Network Sign-on 58—controls the money module Network sign-on process;

(4) Synchronized Time/Date 59—keeps money module Clock/Timer 43 services synchronized to a system time;

(5) Route Message 60—directory services for routing messages, controlling message routing during sign-on and during a money module session; and (6) Direct to Bank Services 61—provides information on services provided by participating banks.

As will be appreciated by one skilled in the art, switching and processing centers that are known in the industry may be used to enable the networking cooperation between a financial institution and any other that is coupled to the same centers.

Electronic Notes

We turn now to a further description of the elements of the electronic notes 11 themselves.

An electronic currency note 11 representing value is essentially an electronic object created from a transaction request (deposit or withdrawal) which is backed by demand deposits at an Issuing Bank 1. At various times and in various points of the system, the notes may appear in electrical or magnetic forms or as electromagnetic radiation. These notes 11 may be transferred over several transactions just like paper money, with the additional property of fungibility that allows the electronic notes 11 to be commuted and transferred in amounts less than or equal to the value of the note 11.

Notes 11 may be split by appending a transfer record to the note 11 and signing the note 11 using the private cryptographic key of the money module transferring the note 11. Electronic credit notes 11, however, can only be transferred once in the preferred embodiment, because it is anticipated that its receiver must deposit the credit note 11 so that the loan may be realized.

Credit notes 11, unlike currency notes 11 are drawn on a subscriber's loan account. Each credit note 11 carries the account number it is drawn on. The account may be a revolving credit or credit line on which the note 11 is drawn, operating much in the same way that a check or a credit card account works in today's banking industry. Credit notes 11 can represent a part of or all of the credit line of the account.

In the preferred embodiment, the credit notes 11 can only be transferred to another Transaction money module 4 by the owner of the account, and the receiver of a credit note 11 can only deposit it into his or her account as currency. From there, the credit note 11 is cleared with the currency at the Clearing Bank 3. The subscriber's bank recognizes the loan upon receipt of the cleared credit note 11.

When credit notes 11 are withdrawn, they do not trigger any accounting transactions in the preferred embodiment. Current credit line processing may need to be modified to keep track of the amount of the credit line in the subscriber's Transaction money module 4. Whenever the subscriber communicates with the Issuing Bank 1 maintaining the credit line, the amount of the credit line in the Transaction money module 4 is removed and replaced based on any adjustments to the credit line in the banking system 20. Total credit notes 11 plus outstanding loans must be less than or equal to the total amount of the credit line.

Electronic notes 11 are comprised of three collections of data fields, namely a Body group, a Transfer group, and a Signatures and Certificate group. The Body group of data fields includes the following information:

(1) the type of electronic note 11, i.e., whether it is a currency note 11 or a credit note 11;
(2) the Issuing Bank's 1 identifier;
(3) the monetary unit identifier;
(4) a Note identifier;
(5) its date-of-issue;
(6) its date-of-expiration;
(7) the subscriber's account number (used only for credit notes 11);
(8) the amount or value of the note 11; and
(9) the Money Generator module 6 identifier.

The Transfer group of data fields includes:

(1) a total of the number of times that the electronic note 11 was transferred; (provided for currency notes 11 only)

(2) a list of transfer records that indicate the date-of-transfer, the amount transferred and the identification number of the receiver.

The Signature and Certificates group of data fields includes:

(1) the digital signature of the Money Generator module 6;
(2) the Money Generator module 6 certificate;
(3) a list of payors which contains each payor's signature and certificate.

The body, transfer records, the signatures and the certificates of the chain of the transferred payments constitute the electronic note 11 sent. The remaining amount of the note 11 is recorded in the Note Directory 39 of the money module in which it is stored.

It is important to note that the authenticity of an electronic note 11 is determined by the validity of the digital signature of the Money Generator module 6, and the validity of the signatures of past payors (if present). Any inconsistencies in this information will cause the transfer of any electronic notes 11 to be aborted.

It is also important to note that as a security measure, a note 11 will be valid for a limited time, up to its expiration date. An expired note 11 cannot be transferred, it must be updated by transacting with a participating bank. To this end, whenever a Transaction money module 4 performs any transaction with a Teller money module 5, all of the electronic notes 11 stored in a Transaction money module 4 will be transferred to the Teller money module 5 so that the notes 11 may be replaced with updated ones before they expire. This security procedure also helps to keep offending notes 11 from being circulated broadly.

As will be understood, every time that a note 11 is transferred to another money module, a transfer record indicating to whom it is transferred is appended. Thus, the recipient of an electronic note 11 will also receive a record of all of the past holders of the note 11.

For example, a $50 electronic note 11 may be generated, and withdrawn by a Transaction money module 4. Assuming it is transferred to other money modules in $10, $10, and $30 denominations, the recipient money modules will receive the note 11 with the transfer record identifying the first Transaction money module 4. When a recipient of the $10 note 11 transfers $5 of it to a third party, the third party receives the note 11 along with the record indicating the previous two holders. Assuming this $5 note 11 is then deposited, a record of it will be matched with other segments of the original $50 note 11 that find there way back into the banking system by the clearing and reconciliation processes of the present embodiment.

Figure 51:
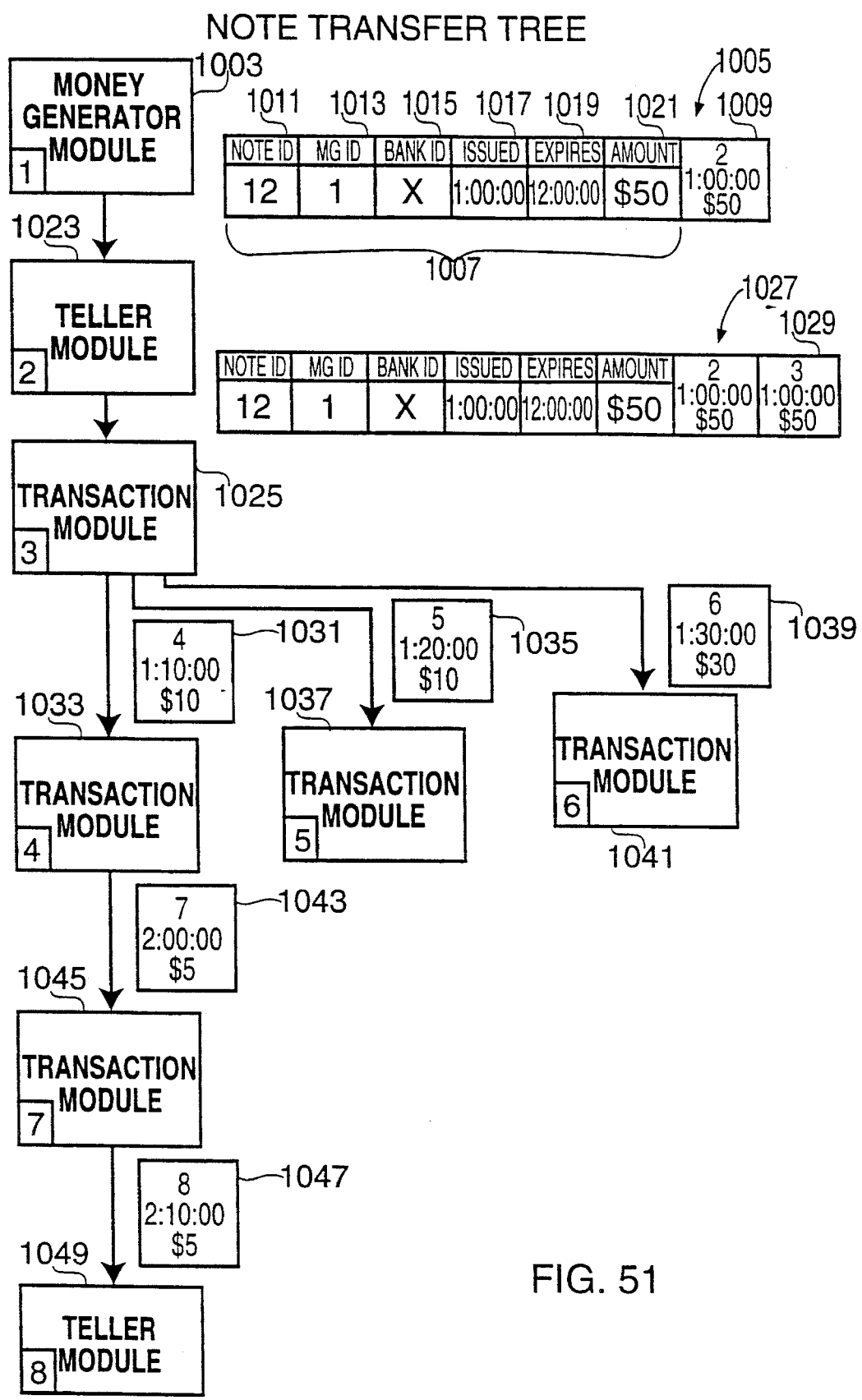
FIG. 51 shows an example of a note transfer tree.

In accordance with the previous example, FIG. 51 shows how the subsequent transfer of an electronic representation of currency produces a tree-like structure of electronic representations of currency derived from the initial note produced by the money generator module. The money generator module 1003 having identifier "1" (module identifiers are contained in digitally signed certificates) produces the electronic representation of currency 1005 having a body group of data fields 1007 and a transfer group of data fields 1009. The signatures and certificates group of data fields is not shown for convenience.

The body group of data fields 1007 includes a note identifier 1011 (e.g., "12"), a money generator module identifier 1013 (e.g., "1"), an issuing bank identifier 1015 (e.g., X), a date-of-issue 1017 (e.g., 1:00:00), a date-of-expiration 1019 (e.g., 12:00:00), a note amount and a monetary unit identifier 1021 (e.g., $50). Other body group data fields such as type of note are not shown for convenience.

The transfer group of data fields 1009 includes a transfer record having a transferee identification number (e.g., "2"), a date-of-transfer (e.g., 1:00:00), and a transfer amount (e.g., $50). The transfer group data field indicating total number of transfers is not shown for convenience. The various date fields in the electronic notes are shown for illustrative purposes as being in the form day:hr:min. Other time monitoring forms (e.g., including seconds) are, of course, possible.

The electronic representation of currency 1005 from money generator module 1003 is stored in teller module 1023 having identifier "2". As part of the withdrawal of $50 by transaction module 1025 having identifier "3", teller module 1023 forms electronic representation of currency 1027 by appending transfer record 1029 to a copy of the data fields in the electronic representation of currency 1005. The note 1027 is stored in transaction module 1025 upon completion of the withdrawal. For illustrative convenience, the remaining note transfers only show the newly appended transfer record portion of the transferred note.

At 1:10:00, transaction module 1025 pays $10 by transfer record 1031 to transaction module 1033 having identifier "4". At 1:20:00, transaction module 1025 pays $10 by transfer record 1035 to transaction module 1037 having identifier "5". At 1:30:00, transaction module 1025 pays $30 by transfer record 1039 to transaction module 1041 having identifier "6". At 2:00:00, transaction module 1033 pays $5 by transfer record 1043 to transaction module 1045 having identifier "7". At 2:10:00, transaction module 1045 deposits $5 by transfer record 1047 to teller module 1049 having identifier "8". Of course, alternatively transaction module 1045 could have deposited its electronic money in teller module 1023.

Only the receiver of the transferred note 11 can either deposit the note 11 or use it in payment. The Verifier 42 application of a money module is used to check the signature of each transfer, to determine if the note 11 is valid and to verify the identifier in the last transfer as the current holder of the note 11. This thwarts the new holder of a note 11 from trying to use a value greater than that which was transferred. It also inhibits copying notes 11 for use in another money module since the identifiers will not match.

As can be appreciated, a subscriber may be able to access certain information about the electronic notes 11 stored within the Transaction money module 4.

In particular, the subscriber may be able to select information on the total amount of the electronic notes 11 stored, the monetary unit of the notes 11, the type of electronic notes 11, i.e., currency or credit, and the denomination of each note 11.

System Security

The security of the system is maintained by the participating banks and the Certification Agency 28, which creates and distributes money module certificates. A certificate of a money module is actually the money module's identifier, its public key, a digital signature of the money module's identifier and public key using the certificatory key (described below), and the version of the certificatory key. The certificate is unique in that it is associated with only one particular money module.

The Certification Agency 28 provides a secure means for money modules to validate each other prior to transacting, first by controlling the money module certificate process and second, by distributing a list of bad money module identifiers.

In the preferred embodiment, the money module certificate will be initially loaded into the money module by the Certification Agency 28. The Certification Agency 28 generates the certificate for each money module using a certificatory key (a private key of the Certificatory Agency 28). It may be changed periodically and distributed under version control processes that are commonly used in the industry. As will be appreciated, every money module will store several versions of the certificatory key in order to verify certificates created by an older key. Because it is anticipated that certificates will expire over time, it is expected that only a few versions need be kept.

A certificate will only be valid for a limited period of time after its creation. Upon expiration of the certificate, the money module will not be allowed to transact with other money modules. Any money modules discovered to have been tampered with will be limited in the amount of damage that they can do to the system since their certificate will not be updated.

To block offending modules from transacting it is also desirable to have legitimate money modules receive the latest list of offending money modules soon after the list is updated. Naturally, this requires that Transaction money modules 4 access the Certification Agency 28 on a periodic basis to obtain the latest list. Placing a time limit on the Transaction money module's 4 ability to transact (in addition to the time limit placed on electronic notes 11) will force subscribers to access the Certification Agency 28 through the Network 25 on a periodic basis to receive the latest bad money module list along with a new certificate. Advantageously, the period of the certificate validity can be closely monitored and adjusted according to security needs.

Figure 9:
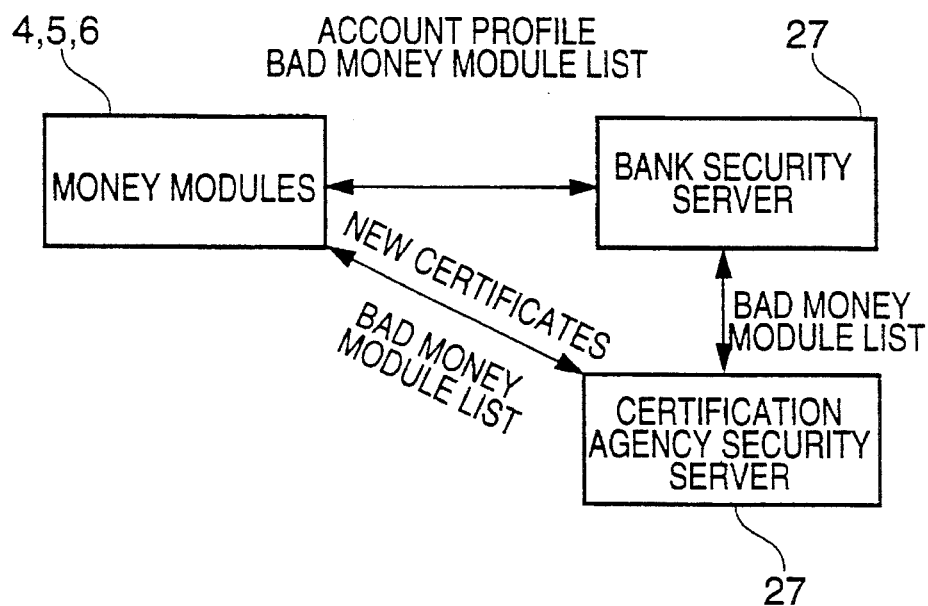
FIG. 9 is a flow diagram of the security system, according to the invention.

The Certification Agency 28 distributes its updated certificatory key and money module certificates on-line through the Security Server 27 (see FIG. 9). An important component of the system's security is provided by Security Servers 27 at the participating banks and Security Servers 27 at the Certification Agency 28.

Referring now to FIG. 10, a block diagram of a preferred embodiment of the Security Server 27 is shown. It is contemplated that the Security Server 27 at the Certification Agency 28 or on a bank's local network 18 will contain the following application functions:

(1) External Interface 54—a communications layer for connecting to a bank's local network 18 or the Certification Agency's local network 17;

(2) Session Manager 55—controls the security aspects of a transaction session;

(3) Create Certificate 50—certifies a certificate for any of the money modules;

(4) create Account Profile 51—certifies and signs a bank account profile (described in detail hereinafter) that allows a Transaction money module 4 to access the subscriber's different bank accounts;

(5) Distribute Certification Keys 52—distributes the Certification Agency's 28 list of valid public keys to the money modules;

(6) Bad Money Module Control 53—controls and distributes the list of bad money modules; and (7) Services—identical to the cryptographic functions 44, 45, 46 in the money modules described above Since certificates will expire over time, money modules will be required to apply for new certificates periodically. In order to receive a new certificate, the money module creates a new public key and private key. The new public key, the money module identifier and the old certificate are presented to the Certification Agency 28 after being digitally signed using the old private key.

The Certification Agency 28 checks the signature and if it is valid, signs the new public key and identifier and sends the certificate to the money module with a future expiration date. The Certification Agency's 28 Security Server 27 also distributes a list of bad money modules via the Network 25. Initially, each participating bank's Security Server 27 reports the identifiers of money modules which hold notes 11 invalidly or that are counterfeit. Those identifiers are passed through the Security Servers 27 and are compiled by the Certification Agency 28.

All such identifiers are distributed to the Teller and Money Generator modules 5, 6 respectively. A money module will not transact with another money module found on the list of bad money modules. Optionally, only those money modules which have demonstrated a flagrant breach of security will be distributed to Transaction money modules 4.

If a Transaction money module 4 is lost or stolen, the subscriber would report it to his/her bank or to the Certification Agency 28 so that the money module identifier may be placed on the bad money module list to inhibit any further transactions.

While the security of the system is provided by being able to block a money module from transacting, system security is also maintained by providing the expiration date on the electronic notes 11 in addition to the money module certificates.

As mentioned previously, a note 11 will be valid only for a limited time period after it is generated. Its date-of-expiration is a security parameter which may also be monitored and varied as needed. The period of validity of a note 11 can be varied by the value of the note 11. Preferably, a large note 11 will expire in a shorter time period than a smaller one. For example, a $1,000,000 note may be set to expire five days after the date of its creation since it would provide a significant incentive to counterfeit, while a $50 note 11 may be set to expire after a month from the date of its creation.

A Transaction money module 4 will not accept expired notes 11, but it can deposit or exchange expired notes 11 it may contain for new notes 11. The expiration dates are checked by the Verifier 42 and Clock/Timer 43 applications in a money module before any electronic note 11 is transferred. Separately, it is also anticipated that if the money module loses power then it will not be able to pay or exchange notes 11 after power has been regained until it has communicated again with the Network 25 and has its security parameters updated.

As stated above, a subscriber will typically obtain a Transaction money module 4 already loaded with a certificate. Securing the Transaction money module 4 itself to a subscriber may be accomplished by assigning it a unique PIN, biometrics or other personal secret characteristics.

Before any personalization of the money module 4 may proceed, the Transaction money module 4 checks if there is a bank account already stored in the To Teller 34 application or if the Notes 40 application contains any electronic notes 11. In either of these cases, the Transaction money module 4 will inhibit the subscriber from securing the module with new secret information.

If the Transaction money module 4 has no account numbers or no stored notes 11, then the subscriber can secure it by either entering a PIN, which is reverified by the Transaction money module 4, or by executing a process in which the Transaction money module 4 learns the subscriber's biometrics. Once the personalization has been completed, subscriber access to the Transaction money module 4 requires the successful completion of a sign-on in which the secret information is presented to the Transaction money module 4. If the subscriber can sign on to the Transaction money module 4, then he/she will be permitted to change PIN's or reintroduce biometrics.

In the situation where a subscriber has forgotten his/her PIN or had an incident which has affected his/her biometric reading, then the subscriber may take his/her Transaction money module 4 to a participating bank. A special transaction may be executed which deposits any electronic notes 11 in a holding account and destroys the stored bank account numbers. The subscriber can now enter new secret sign-on numbers and characteristics. Any electronic notes 11 that were removed are returned to the Transaction money module 4 and the bank account numbers may then be recreated (see Bank Access below).

It should be noted that it is not a requirement for a subscriber to identify himself to the system when he takes possession of a Transaction money module 4. Though the identity of the money module is contained in every transaction, the holder of a Transaction money module 4 can be kept secret. If the relationship is revealed then one could trace all of the transactions of a subscriber for the period that the relationship can be corroborated. The only time a subscriber must reveal his identity is if he/she links the money module to a bank account or wishes to redeem money lost.

If the subscriber chooses to use the Transaction money module 4 only for payments and foreign exchange then he/she can keep the relationship secret. As may be appreciated, the subscriber may also acquire a plurality of Transaction money modules 4 and, for example, link one to bank accounts and maintain the others for anonymous payments. The other Transaction money modules 4 may be loaded with notes 11 by exchanges with other money modules or by exchanging cash for electronic notes 11.

Replacement of Money Module Value

If a Transaction money module 4 malfunctions or is lost or stolen, it may be possible for the subscriber to recoup the value that was stored in the money module at the time of the incident. This would necessitate that the subscriber relinquish the option of anonymity for that money module, since upon making a claim for the lost money, he/she would have to verify that he/she is the owner of the Transaction money module 4.

To provide for the replacement of electronic notes 11, the subscriber may first link his/her Transaction money module 4 to a bank account or register ownership of the Transaction money module 4 with the Certification Agency 28. After every transaction involving the transfer of electronic notes 11, the subscriber could save the Tran Log, which identifies the counterparty money module identifier and the note identifier, to inexpensive, non-volatile storage which is removable from the host computing environment. This log may be presented by the subscriber when making a claim to replace value. The log may then be compared to reconciliation files to determine the true value of the lost electronic money.

An alternative to this procedure would be to refresh the money in the Transaction money module 4 frequently. This would mean that the notes 11 in the Transaction money module 4 would be represented by transaction records at the Issuing Banks 1. The existence of the notes 11 could be verified by scanning these files.

A third alternative would allow the system to capture a money module's Tran Log when money is refreshed. These records would be copied and routed to Issuing Banks 1 for storage on their transaction histories. The existence of the notes 11 could then be verified as in the previous alternative.

Bank Access

According to one aspect of the invention, a customer's Transaction money module 4 may access his/her accounts for deposits, withdrawals, transfers, etc., at any bank participating in the system and in particular any bank holding an account with the subscriber. For instance, a typical subscriber may have a savings account and a checking account at one of the participating banks, while maintaining a so-called money market account at a separate financial institution, and perhaps a credit-line account at a third participating bank. It is anticipated that a subscriber's Transaction money module 4 will access his/her accounts for deposits, withdrawals, loan payments and inquiries at any bank or financial institution which can be accessed through the Network 25.

If a subscriber has multiple accounts, the subscriber's account relationships with a bank will be stored in an account profile in the To Teller 34 application of the Transaction money module 4. The multiple accounts can be linked together by the personal account number ("PAN") associated with the individual subscriber.

The account profile may be created either in person, under the control of a bank subscriber service representative at a branch, or over the telephone utilizing a special dialogue. For example, the subscriber may identify himself by his PAN and PIN. He may then enter each account number he wishes to access from his Transaction money module 4. The account numbers may be verified in the bank's account reference files. A cross-reference of accounts to Transaction money modules 4 may be maintained by each bank if they so choose.

The composition of an exemplary account profile may be:

(1) Bank Identifier—one for each bank;

(2) Account Numbers;

(3) Account Types—e.g., checking, savings, credit; and (4) Security Server's 27 signature on the list of accounts.

It will be understood that the list of account numbers will be digitally signed by the bank Security Server 27. As a further security measure the account profile may be re-signed with an updated public key on a periodic basis. The fundamental access security is provided by the digital signature of the bank's Security Server 27.

Banking System (Accounting Architecture)

It is a notable feature of the preferred embodiment, that the method of the system can parallel the existing and varying types of accounting methods that exist today. The system of the preferred embodiment follows the various types of accounting methods practiced presently in various banks. However, it is important to note that unlike the present banking system, in the preferred embodiment of the invention, economic value is created on demand. Thus, there is no inventory of cash or checks involved: electronic currency from demand deposits and electronic credit are created on a real-time basis. This elimination of a paper inventory by using an electronic media of exchange requires certain supplements to the commonly practiced accounting techniques to provide the real-time accounting needed.

Accordingly, the embodiment of the present invention provides an accounting structure to supplement those used in the present banking systems 20. The improved accounting arrangement may be utilized to monitor the electronic money and each bank's obligation when a financial transaction between a Transaction money module 4 and a Teller money module 5 occurs, or when a Clearing Bank 3 performs any clearing processes.

When electronic notes 11 are transferred to or from a Teller money module 5, in most cases accounting transactions affecting the records of the banking system 20 are created. Conversely, transfers between Transaction money modules 4 do not involve any formal accounting procedures—they involve only the transfer of electronic notes 11.

In the system being described, it is anticipated that the following arrangements of accounts are to be utilized for each type of bank, categorized under each monetary unit:

At an Issuing Bank 1

(1) Money Issued Account: A liability account which reflects the money issued but not cleared.

(2) Money Due Account: An asset account reflecting the money deposited to the bank's accounts.

(3) Deposited at Clearing Bank Account: An asset account reflecting the balance of a clearing account at a Clearing Bank 3.

(4) Correspondent Bank Money Account: A liability account owned by a Correspondent Bank 2 which is drawn upon by the Correspondent Bank 2 to dispense electronic money.

(5) Money In Transit Account: A zero-balance liability account owned by each bank, which is used to temporarily maintain electronic money during a financial transaction.

(6) Foreign Exchange Account: A zero-balance liability account owned by each bank, which is used to handle multiple currency exchanges.

At a Correspondent Bank 2

(1) Deposited at Issuing Bank Account: An asset account reflecting the balance of the Correspondent Bank 2 account at the Issuing Bank 1.

(2) Money Due Account: An asset account reflecting the money deposited to the bank's accounts.

(3) Foreign Exchange Account: A zero-balance liability account owned by each bank, which is used to handle multiple currency exchanges.

(4) Money In Transit Account: A zero-balance liability account owned by each bank, which is used to temporarily maintain electronic money during a financial transaction.

At the Clearing Bank 3

(1) Issuing Bank Clearing Account: A liability account to net the amount of money cleared for an Issuing Bank 1.

The accounts, with their corresponding symbols, are summarized below:

| Type of Bank | Account Name | Type | Owner | Symbol |
| --- | --- | --- | --- | --- |
| Issuing | Money Issued | Liability | Issuing | MI |
|  | Money Due | Asset | Issuing | MD |

-continued

| Type of Bank | Account Name | Type | Owner | Symbol |
|---|---|---|---|---|
| | Deposited at Clearing Bank | Asset | Issuing | DC |
| | Correspondent Bank Money | Liability | Correspondent | CM |
| | Money In Transit | Liability | Issuing | IT |
| | Foreign Exchange | Liability | Issuing | FX |
| Correspondent | Deposited at Issuing Bank | Asset | Correspondent | DI |
| | Money Due | Asset | Correspondent | MD |
| | Money In Transit | Liability | Correspondent | IT |
| | Foreign Exchange | Liability | Correspondent | FX |
| Clearing | Clearing Account | Liability | Issuing | CA |

Transaction processing, for a transaction such as a request for a withdrawal from savings, selects accounting processes so that the appropriate accounts may be credited and debited accordingly. It is anticipated that the accounting processes will be using software programs and methods that are well known in the art and presently available; inasmuch as any of the programs and methods currently practiced and known for providing the foregoing accounting procedures would be suitable for use in the invention. To better understand the accounting processes of the invention, several examples of typical transactions and their associated accounting steps will be described.

Accordingly, FIGS. 11–24 illustrate the accounting transactions for deposits, withdrawals, foreign exchanges, receipt of cleared money, electronic money/cash exchanges, and note 11 updates. FIGS. 11–14 and 19–22 also illustrate the accounting flows when a Transaction money module 4 contains notes 11 that are not involved in the particular transaction that is occurring. The notes 11 that are not part of the transaction are removed and replaced with updated notes as discussed in the security procedures described above. For example, when a subscriber deposits less electronic money than is stored in his/her Transaction Money Module 4 and leaves a balance, the electronic notes 11 representing the balance are then replaced with electronic notes 11 containing the most up-to-date certificates. This latter case is indicated in the parenthetical entries on FIGS. 11–14 and 19–22.

In an example of the accounting arrangements according to the invention (illustrated by FIG. 11), if a subscriber were to deposit $50.00 out of $100.00 of electronic money contained in his/her Transaction money module 4 at a Correspondent Bank's Teller money module 5 (Step 1), the entire $100 of electronic money would be extracted of which $50.00 would first be credited to his/her customer account (herein denoted by "A"), the remaining $50.00 would be credited to the Correspondent Bank's Money In-Transit account, and $100 would be debited to the Money Due account at the Correspondent Bank 2. See "IT" and "MD" in FIG. 11.

After the $100 of electronic notes 11 is removed, the notes 11 are deposited from the Correspondent Teller money module 5 to the Teller money module 5 of an Issuing Bank 1 (Step 2). In accomplishing this transfer, the Money Due account at the Correspondent Bank 2 is credited $100 while its Deposited at Issuing Bank account is debited by $100; the Issuing Bank 1 credits its Correspondent Bank Money account by $100 and debits its Money Due account by $100.

In Step 3, the updated notes 11 are requested. Thus, the Correspondent Bank 2 requests from the Issuing Bank 1 the withdrawal of $50 of electronic money containing the most recent certificates from its Money Generator module 6. To support this request, $50 is credited to the Deposited at Issuing Bank account and $50 is debited from its Money In Transit account. The Issuing Bank 1 then debits $50 from its Correspondent Bank Money account and credits $50 to its Money Issued account.

To complete the transaction, the $50 is then transferred from the Money Generator module 6 to the Correspondent Bank's 2 Teller money module 5 through the Issuing Bank's 1 Teller money module 5, and finally to the Transaction money module 4 (Steps 4–6). The net result of all of these transactions is that $50 remains deposited in the subscriber's account and $50 of newly issued electronic notes 11 are now stored in the Transaction money module 4 of the subscriber.

Figure 11:
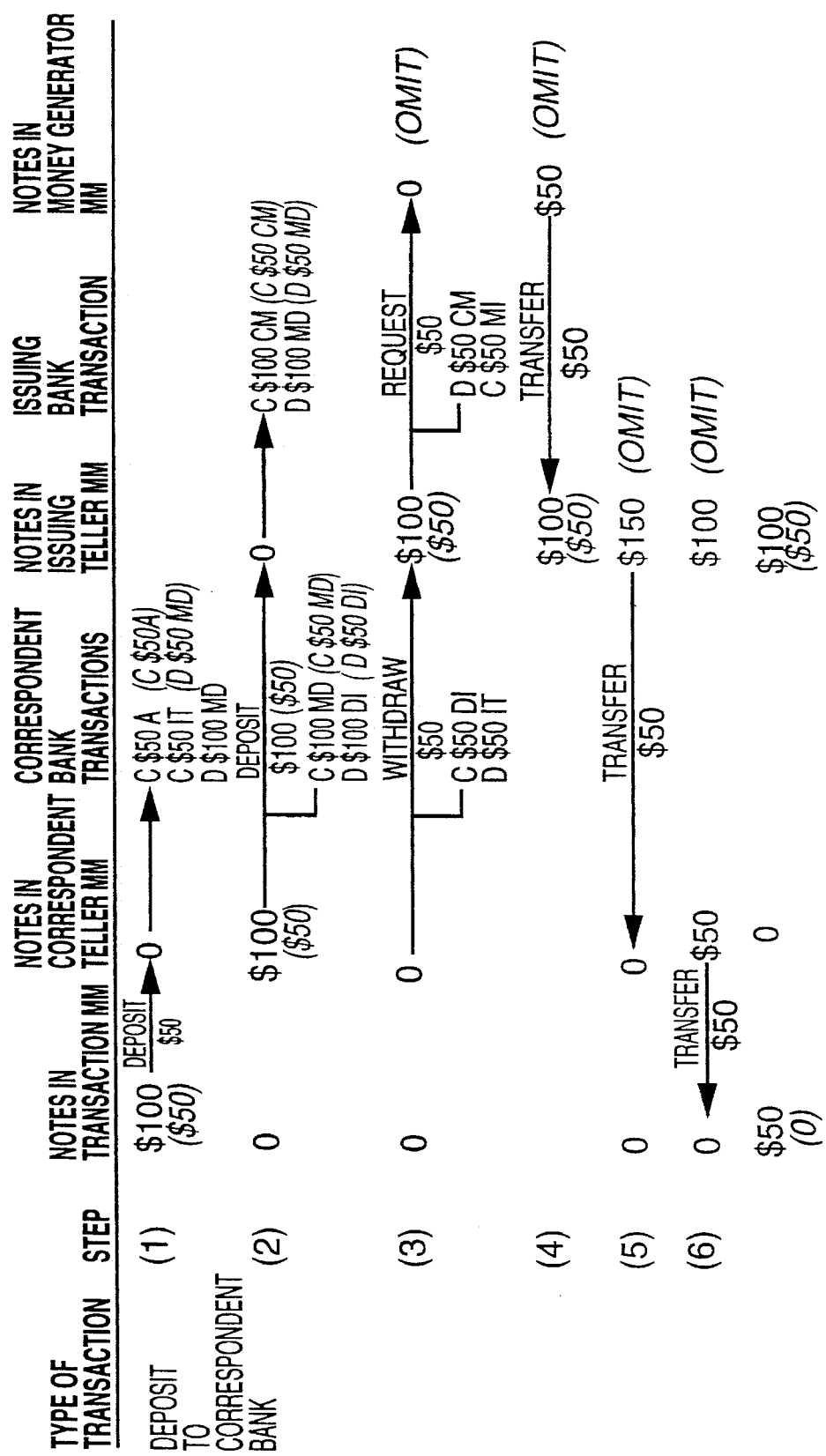

Alternatively, if a subscriber begins with $50 in his/her Transaction money module 4 and deposits all of it, the customer account would be credited $50 and the Money Due account would be debited by $50 (Step 1 of FIG. 11; parenthetical entries).

When there are only $50 of electronic notes 11 that are removed, the Correspondent Bank 2 credits the Money Due account $50 and the Deposited at Issuing Bank account is debited $50 (Step 2, parenthetical entries). This money is then deposited at the Issuing Bank 1 for later clearing, wherein the Correspondent Bank Money account is credited by $50 and the Money Due account is debited by $50. Because no updated electronic notes 11 need be returned in this situation, the deposit and its corresponding accounting is completed at Step 2.

Figure 12:
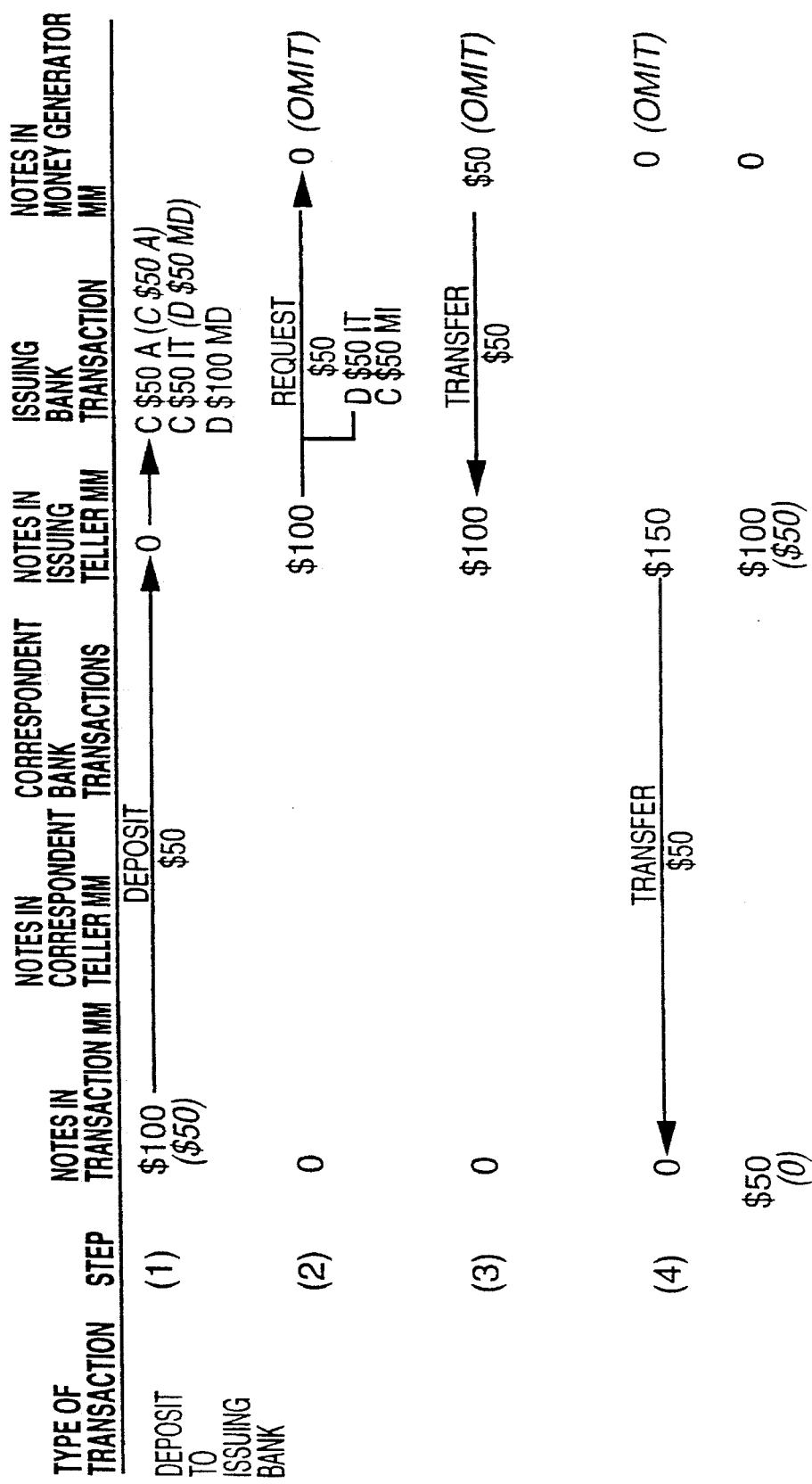

The accounting processes of an electronic money deposit at an Issuing Bank 1 instead of a Correspondent Bank involve fewer operational steps, which are illustrated in FIG. 12. Using the same dollar amounts as in the previous exemplary transaction, when $50 of $100 in electronic money stored in the Transaction money module 4 are deposited directly to an Issuing Teller money module (Step 1), $50 would be credited to the customers account (A). Fifty dollars would simultaneously be credited to the Money In Transit account, and $100 would be debited to the Money Due account at the Issuing Bank 1.

Since the entire $100 stored in the Transaction money module 4 is removed and transferred to the Issuing Bank's Teller money module 5, it is necessary to return $50 of updated notes to the Transaction money module 4. Accordingly, as shown in Step 2 the Teller money module 5 requests $50 from its Money Generator module 6, debiting its Money In Transit account by $50 and crediting its Money Issued account by $50.

In response, $50 is created by the Money Generator module 6 and transferred to the Teller money module 5, which in turn transfers this electronic money to the Transaction money module 4 (Steps 3–4).

When only $50 is stored in the Transaction money module 4 and all of it is deposited, the customer's account (A) is credited $50, the Money Due account is credited $50, and that is the end of it. See parenthetical entries in Step 1 in FIG. 12.

In the case of a withdrawal from a Correspondent Bank (see FIG. 13), a withdrawal request of $100 by a subscriber using a Transaction money module 4 at a Correspondent Bank 2 will cause the subscriber's account (A) to be debited by $100 and the Correspondent Bank's 2 Money In Transit account to be credited by $100 (Step 1). The request for the $100 withdrawal is forwarded to the Issuing Bank 1 from the Correspondent Bank 2, and the Correspondent Bank's Deposited at Issuing Bank account is credited by $100 while its Money In Transit account is debited by $100 (Step 3).

Next, the request for $100 is forwarded by the Issuing Bank's 1 Teller money module 5 to the Money Generator module 6. Accordingly, the Correspondent Bank Money account gets a $100 debit while the Money Issued account gets a $100 credit (Step 4).

The Money Generator module 6 then creates the $100 of electronic notes 11, and transfers it to the Transaction money module 4 via the Issuing Bank's 1 Teller money module 5 and the Correspondent Bank's 2 Teller money module 5 (Steps 5–6).

When, e.g., the subscriber makes the $100 withdrawal request with a Transaction Money Module 4 that contains $50 of electronic notes 11, the notes 11 are removed and now the Money Due account is debited $50, the subscriber's account is still debited $100, and the Money In Transit account is credited $150 (parenthetical entries, Step 1).

The $50 is then deposited to an Issuing Bank 1, causing the Money Due account to be credited $50 and the Deposited at Issuing Bank account to be debited by $50. At the Issuing Bank 1, the Correspondent Bank Money account is credited $50 while the Money Due account is debited $50 (Step 2, parenthetical entries).

Because $50 of notes 11 have been removed, the withdrawal request in Step 3 must be for $150. This request causes the Deposited at Issuing Bank account to by credited by $150 and the Money In Transit account to be debited by $150 (Step 3 parenthetical entries).

At the Issuing Bank, $150 is requested from the Money Generator Module 6 and the Correspondent Bank Money account gets a $150 debit while the Money Issued account gets a $150 credit (Step 4 parenthetical entries). As above, the money generated by the Money Generator Module 6 ($150) gets conveyed to the Transaction money module 4 via the Issuing Bank 1 and Correspondent Bank 2 Teller money modules 5 (Steps 5–6, parenthetical entries).

Figure 14:
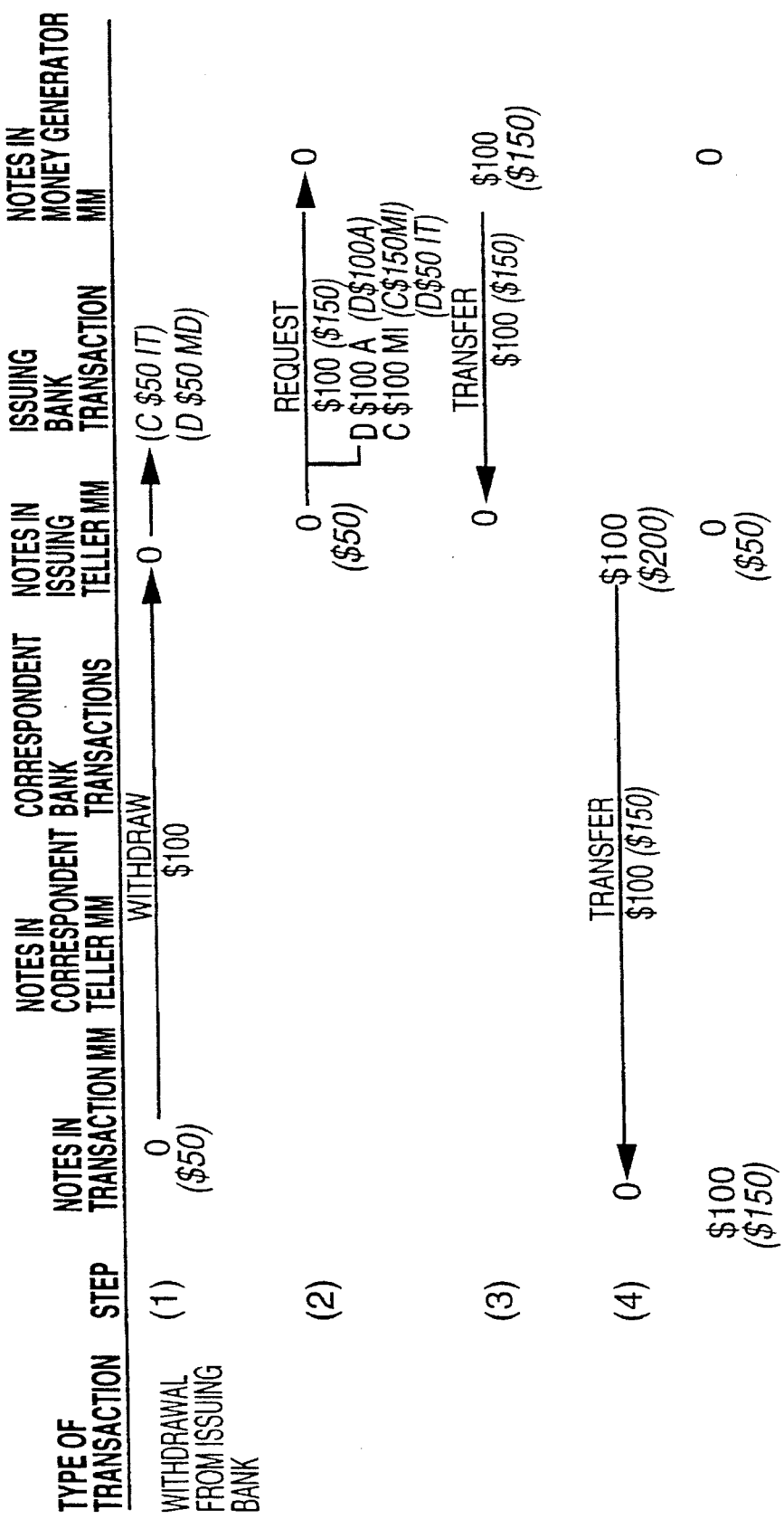

A withdrawal from an Issuing Bank X involves fewer accounting procedures. Referring now to FIG. 14, a withdrawal request by a Transaction money module 4 from an Issuing Bank 1, will cause the Issuing Bank 1 Teller money module 5 to debit the subscriber's account (A) by $100 and credit its Money Issued account by $100 (Steps 1–2).

A request for an updated $100 is then made by the Issuing Bank's 1 Teller money module 5 to the Money Generator module 6, which upon its creation will return $100 to the Issuing Bank's Teller money module 5 (Step 3). In completing the transaction, the Issuing Bank's 1 Teller money module 5 simply transfers this new $100 containing the most recent certificate to the Transaction money module 4 (Step 4).

Alternatively, when the Transaction money module contains $50 at the time of the $100 withdrawal, (parenthetical entries) the $50 will be removed, the Issuing Bank's Money In Transit account will be credited $50 and the Money Due account will be debited $50 (Step 1).

The Issuing Bank 1 must now request $150 from the Money Generator module 6. Naturally, the customer's account is debited $100. The Money Issued account is credited by $150 when the new notes 11 are created, and the Money In Transit account is debited $50 (Step 2). From there, $150 is returned to the Transaction money module 4 via the Issuing Bank's 1 Teller money module 5 (Steps 3–4).

Figure 15:
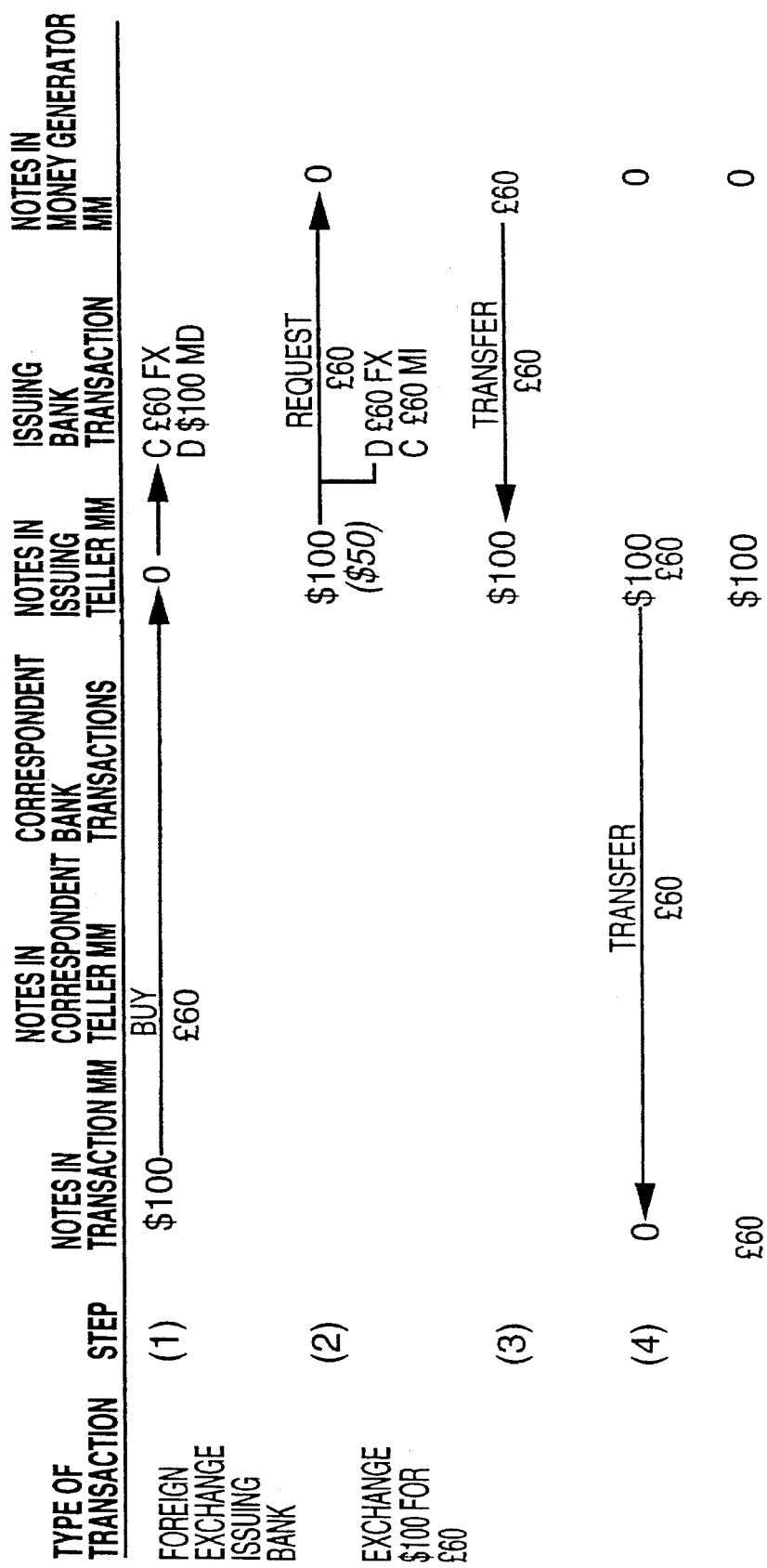

FIG. 15 illustrates the case of a foreign exchange with an Issuing Bank 1. In this example, a subscriber wishes to exchange $100 of electronic money stored in his/her Transaction money module 4 for £60 of British currency. The deposit at the Issuing Bank's 1 Teller money module 5 will cause the Issuing Bank's 1 Foreign Exchange account to be credited by £60, while its Money Due account would be debited by $100 (Step 1). Here, the $100 is transferred from the Transaction money module 4 to the Teller money module 5, which then requests that an electronic note 11 representing £60 be created by the Money Generator module 6 (Step 2).

At the Issuing Bank 1, the foreign exchange account is now debited by £60 while the Money Issued account is credited by £60. The £60 electronic note 11 created by the Money Generator module 6 is transferred to the Teller money module 5, which now stores both the $100 and the £60 (Step 3). The £60 is then transferred from the Teller money module 5 to the Transaction money module 4 resulting in a net balance of £60 in the Transaction money module 4 and $100 remaining in the Teller money module 5, completing the transfer (Step 4).

Figure 16:
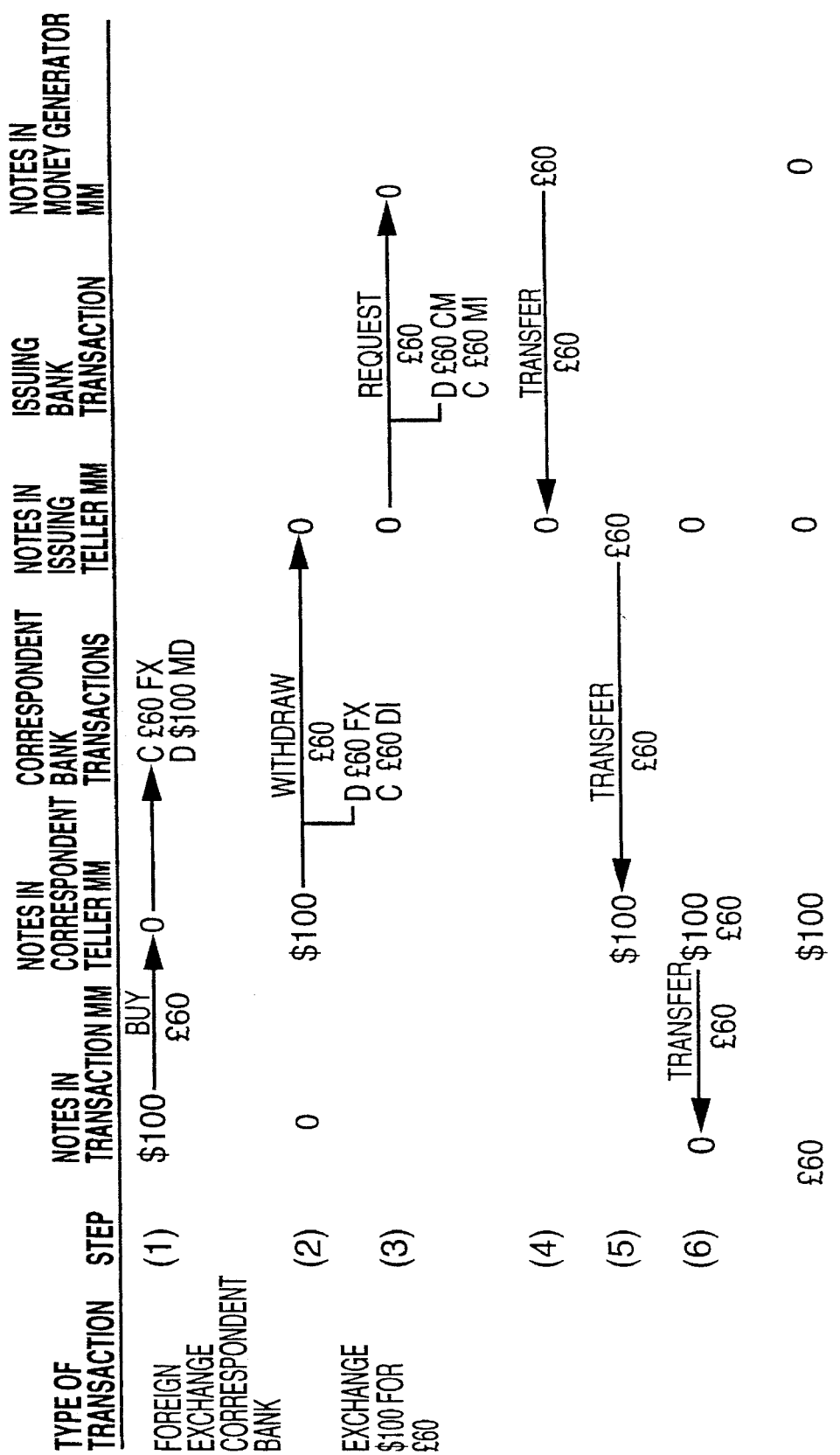

The accounting procedures for a foreign exchange of $100 for £60 at a correspondent Bank 2 are shown in FIG. 16. The Transaction money module 4, in this example, requests that its $100 be used to "purchase" £60 from the Correspondent Bank's Teller money module 5, which causes the Correspondent Bank's Foreign Exchange account to be credited by £60 while its Money Due account is debited by $100 (Step 1). The $100 stored in the Transaction money module 4 is transferred to the Correspondent Bank's 2 Teller money module 5, which sends a request to the Issuing Bank's 1 Teller money module 5 to withdraw £60, and debits its Foreign Exchange account by £60 and credits its Deposited at Issuing Bank account by £60 (Step 2).

The corresponding account transaction at the Issuing Bank 1 debits the correspondent Bank Money account by £60 and credits the Money Issued account by £60 (Step 3). The Issuing Bank's Teller money module 5 then requests that the Money Generator module 6 create £60 and transfer it to the Issuing Bank's Teller money module 5, which in turn transfers it to the Correspondent Bank's 2 Teller money module 5 (Steps 4–5). From there, the £60 note 11 is transferred to the Transaction money module 4, leaving it with a balance of £60 while the Correspondent Bank's 2 Teller money module 5 finishes with a balance of $100 (Step 6).

Figure 17:
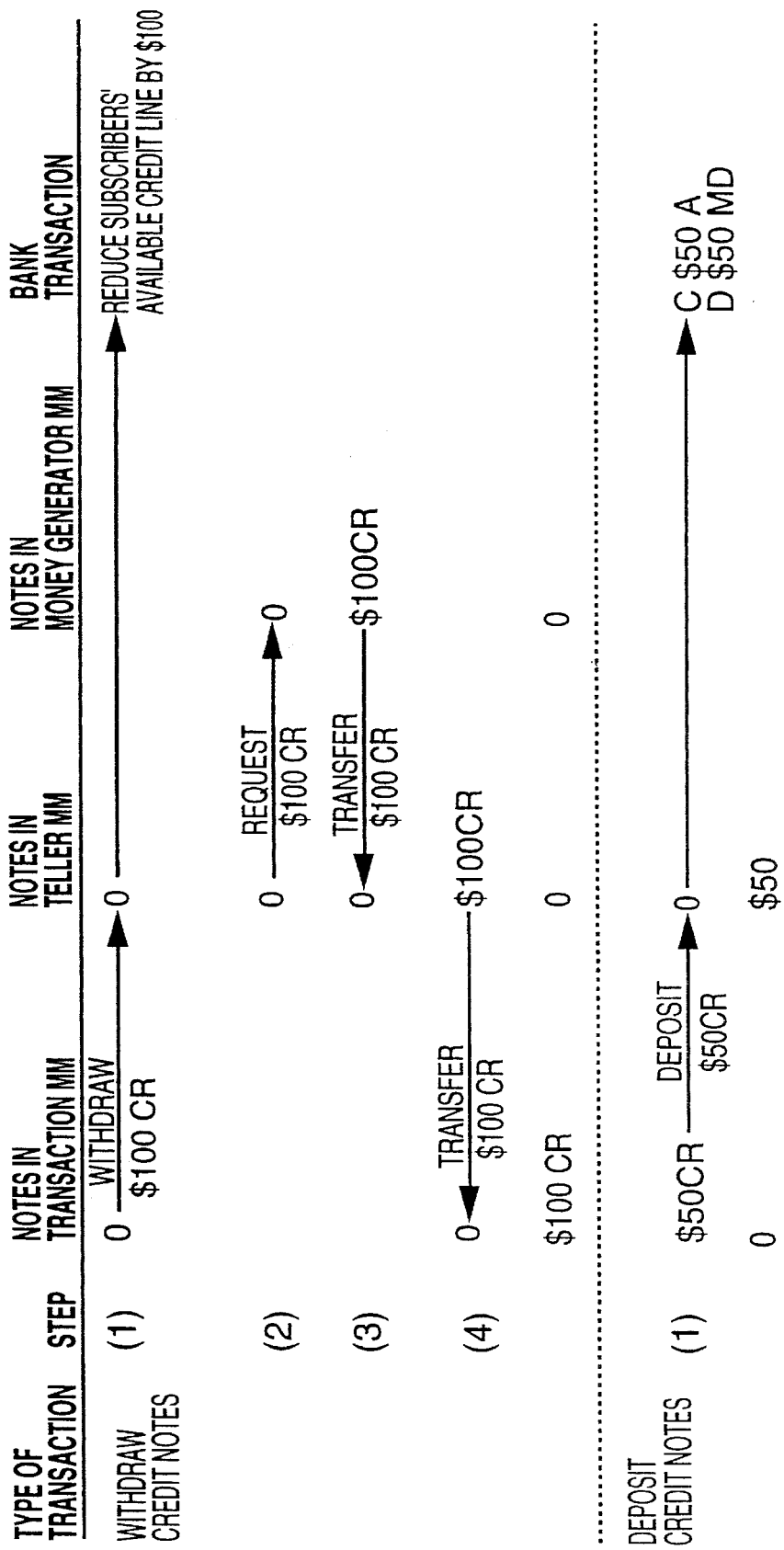

The accounting transactions for a withdrawal or deposit of credit notes 11 also involves several accounting operations, as shown in FIG. 17. When a subscriber wishes to withdraw money from his/her credit line (Step 1), the proper credit note 11 is simply transferred from the Money Generator module 6 to the Transaction money module 4, reducing the customer's available credit line by an equal amount to the amount transferred (Steps 2–4).

Alternatively, when credit notes 11 are deposited by a subscriber's Transaction money module 4, the subscriber's account is increased by the amount deposited, and the Money Due account is debited by an equal amount (Step 1).

The accounting operations involving the Issuing Bank's 1 receipt of cleared electronic money will now be described. Referring to FIG. 18, in this example $100 of electronic money and $100 of credit notes 11 have been cleared by the Clearing Bank 3 to settle the balances among several Issuing Banks 1. The $100 of electronic money and the $100 of credit notes are transferred to the proper Issuing Bank 1 (Step 1). Additionally, $50 of electronic notes 11 that it has issued are also deposited at the Issuing Bank 1. Consequently, the Issuing Bank 1 will debit the subscriber's account A by $100, debit the Issuing Bank's Money Issued account by $150, credit the Money Due account by $50 and credit the Issuing Bank's Deposited at Clearing Bank account by $200 to complete the transaction.

Figure 19:
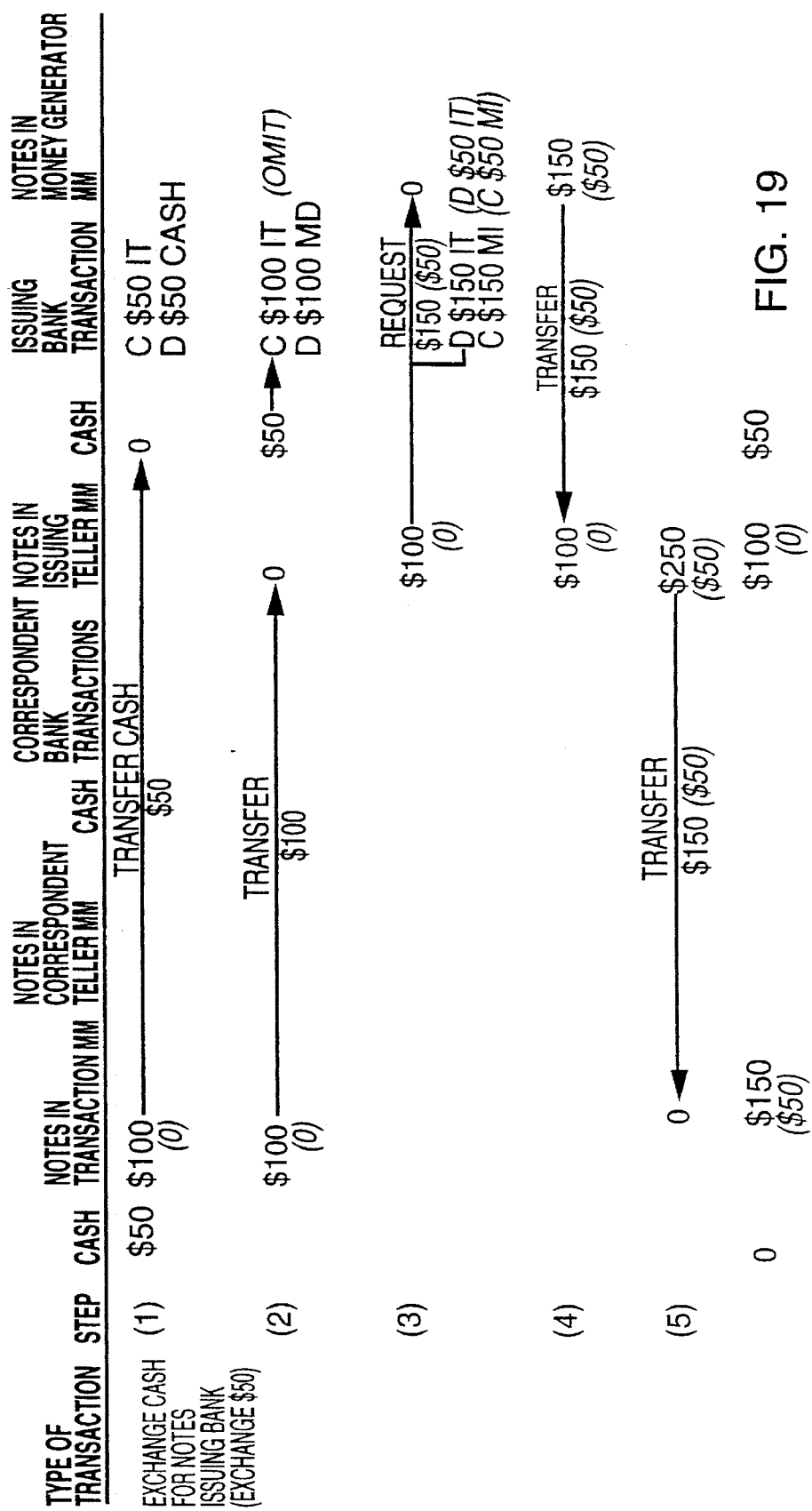

Turning now to FIG. 19, an accounting example of an exchange of cash for electronic notes 11 at an Issuing Bank 1 is shown. In this example, the subscriber wishes to exchange $50 of cash for $50 of electronic notes 11 to add to the $100 of electronic notes 11 already stored in his/her Transaction money module 4.

In the first transaction, the $50 of cash is deposited at the Issuing Bank 1 which causes the Money In Transit account to be credited by $50, while the cash account is debited by $50 (Step 1).

Next, the $100 of electronic notes 11 in the Transaction money module 4 is removed, resulting in the Money In Transit account being credited by $100, while the Money Due account is debited by $100 (Step 2).

The Teller money module 5 will now request $150 of electronic notes 11 from the Money Generator module 6 to return $150 of electronic notes 11 to the subscriber (Step 3). Accordingly, the Money In Transit account is debited by $150 while the Money Issued account is credited by $150.

The newly generated $150 of electronic notes 11 is then transferred from the Money Generator module 6 to the Teller money module 5, which in turn transfers the $150 to the subscriber's Transaction money module 4 (Steps 4–5). The completed transaction leaves the subscriber with $150 of electronic notes 11 and the Issuing Bank's Cash account containing a $50 balance.

Also shown parenthetically in FIG. 19 is the case when the subscriber exchanges $50 of cash for electronic notes 11 when there is a zero balance in his/her Transaction money module 4. In Step 1, the $50 of cash is deposited at the Issuing Bank 1 which causes the Money In Transit account to be credited by $50, while the cash account is debited by $50. Since no notes 11 are removed, no accounting is performed in Step 2.

In Step 3, only $50 is requested from the Money Generator module 6, and the Money In Transit account is debited by $50 while the Money Issued account is credited by $50. The same transfer between money modules occurs as in Steps 4–5 of FIG. 19 described above, using only the $50 that was requested. This would leave the subscriber with $50 of electronic notes 11 in lieu of his original $50 of paper money.

Figure 20:
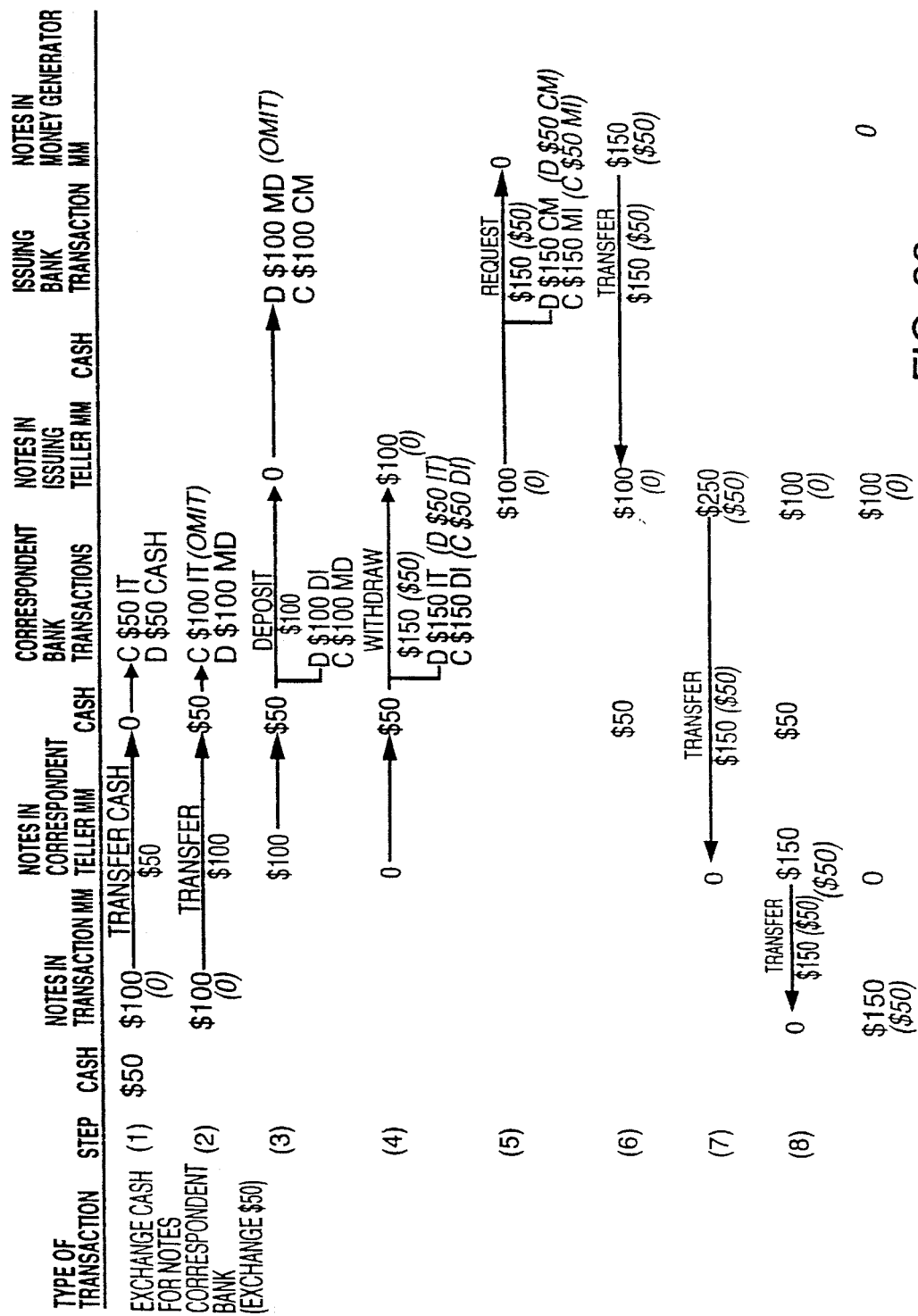

In FIG. 20, an exchange of cash for electronic notes 11 at a Correspondent Bank 2 is shown. This example uses the same parameters as in FIG. 19, namely, the subscriber has $50 of cash and $100 of electronic notes 11 in his Transaction money module 4.

When the $50 in cash is deposited to the Correspondent Bank 2, its Money In Transit account is credited $50 while its Cash account is debited $50 (Step 1). The $100 of electronic notes 11 is then transferred from the Transaction money module 4 to the Correspondent Bank 2 which credits its Money In Transit account by $100 and debits its Money Due account by $100 (Step 2).

From there, the $100 of electronic notes 11 is deposited at the Issuing Bank 1, wherein its Money Due account is debited by $100 while its Correspondent Bank Money account is credited by $100 (Step 3). At the Correspondent Bank 2, the Deposited at Issuing Bank account is debited by $100 while the Money Due account is credited by $100.

A withdrawal request is then made by the Correspondent Bank 2 for $150 from the Issuing Bank 1 (Step 4). This request results in the Correspondent Bank 2 debiting its Money In Transit account by $150 and crediting its Deposited at Issuing Bank account by $150.

Correspondingly, the Issuing Bank 1 Teller money module 5 requests $150 of notes 11 from the Money Generator Module 6, debits its Correspondent Bank Money account by $150 and credits its Money Issued account by $150 (Step 5).

Finally, the $150 of electronic notes 11 is transferred from the Money Generator module 6 to the Issuing Bank's 1 Teller money module 5 which transfers it to the Transaction money module 4 after passing through the Correspondent Bank's 2 Teller money module 5 (Steps 6–8).

Alternatively, a subscriber having $50 of cash and no notes 11 in his/her Transaction money module 4 is also shown in FIG. 20. As in the first case, the $50 in cash is deposited to the Correspondent Bank 2, its Money In Transit account is credited $50 while its Cash account is debited $50 (Step 1).

A $50 withdrawal request is then made to the Issuing Bank 1, and the Money In Transit account is debited by $50 while the Deposited at Issuing Bank account is credited $50 (Step 4, parenthetical entry). Thereafter, $50 is requested from the Money Generator Module 6, the Correspondent Bank Money account is debited $50 and the money issued account is credited $50 in Step 5 (parenthetical entry). Here, $50 in electronic notes 11 are transferred through the same money module path as Steps 6–8 above, to reach the Transaction money module 4.

Figure 21:
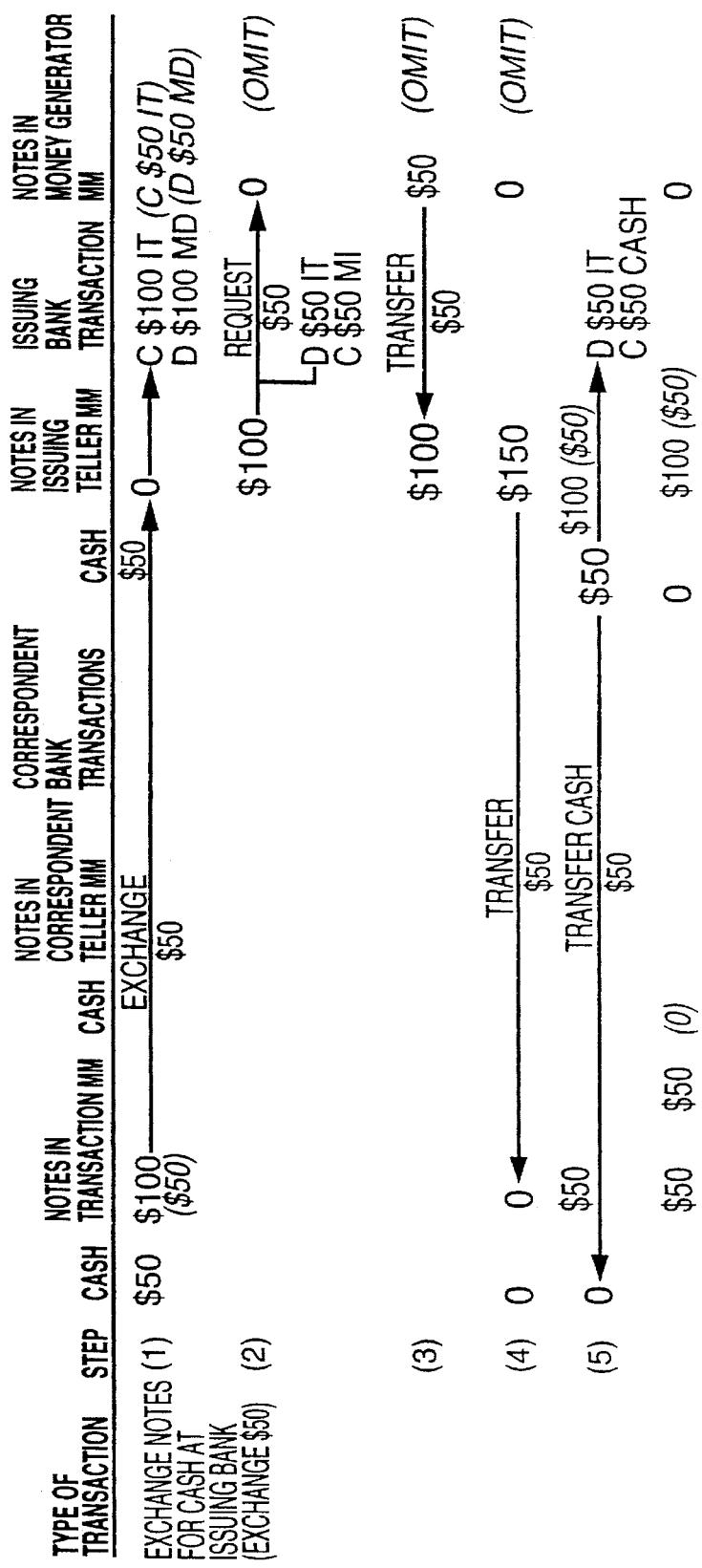

FIG. 21 illustrates the exchange of electronic notes 11 for cash at an Issuing Bank 1. Here the subscriber has $100 of electronic notes 11 stored in his/her Transaction money module 4 and wishes to exchange $50 of the electronic notes 11 for $50 of paper cash.

After the Transaction money module 4 establishes communications with the Issuing Bank's 1 Teller money module 5, all $100 of the electronic notes 11 is removed from the Transaction money module 4 (Step 1). This causes the Money In Transit account to be credited by $100 and the Money Due account (at the Issuing Bank 1) to be debited by $100.

The Teller money module 5 then requests $50 of updated electronic notes 11 from the Money Generator module 6, and this transaction requires the Money In Transit account to be debited by $50 and the Money Issued account to be credited by $50 (Step 2). The newly generated $50 of electronic notes 11 is then transferred to the Transaction money module 4 through the Teller money module 5. The $50 of paper cash is then transferred to the subscriber through a Teller or ATM (Steps 3–5).

Also shown in this figure (parenthetically) is the subscriber making the same exchange for cash when only $50 is stored in his/her Transaction Money Module 4. At the Issuing Bank, $50 of electronic notes 11 is removed for which the Money In Transit account is credited $50 and the Money Due account is debited $50. Fifty dollars of paper cash is then returned to the subscriber since he/she only deposited $50 of electronic notes 11 (Step 5).

Completing this transaction, in both cases the Money In Transit account is debited by $50 while the cash account at the Issuing Bank 1 is credited by $50. The net result is that the subscriber ends up with $50 of paper cash and, in the former case only, $50 of updated electronic notes 11 in his/her Transaction money module 4.

Figure 22:
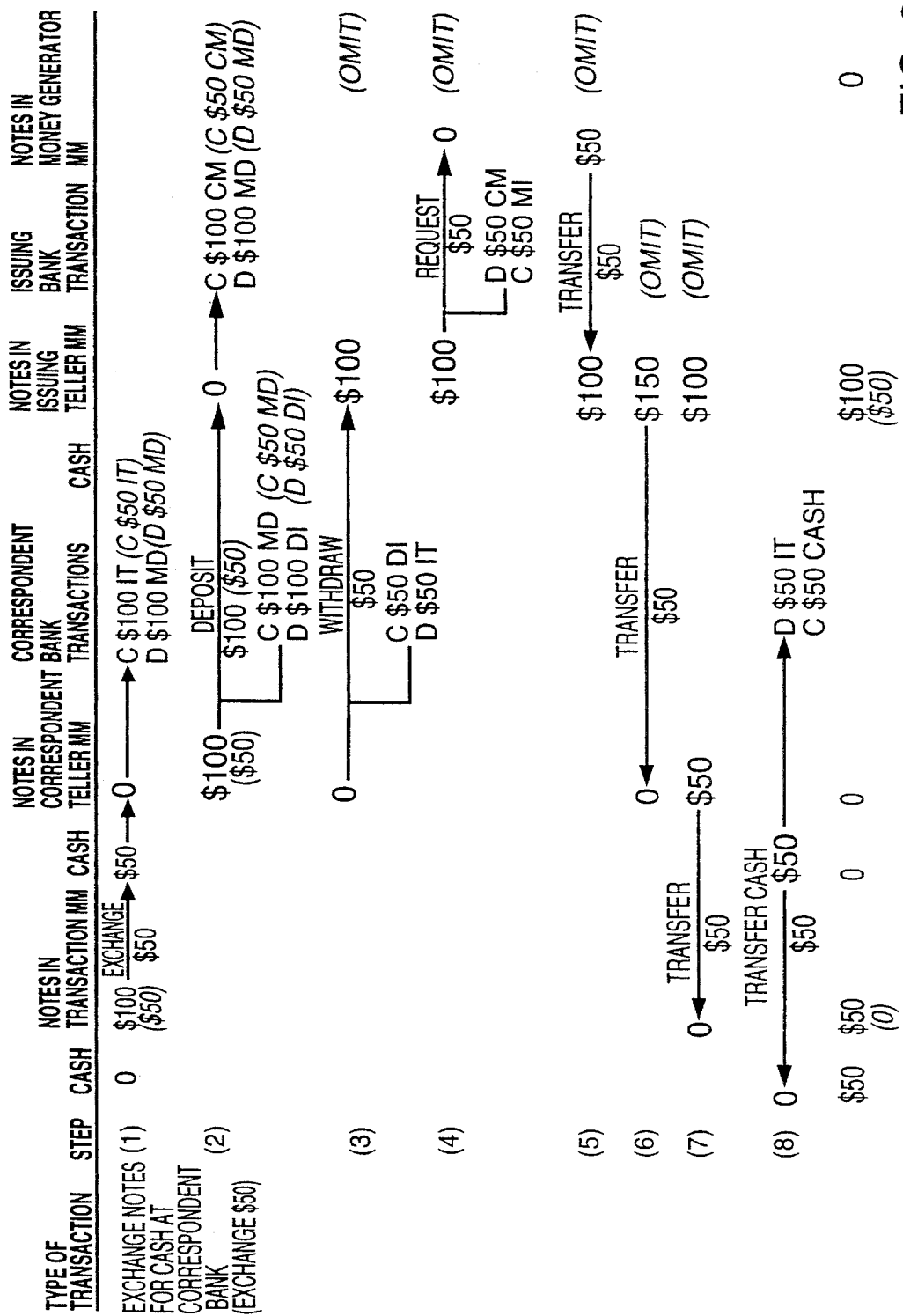

The exchange of electronic notes 11 for paper cash at a Correspondent Bank 2 is illustrated in FIG. 22. As in the example illustrated in FIG. 21, although the subscriber is only exchanging $50 of electronic notes 11, all $100 of electronic notes 11 are transferred from the subscriber's Transaction money module 4 (Step 1).

After the notes 11 are transferred, the Correspondent

Bank's 2 Teller money module 5 credits its Money In Transit account by $100 and debits its Money Due account by $100. This $100 of electronic notes 11 is now deposited at an Issuing Bank 1, causing the Correspondent Bank 2 to credit its Money Due account by $100 while debiting its Deposited at Issuing Bank account by $100 (Step 2).

At the Issuing Bank 1, $100 is credited to the Correspondent Bank Money account while $100 is debited to the Money Due account. The Correspondent Bank 2 now makes a request to withdraw $50 of electronic notes 11 from the Issuing Bank 1 (Step 3). Consequently, the Deposited at Issuing Bank account is credited by $50 while the Money In Transit account at the Correspondent Bank 2 is debited by $50.

Now, the Issuing Bank's 1 Teller money module 5 requests $50 from the Money Generator module 6 and debits its Correspondent Bank Money account by $50 while crediting its Money Issued account by $50 (Step 4). The $50 of updated electronic notes 11 is transferred from the Money Generator module 6 through Issuing Bank 1 Teller money module 5 and the Correspondent Bank 2 Teller money module 5, back to the Transaction money module 4 in Steps 5–7.

Also illustrated is this same example with only $50 stored in the Transaction money module 4, which is deposited at a Correspondent Bank 2, to be exchanged for paper money. For this deposit, the Money In Transit account is credited $50, and the Money Due account is debited $50 (Step 1). The $50 is then deposited by the Correspondent Bank 2 to its account at the Issuing Bank 1. At the Correspondent Bank 2, the Money Due account receives a $50 credit, while the Deposited at Issuing Bank account receives a $50 debit. On the Issuing Bank 1 side, it credits the Correspondent Bank Money account by $50 and debits the Money Due account by $50 after receiving the $50 deposit (Step 2).

In both illustrations, fifty dollars of paper cash is then transferred from the Correspondent Bank 2 to the subscriber, while the Correspondent Bank 2 debits its Money In Transit account by $50 and credits its cash account by $50 (Step 8). The subscriber is now left with $50 of paper cash and, in the first illustration, $50 of electronic notes 11 stored in his/her Transaction money module 4.

Figure 23:
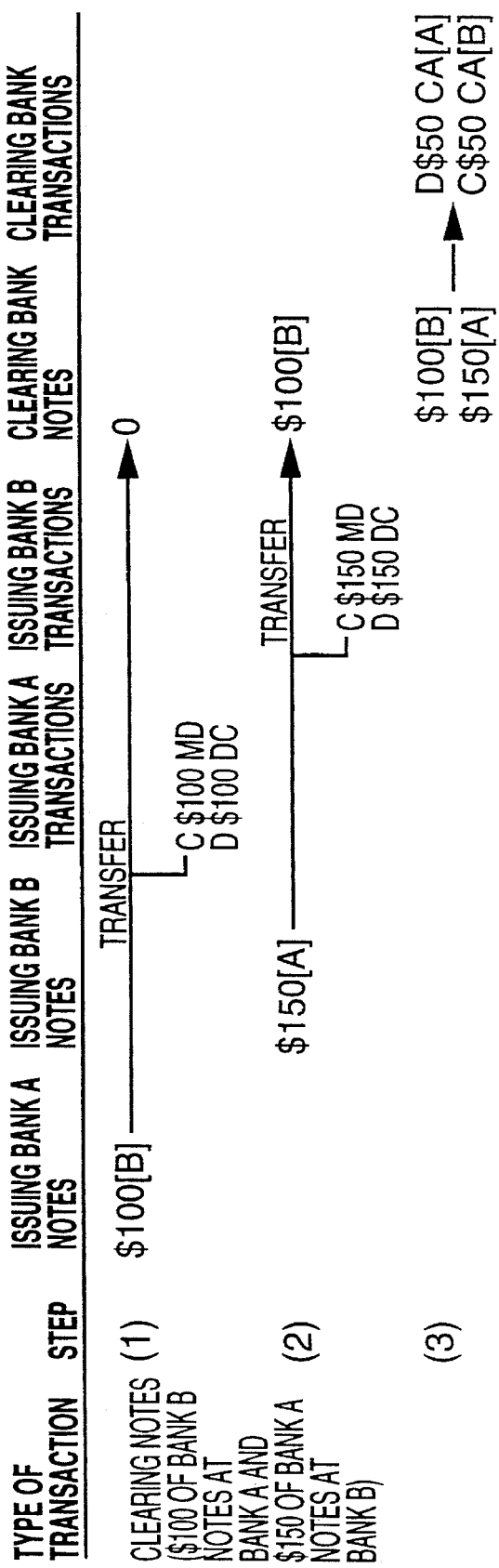

In FIG. 23, the accounting process for clearing the electronic money issued by different Issuing Banks is shown. This illustration uses an example in which $100 of electronic notes 11 issued by Bank B has been deposited at Issuing Bank A, and $150 of electronic notes 11 issued by Bank A have been deposited at Issuing Bank B.

In Step 1, Issuing Bank A transfers the $100 issued by Bank B to the Clearing Bank 3. It then credits its Money Due account by $100 and debits its Deposited at Clearing Bank account by the same amount. In Step 2, Issuing Bank B transfers the $150 of Issuing Bank A's money to the Clearing Bank 3. Its Money Due account is credited by $150, while its Deposited at Clearing Bank account is debited $150.

In sum, $50 is due to Bank B. Accordingly, $50 gets debited to the Clearing account of Bank A, while $50 gets credited to the clearing account of Bank B (Step 3).

Figure 24:
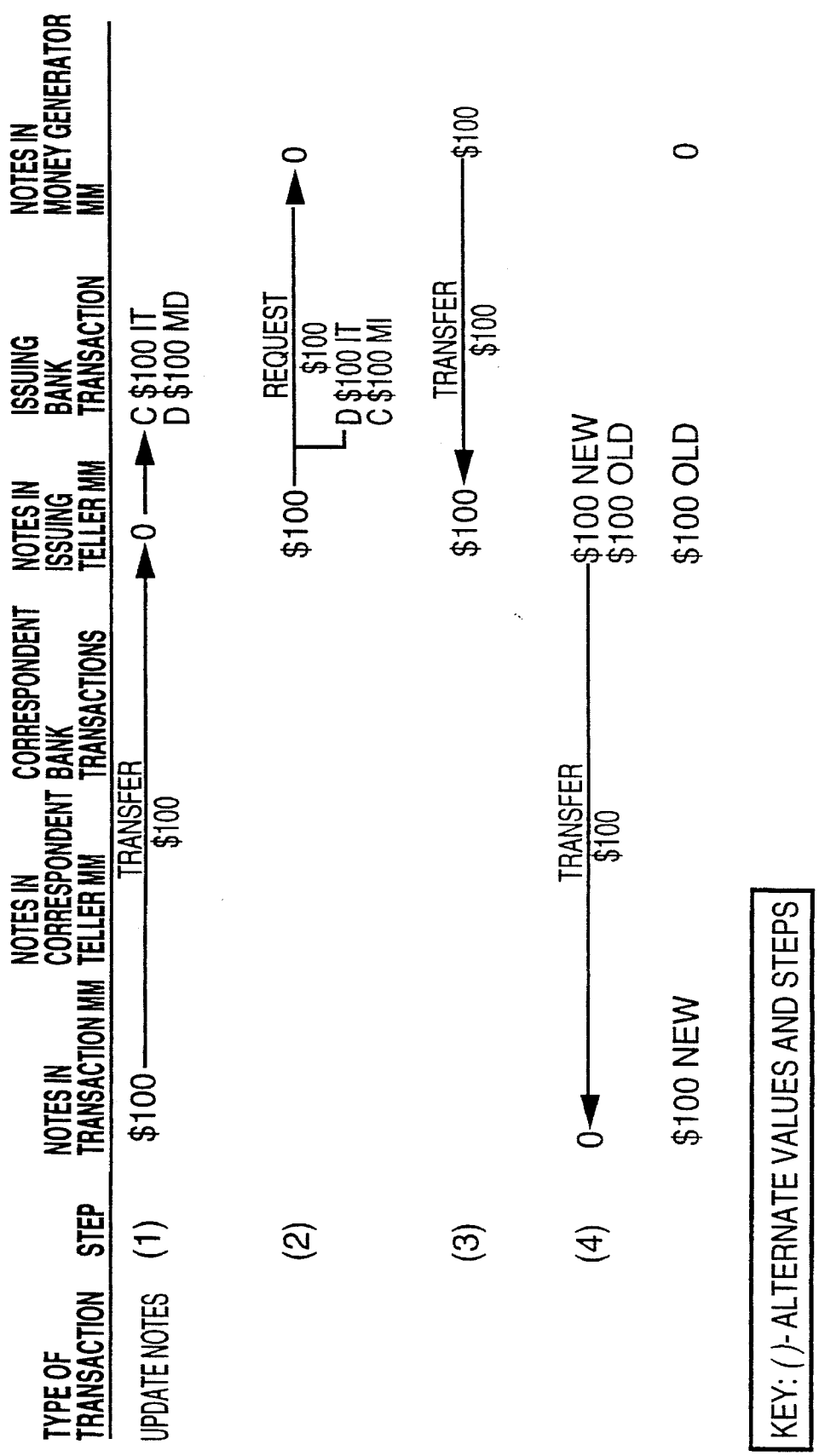

In FIG. 24, the accounting transactions corresponding to updating electronic notes 11 is shown. Here, $100 of electronic notes 11 are stored in a Transaction money module 4 and are transferred to an Issuing Bank 1, where $100 is credited to the Money In Transit account and $100 is debited to the Money Due account (Step 1).

One hundred dollars of electronic notes 11 are requested from the Money Generator module 6 causing the Money In Transit account to be debited by $100 while the Money Issued account is credited by $100 (Step 2). With this accomplished, the $100 of electronic notes 11 is transferred from the Money Generator module 6 to the Issuing Bank's 1 Teller money module 5, which in turn transfers the money to the subscriber's Transaction money module 4 (Steps 3–4).

Reconciliation and Clearing Systems

Figure 25:
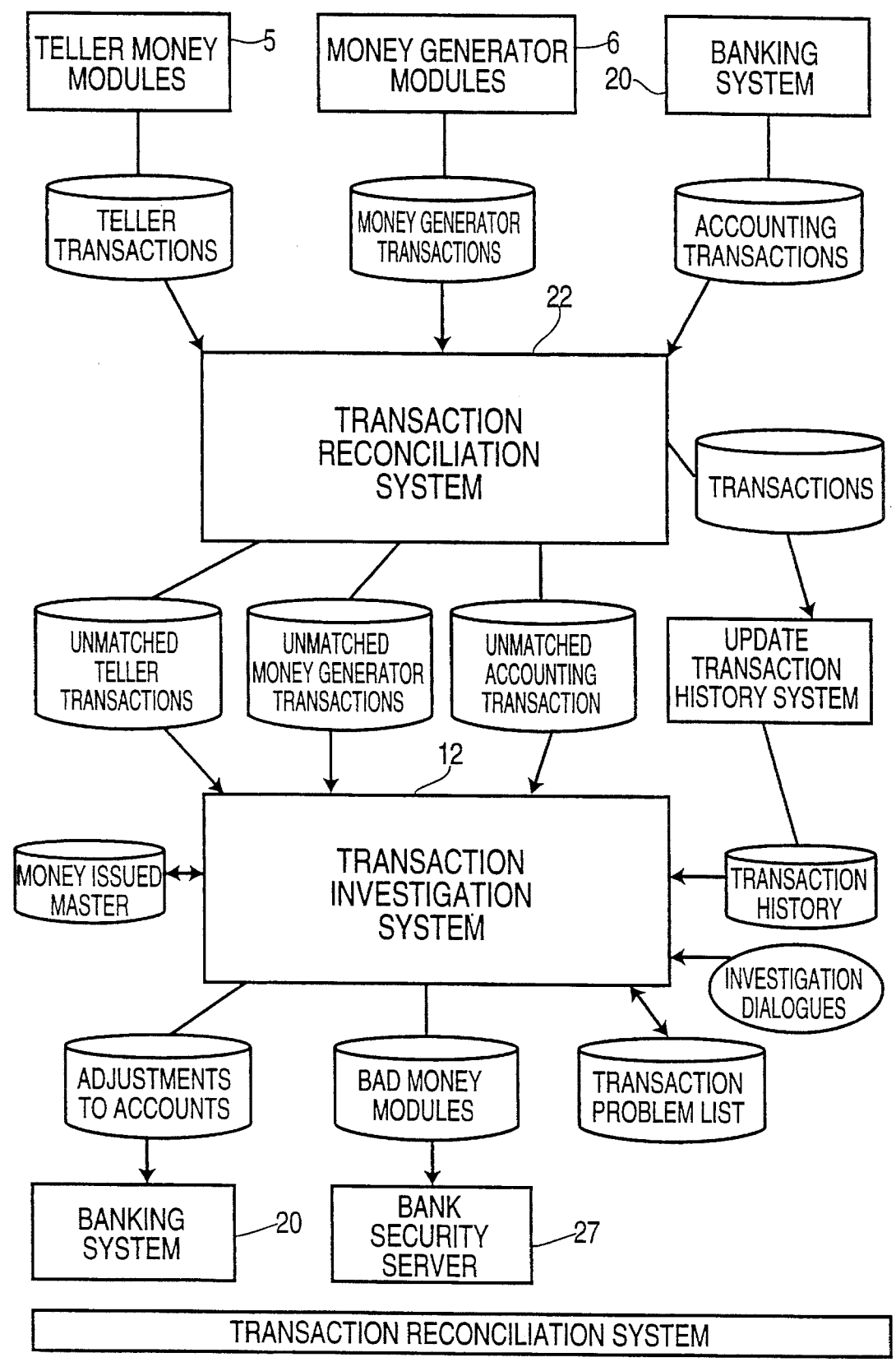
FIG. 25 a flow diagram of the Transaction Reconciliation System, according to the invention.

Referring to FIG. 25, the Transaction Reconciliation System 22 is shown. It will be understood that the Teller money modules 5, the Money Generator modules 6 and the banking system 20 may periodically pass transaction records to a Transaction Reconciliation System 22 maintained at each participating bank. These transactions will be analyzed and matched to determine if there is any faulty process occurring in the system of the invention.

The Transaction Reconciliation System 22, which may be embodied in any appropriately sized and suitably programmed general purpose computer but is not so limited, will ensure that all Teller money module 5 transactions with a financial impact, e.g., deposits, withdrawals and payments, match the appropriate accounting transactions. Any mismatches could indicate incomplete transactions or possible fraudulent actions.

Transactions reflecting the money issued by the Money Generator modules 6 also should correspond to Teller money module 5 transactions and have the appropriate accounting transactions recorded. Any mismatched data may indicate incomplete processing or a security breach. Unmatched accounting transactions may be caused by incomplete transactions or an attempt to tamper with the records of the banking system 20.

In the preferred embodiment, these unmatched transactions may then be transferred to an investigation system 12 where the causes of the problems may be determined. On-line dialogues may be provided to allow investigators to review the mismatches against transaction records and to determine appropriate actions to correct the situation. Investigators may then take corrective actions by adjusting accounts, deactivating faulty Teller money modules 5 and Money Generator modules 6, and notifying subscribers of the actions.

Figure 26:
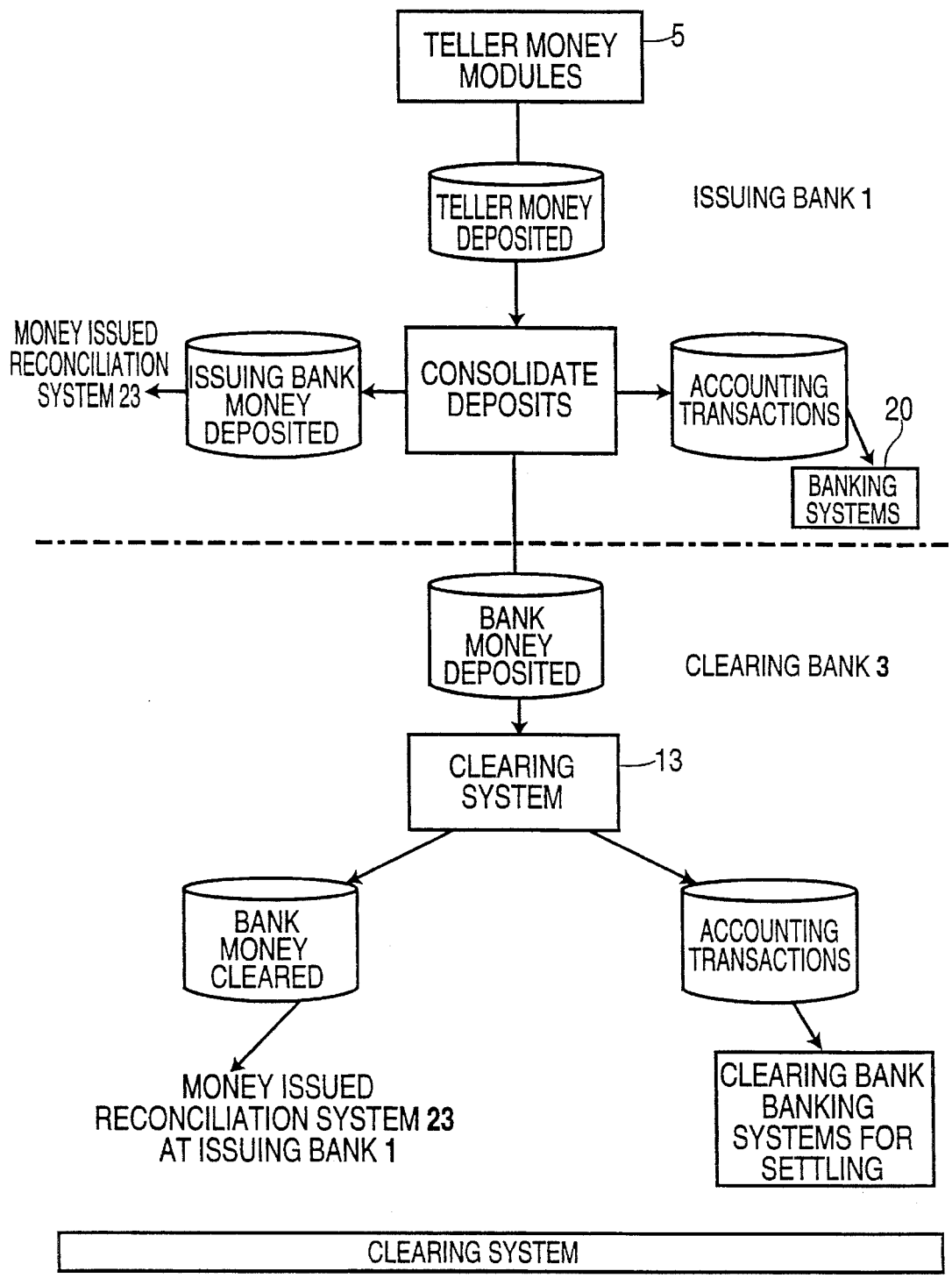
FIG. 26 is a flow diagram of the Clearing System, according to the invention.

Attention is now directed to FIG. 26, which illustrates the clearing process for handling deposit transactions. Correspondent Banks are not involved in this process because subscriber deposits are deposited to their accounts at Issuing Banks 1 on a real-time basis. At Issuing Banks, deposits are aggregated by the Clearing System 13 to consolidate all deposited electronic money (including the deposits from Correspondent Banks) for transmission to the Clearing Bank 3.

The Clearing Bank 3 may be implemented in any computer processing facility capable of accommodating the large number of transactions and corresponding amounts of data which the system will typically handle. A high volume mainframe computer, a suitably sized minicomputer system, a number of networked work stations having the necessary data processing capabilities or a combination of the foregoing may also be used. As will be appreciated by a person skilled in the art, the particular design of the Clearing Bank 3 hardware system is not critical to the invention.

It is anticipated that Issuing Banks 1 may clear money in one of several procedures. In one of these procedures, electronic money may be deposited on-line from the Issuing Bank 1 to the Clearing Bank 3. This could be done on-line in a real-time mode when transactions are actually occurring. Alternatively, an Issuing Bank 1 may record the details of transactions being performed during the course of the day for later batch processing. Interbank processing could occur several times a day.

As shown in FIG. 26, an Issuing Bank 1 may periodically transfer its electronic money to a deposit consolidation file (consolidate deposits) which may be processed and transmitted to the Clearing Bank 3. Transaction records from this file are also conveyed to the bank's Transaction Reconciliation System 22 for statistical and housekeeping functions.

At the Clearing Bank 3, the deposit consolidation files are processed creating a single debit or credit by monetary unit for each Issuing Bank's 1 demand account. Of course, the appropriate accounting transactions for these demand accounts are posted during the clearing processes. Any accounts which are overdrawn will be settled via the usual interbank settlement processes that are commonly used in the industry.

The processed electronic money that is cleared is sent back to the Money Issued Reconciliation System 23 of each of the banks that issued it in order to be reconciled and checked for tampering and duplication.

Figure 27:
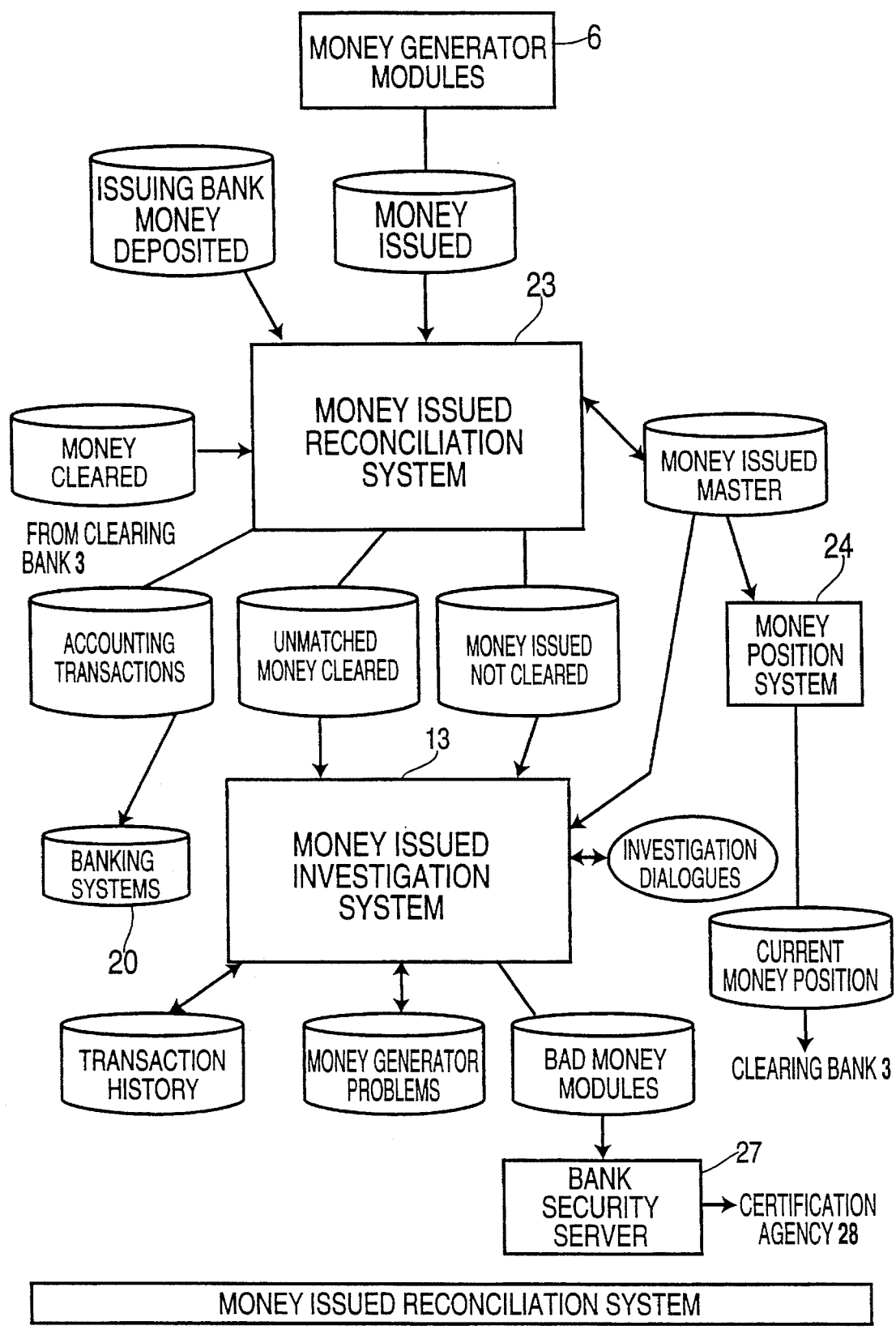
FIG. 27 is a flow diagram of the Money Issued Reconciliation System, according to the invention.

Additional statistical and housekeeping functions are implemented in the Money Issued Reconciliation System 23, as shown in FIG. 27. Issuing Bank's 1 provide their own Money Issued Reconciliation System 23, typically embodied in a general purpose computer but not so limited, for matching the electronic money issued to the electronic money cleared at the Clearing Bank 3.

As indicated in FIG. 27, the electronic money issued and electronic money deposited at Issuing Banks 1, and money cleared transactions received from Clearing Bank 3 are conveyed to the Money Issued Reconciliation System 23. The Money Issued Reconciliation System 23 generates accounting transactions for the money cleared, and updates a master file of all the bank's money issued. Additionally, the Money Issued Reconciliation System 23 passes to an investigation subsystem 13 money which has cleared but which was not issued or was possibly transferred more than once.

Any unmatched cases may indicate a potential breach of security. Investigators may then determine whether Money Generator modules 6 are not working properly or money modules are being tampered with. Money module identifiers of faulty or abused money modules are passed to each bank's Security Servers 27 for distribution to the other money modules on the bank's local network 18. The identifiers are also sent to the Certification Agency 28 for appropriate distribution throughout the Network 25.

Separately, the Money Issued master file is accessed by the Money Position system 24 which creates a file to be transmitted to the Clearing Bank 3 to create a consolidated money position. It is contemplated that all Issuing Banks 1 will provide a report reflecting their position at the end of a specified period, typically at the end of every day. The Money Position System 24 may consolidate these reports to reflect the amount of money issued by the Issuing Banks 1 for each monetary unit. The reports will reflect the outstanding position of each Issuing Bank 1 in order to assess the risk of interbank settlement problems.

Operational Sequences

Although some aspects of the preferred embodiment may be described in terms of detailed schematic diagrams, the transaction functions are best illustrated by use of process flowcharts. Thus, to facilitate understanding of the operation of the money modules, several examples of transactions are set forth in the flowcharts of FIGS. 28–50A. Referring to these figures, a detailed description of the system processes and the associated application functions that incorporate the principles of the preferred embodiment of the present invention will now be described.

Throughout the descriptions of the flowcharts (except where indicated otherwise), the application functions of the Transaction money module 4, whether they are imbedded in a hand-held unit or other type of processing device, are hereinafter designated with the suffix "A", and the Teller money module 5 applications and its associated bank are hereinafter designated with the suffix "B". In the case where a Correspondent Bank 2 interacts with an Issuing Bank 1, the Issuing or Correspondent Bank 1 and its associated Teller money module 5 applications are hereinafter designated with a "C."

Additionally, transitions to steps in another figure are indicated by a pentagonal tag having an alphanumeric symbol, and continue on the other figure with a circle having the same alphanumeric symbol therein.

Withdrawal From An Issuing Bank

In FIGS. 28–35A, a process flowchart of a transaction between a Transaction money module 4 and a Teller money module 5 is shown. In this process example, it is assumed that the subscriber is desirous of completing a monetary transaction with a participating bank; specifically, a withdrawal of some amount of electronic money from his/her account, to be stored in his/her Transaction money module 4.

Figure 28:
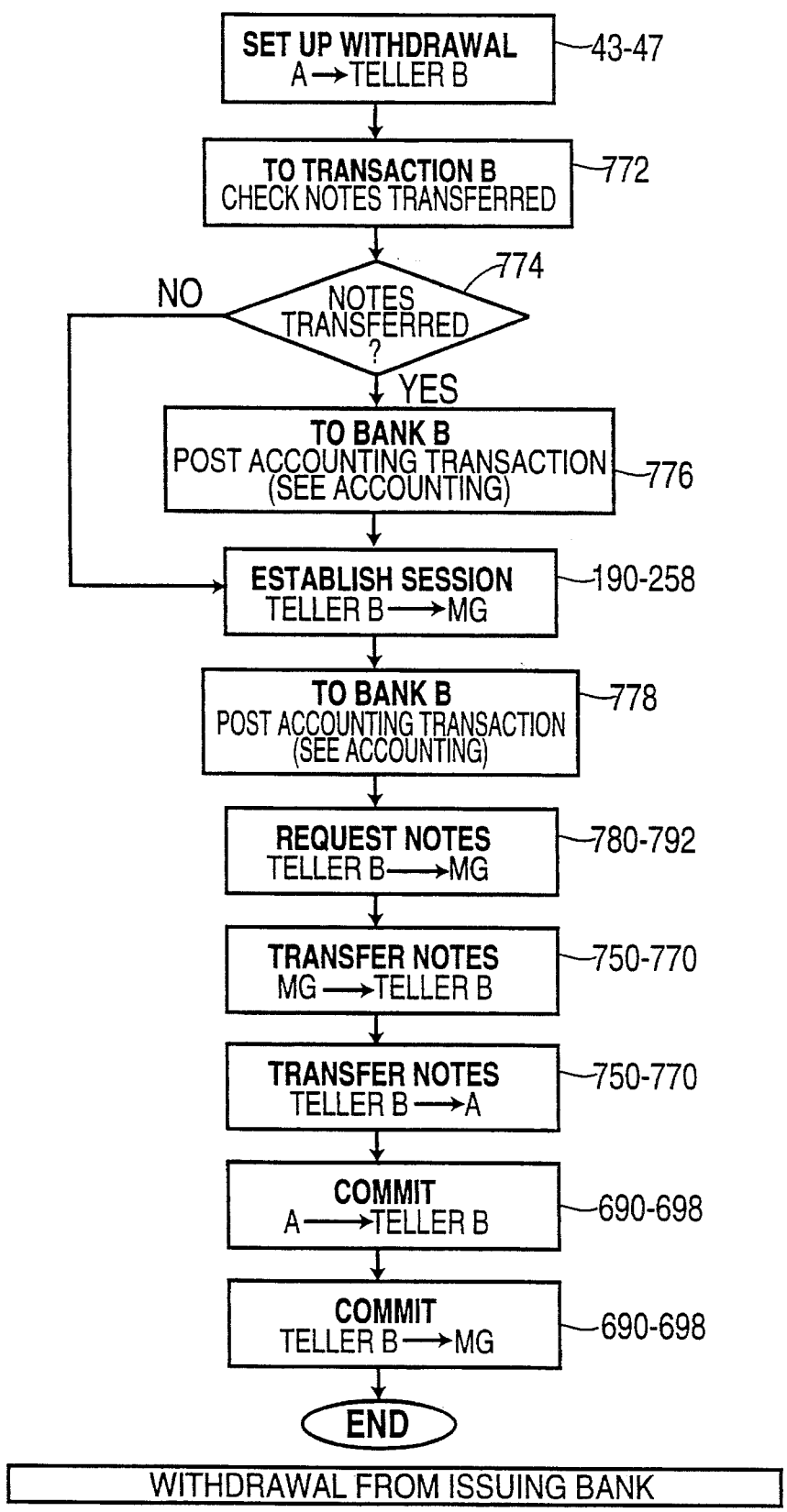

The process flow to set up a withdrawal transaction begins at the top of FIG. 28. The first flow block is a withdrawal set up between a money module A and a bank's Teller money module B 5, which is described further in FIG. 29. This process begins with money module A performing a sign-on process that is also described in further detail in another figure, specifically FIG. 31.

Subscriber Sign-On

Figure 31:
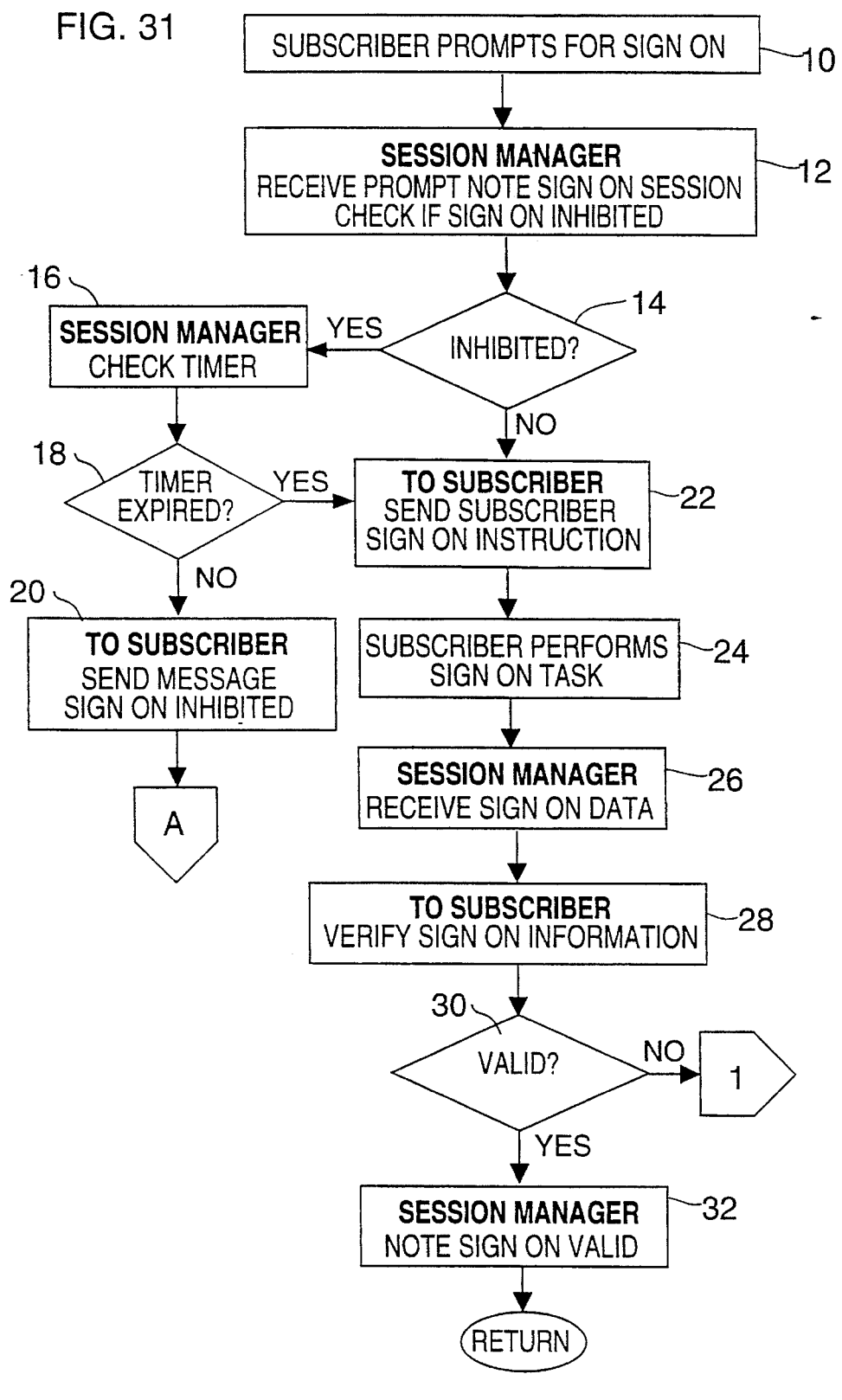

Referring to the top of FIG. 31, the subscriber prompts his/her Transaction money module 4 to perform a sign-on function (Step 10). The Session Manager 31 application receives the sign-on message (Step 12) and checks to see if the Transaction money module 4 has inhibited subscribers from signing on (Step 14).

Subscriber sign-on may be inhibited if a user makes several unsuccessful attempts to sign-on to the Transaction money module 4. For example, the allowable attempts to sign-on may be limited to three, such that if a person makes more than three consecutive unsuccessful attempts to sign-on to the Transaction money module 4, the Session Manager 31 will prohibit any further sign-on attempts. Additionally, this "lock-out" feature may be maintained for any predetermined time period, such as twenty-four hours, for example. Such an arrangement will provide security from use by persons who come into possession of the Transaction money module 4 but who are not properly authorized to access it.

It should be noted that while this type of an arrangement is anticipated in the preferred embodiment of the invention, the invention should not be limited as such, since any of the methods known in the industry for providing security from unauthorized persons would be suitable for use herein.

When the sign-on is not inhibited, as will typically be the case, To Subscriber 33 prompts the subscriber to enter his/her sign-on characteristics, such as his/her PIN and biometric identifiers (Step 22). Inputs from the subscriber are forwarded through the Session Manager 31 to the To Subscriber 33 application (Steps 24–28), which responds to the characteristics entered and entitles the subscriber to operate the Transaction money module 4 if the subscriber's identification characteristics are the correct ones when compared to those stored in the memory of the Transaction money module 4 (Steps 30–32).

If the subscriber's identification characteristics do not match the identifiers stored in memory, the To Subscriber 33 application notifies the subscriber of the invalid sign-on condition (Step 34). From there, the To Subscriber 33 application checks to see how many times the user has attempted to sign-on (Step 36), and if the predetermined count has not been reached, the Session Manager 31 is notified (Step 38).

The Session Manager 31 works in conjunction with the Clock/Timer 43 application to set and to monitor the time that has elapsed between unsuccessful sign-on attempts (Step 40). In one embodiment, too many unsuccessful attempts within the set time period will cause the Session Manager 31 to prohibit any further sign-on attempts, effectively shutting down the Transaction money module 4. The Session Manager 31 notes that the sign on is terminated in Step 42.

Turning back to Step 14 of FIG. 31, assuming that the Transaction money module 4 is inhibited, the Session Manager 31 checks to see if the predetermined time period has expired (Step 16). If the Transaction money module 4 is still in the prohibited sign-on mode, the To Subscriber 33 sends a message to the subscriber that further access to the Transaction money module 4 is prohibited (Steps 18–20). The Session Manager 31 then notes that the sign-on attempt is terminated, again in Step 42.

Setup Withdrawal

Figure 29:
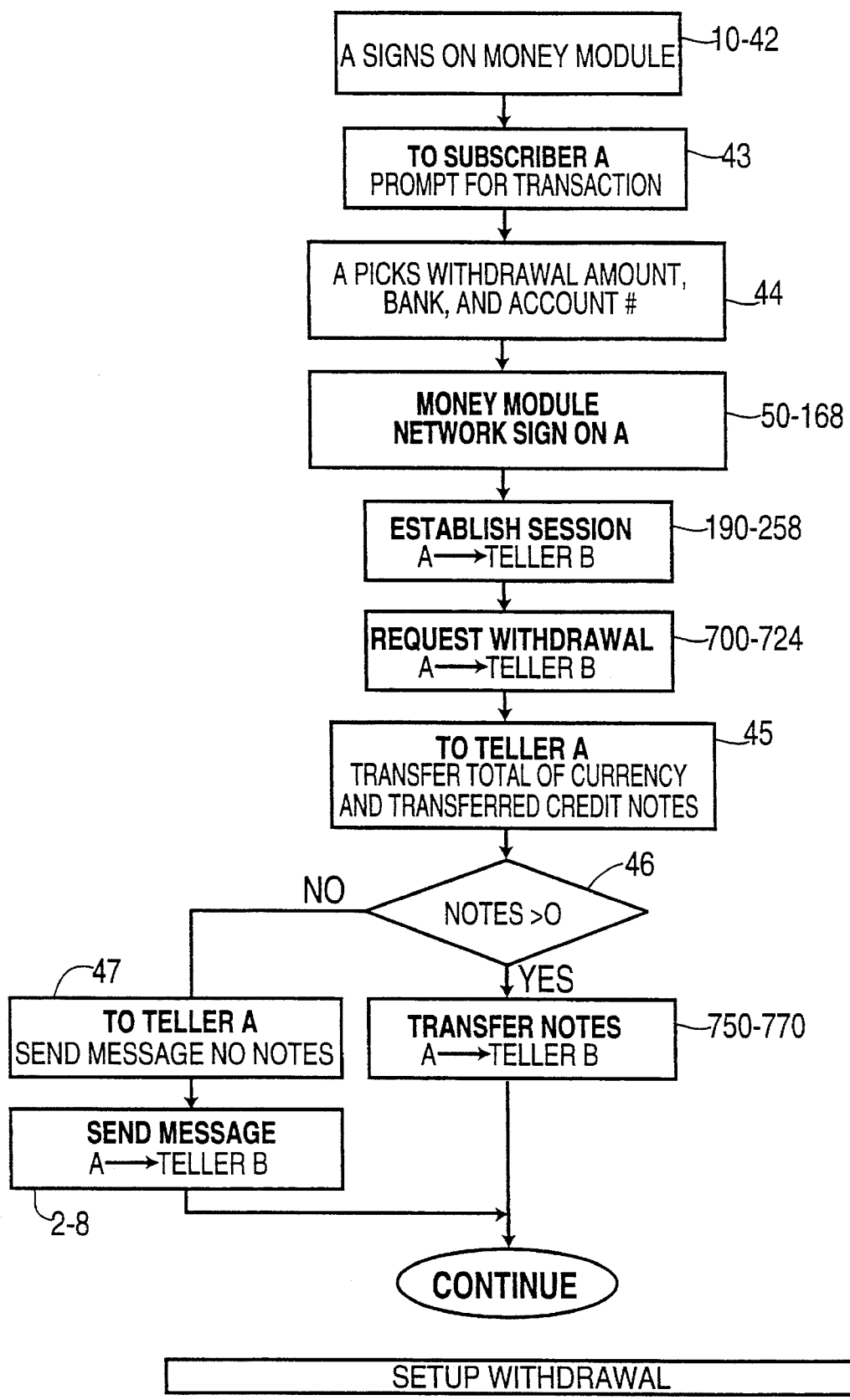

Turning to FIG. 29, when a proper sign-on is accomplished, the To Subscriber A 33 prompts the subscriber for the type of transaction that is desired (Step 43). As mentioned previously, it is anticipated that a subscriber may transact with any one of a multitude of accounts at several different participating banks and financial institutions.

After selecting the particular bank and account (Step 44), the Transaction money module 4 initiates a procedure for communicating with the bank that was selected, by engaging the Network 25. The overall program flow now passes to the procedures illustrated by flowcharts in FIG. 33. In FIG. 33, there is shown the data processing and flow for implementing a sign-on to the Network 25.

Network Sign-On

The illustrative Network 25 sign-on method about to be described is in general applicable to any of the money modules 4,5,6 of the present embodiment. Thus, in this example, "A" denotes any class of money module.

After the bank that is to be accessed is selected, the money module initiates communication with the Network 25 under the control of its session Manager A 31 (Step 50). The Network Server 26 begins by requesting the certificate of the Transaction money module 4 from Session Manager A 31 (Steps 52–54). The Maintain Security A application 37 retrieves and sends the certificate to Session Manager A 31 (Step 56). Session Manager A 31 sends the certificate to the Network Server 26 (Step 58), which, upon receipt, routes it to the Security Server 27 (Step 60).

The Security Server 27 tests the certificate to check its validity (Steps 62–64), and if it is not valid for any reason, the Security Server 27 will signal the Network Server 26 to deny access (Step 66). The Network Server 26 may in turn convey an access-denied message to Session Manager A of the Transaction money module 4 (Steps 68–70).

If the Session Manager A that receives the denied access message is a Transaction money module 4, its To Subscriber application A will inform the subscriber of this condition (Step 74). If it is a Teller money module 5 or Money Generator Module 6 that is trying to access the Network 25, the To Bank A application 47 notifies the bank's systems 20 that its access will not be permitted (Step 76).

Assuming the certificate validity check is satisfied, the Security Server 27 sends an updated list of the bad money modules, and a new list of certificatory keys to the Session Manager A, (Step 78, FIG. 33A). The keys are signed using the last version of the certificatory key. This information is received by Session Manager A and forwarded to the Maintain Security A 37 application, which validates the certificatory key list and the bad money module list (Steps 80–82, FIG. 33A).

Public Key A 44 tests the validity of the signature (Step 84) and if the signature is not valid, a message warning of a network security problem is sent by the To Subscriber application A 33 of a Transaction money module 4 (Steps 86–90), or alternatively, by the To Bank application A 47 of a Teller money module 5 or Money Generator module 6, (Steps 86–88, & 92). Advantageously, all money modules will check the validity of a signature received from even the Security Server 27. This helps to ensure the integrity of the overall system.

In the case of a valid signature, Maintain Security A updates the bad money module list and the certificatory key list. (Step 94). If the certificate is to be recertified or the certificate has expired (Steps 96 and 98), the Maintain Security A generates a new certificate (Step 126 of FIG. 33C) while Public Key A generates new keys and signs the certificate using the old private key (Step 128). Session Manager A sends the new certificate to the Security Server 27 which accepts the certificate and tests the validity of the signature (Steps 130–136).

Assuming that the signature of the new certificate is not valid at this stage, Steps 66–76, FIG. 33, are repeated so as to terminate the communication link into the Network 25.

Figure 33C:
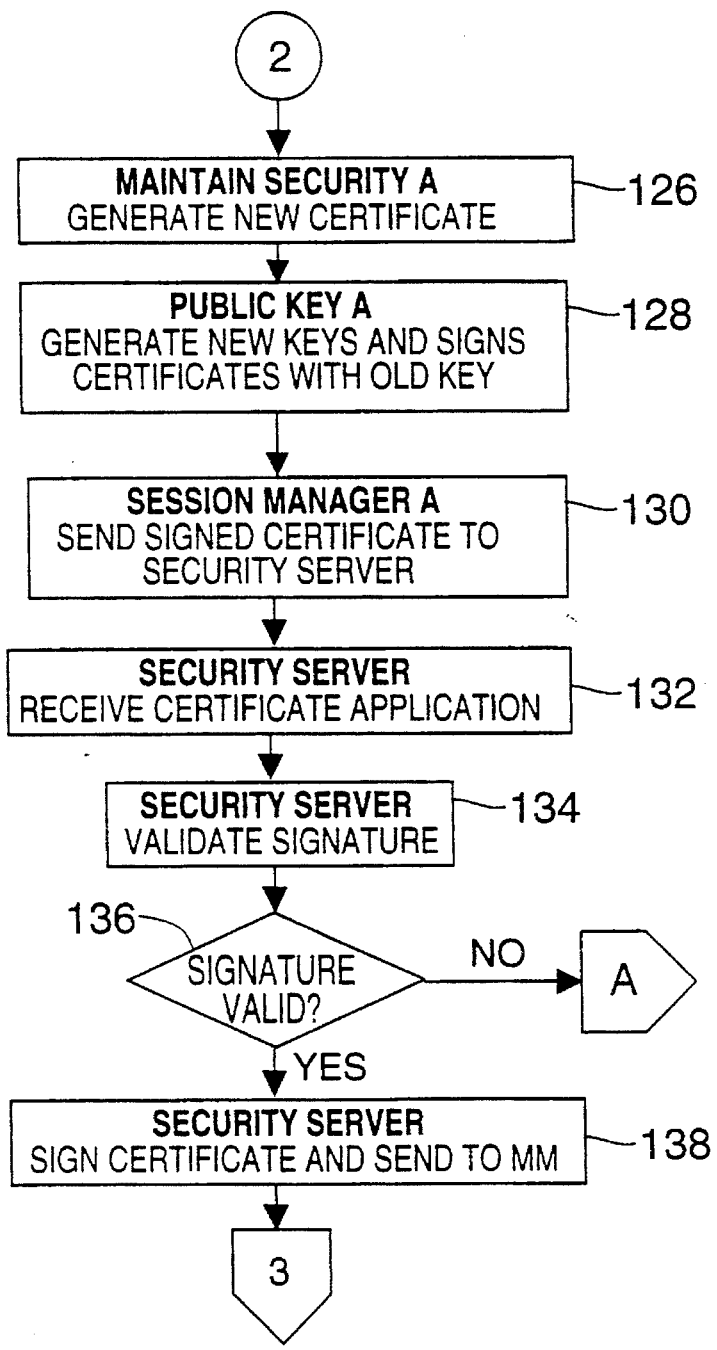

On the other hand, a valid signature, FIG. 33C, will allow the Security Server 27 to sign the new certificate and send it back to the money module (Step 138). Session Manager A 31 receives the new certificate, Step 140, FIG. 33D, and forwards it to its Maintain Security application A to again validate the certificate through use of the Public Key application (Steps 142–146). Here, the money modules will repeat the test of the validity of the certificate issued from the Security Server 27. For a valid signature, the Session Manager A 31 sends an acknowledgment to the Security Server 27 (Step 148) who responds by returning the process to Step 78, FIG. 33A.

Figure 33D:
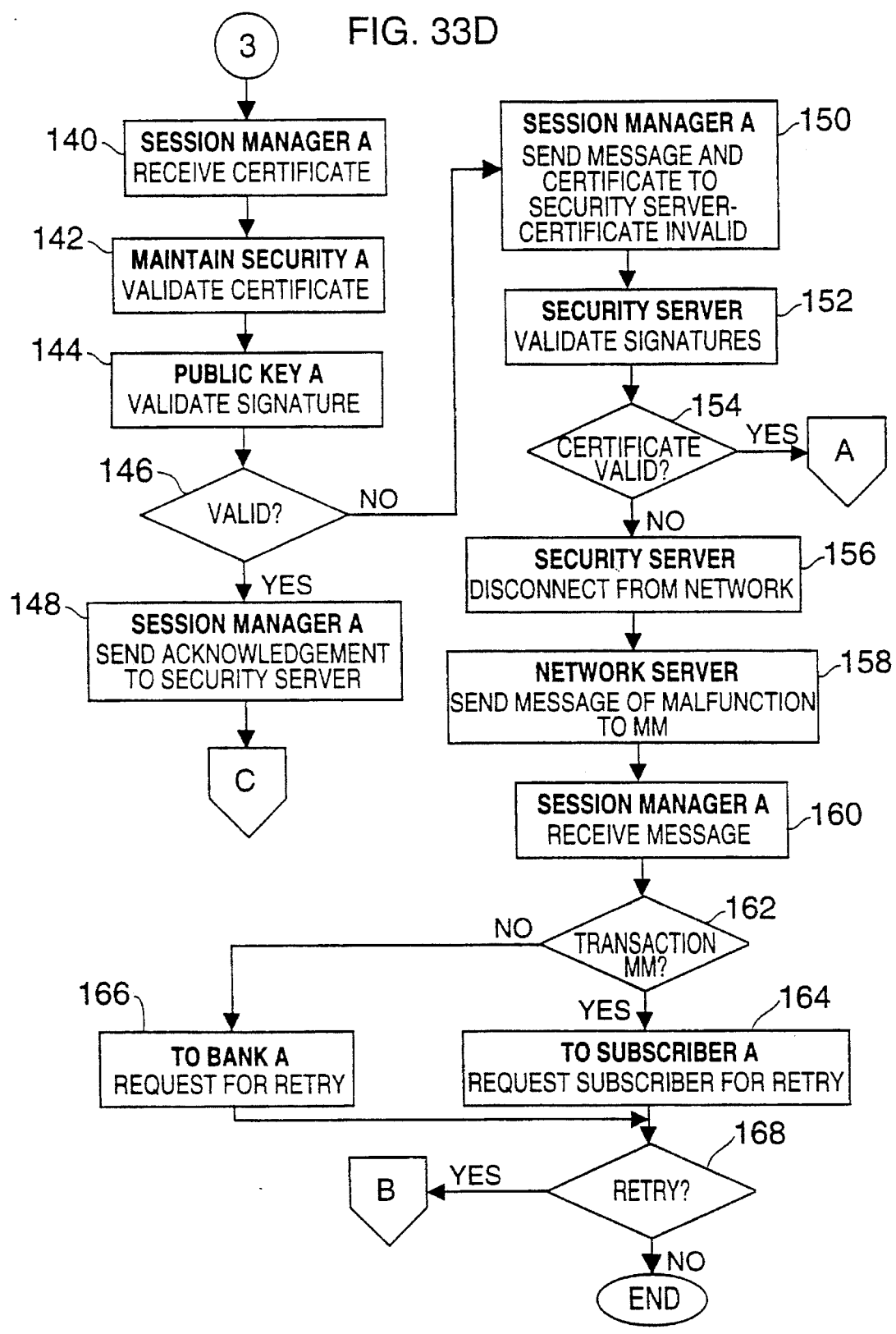

Conversely, if the Security Server's signature on the new certificate generated by Transaction money module A proves to be invalid, FIG. 33D, Session Manager A will send an invalid certificate message along with the certificate back to the Security Server 27 (Step 150), which will again attempt to validate the signature on the certificate (Step 152). A valid signature will return the process to Step 66, FIG. 33.

Alternatively, an invalid signature will cause the Security Server 27 to disconnect from the Network 25 (Step 156, FIG. 33D) and cause the Network Server 26 to notify the money module of a malfunction (Step 158).

The Session Manager A that receives the message (Step 160) will, in the case of a Transaction money module 4, get the To Subscriber A 33 to inquire of the subscriber if they desire to retry the whole process of signing on to the Network 25 (Steps 164 & 168). In the case of a Teller money module 5 or a Money Generator Module 6, the To Bank application A will inquire if there is a request to retry the Network 25 sign-on procedure (Steps 166 & 168).

No attempts for a retry will, of course, end the communication link into the Network 25, and conversely, a request for retry of Network 25 access will return the procedure back to Step 56, FIG. 33, wherein Maintain Security A will again retrieve the Transaction money module's certificate for the Network Server 26.

Back at Step 98, FIG. 33A if the certificate does not need to be recertified or has not expired, Session Manager A 31 will request the date and time (Step 100) from Clock/Timer A (Step 102, FIG. 33B), and forward this data to the Network Server 26 (Step 104).

The Network Server 26 checks the time and date after receiving it (Step 106) and if it is outside of an acceptable predetermined parameter, the Network Server 26 will send the new time and date (Step 110) to Clock/Timer A through Session Manager A (Steps 112 & 114). If Clock/Timer A 43 cannot adjust the date and time to be synchronized with the Network 25, the operator of the money module for the subscriber or the bank is notified of the clock malfunction (Steps 116–124).

In response to the apparent malfunction, the operator may attempt to have the time and date resent from the Network Server 26, Step 124, and the procedure reverts back to Step 102 in which it attempts to send the new date and time to the money module. Alternatively, an acceptable date and time check, Step 108 allows the Network Server 26 and Session Manager A to exchange acknowledgements and note the successful Network 25 sign-on (Steps 126–128).

Establishing A Session

Figure 34:
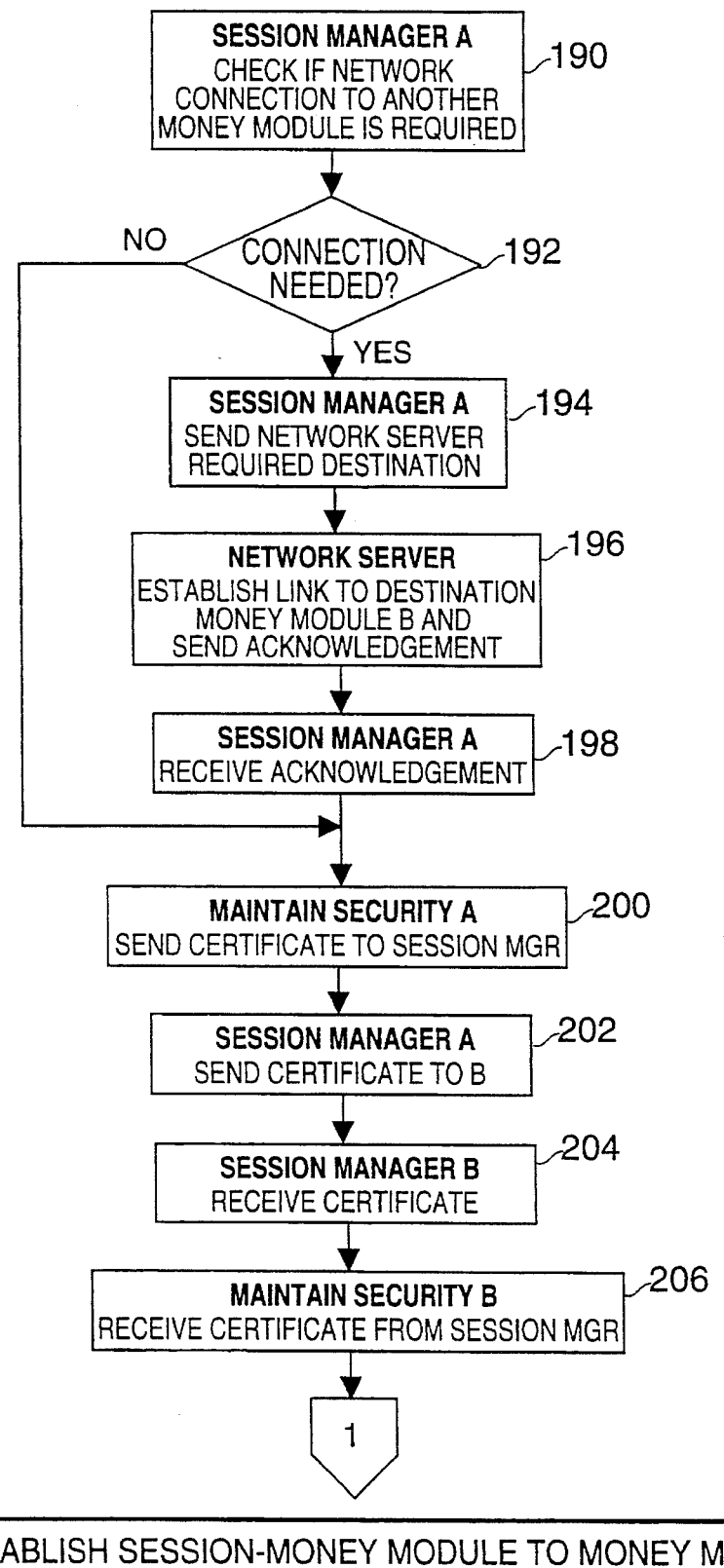

As shown in FIG. 29, after the steps of money module sign-on, transaction selection and network sign-on are completed, sessions are established between the money modules. FIG. 34 diagrams the flow process for establishing a money-module to money-module session, which, as will be understood by one skilled in the art, will in general be applicable as well to other sessions established between the various types of money modules of the present invention.

Referring to the top of FIG. 34, the Session Manager A will first check to see if the subscriber has requested connection to a specific destination in the Network 25 (Step 190). For instance, where a subscriber is desirous of transacting with his/her account at a specific bank, the Network 25 will connect the Transaction money module 4 to the selected bank, Steps 192–198. Conversely, when a subscriber is performing updating functions on the Network 25, there is no need to establish a session with any specific bank, and the Network Server 26 may decide where to route the connection, based on Network 25 traffic.

If a specific destination has been selected by the subscriber, Session Manager A conveys the destination information to the Network Server 26 (Step 194). The Network Server 26 initiates a communication link to the money module of the selected destination (Step 196) and sends an acknowledgement to Session Manager A 31.

After receiving the acknowledgement that the destination money module has been contacted (Step 198), the Maintain Security application A will send its certificate to the Maintain Security application B through each application's respective Session Manager (Steps 200–206).

It is anticipated that the money modules will exchange certificates to verify that each money module is interacting with another valid money module. To this end (as seen in FIG. 34A), the Public Key application B 44 tests the certificate of money module A by using the public key algorithm and the public key corresponding to the private key used by money module A, to encrypt and check A's certificate and verify that it is valid (Step 208).

If the certificate is found invalid, the session Manager B will note the session is terminated (Step 210). In the case of a Transaction money module 4, the To Subscriber B informs the subscriber of the transaction termination (Step 212). Likewise, a Teller money module 5 or Money Generator module 6, uses the To Bank application B 47 to notify the bank of the termination, Step 213. It is anticipated that the counterparty money module will then timeout to end the exchange.

Figure 34A:
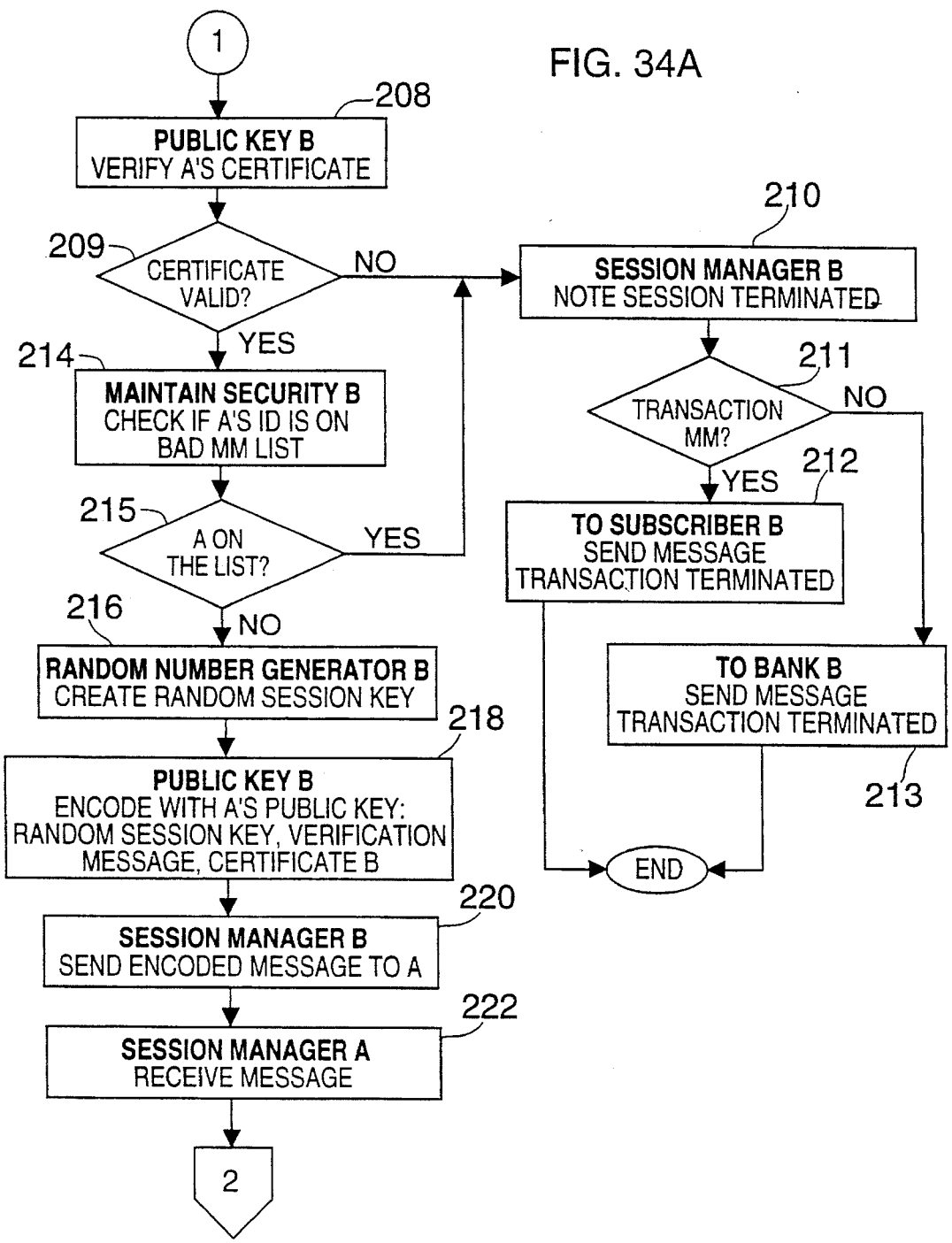

In Step 214, FIG. 34A, assuming that the certificate of money module A is valid, the Maintain Security application B 37 checks to see if money module A is on the list of compromised money modules (Step 215). If money module A is on that list, the process flow returns to Step 210 so that the communications can be terminated.

Alternatively, when money module A is not on the list of compromised money modules, the Random Number Generator B 46 creates a session key (Step 216) and encodes the session key along with money module B's certificate and a verification message, using money module A's public key (Step 218). This encoded message is sent to money module A by Session Manager B 31 (Step 220).

Session Manager A 31 receives the message from money module B (Step 222), and uses its Public Key 44 algorithms application to decode the message (Step 224, FIG. 34B), and to verify money module B's certificate (Step 226).

If the test determines that money module B's certificate is invalid, the operation branches to an "abort transaction" procedure to terminate the steps taken thus far in establishing a session (Steps 500–524). This procedure may be used, for example, to end the communication session and to functionally shut off money module A, which results in the communication link ending. (Steps 500–524, FIG. 32).

Abort Transaction

Branching to FIG. 32, the functional shut-off of a money module through the abort transaction process will now be described in detail. It will be understood that the following process may be used when any two money modules are abnormally terminating the transactions occurring between them. Accordingly, the money modules will be designated "X" and "Y" to illustrate the generic applicability of the process steps.

An abort transaction process initiated by money module X to terminate communications with money module Y begins with Session Manager X 31 capturing and then reversing or rolling back any programmatic changes that were made to the money module (Step 500), and then noting that the session has been aborted (Step 502).

In the case where the money module that is initiating the termination is a Transaction money module 4, the To Subscriber application 33 informs the subscriber of the communication termination (Step 510). Likewise, a Teller money module 5 informs its To Bank application 47 of the termination so that any accounting changes may be undone (Step 508). Next, the Session Manager X 31 of the terminating money module sends an encoded message to the other money module involved (Step 512).

Figure 37:
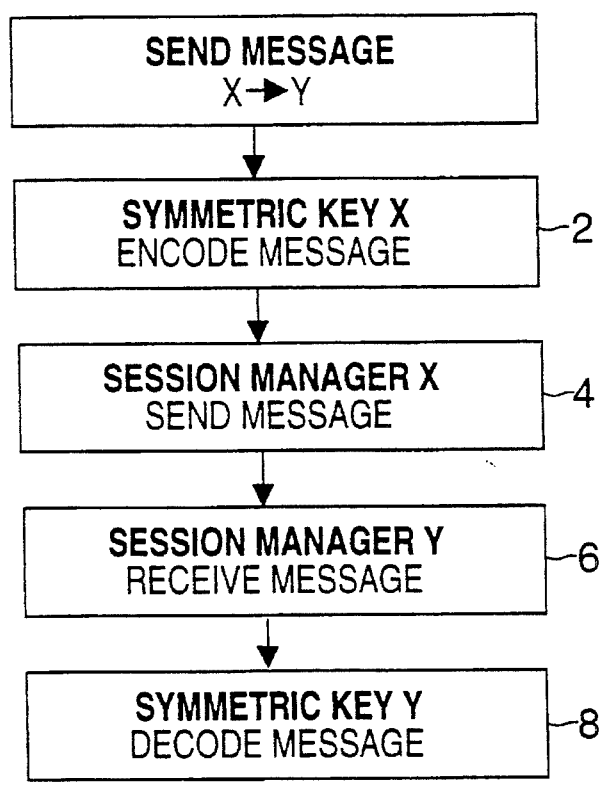

Briefly referring to FIG. 37, all encrypted messages between modules will be exchanged by the following steps. The sending money module (here also referred to as "X") uses its Symmetric Key 45 to encode the message to be sent to the receiving money module (here also referred to as "Y") (Step 2). Again, it will be appreciated that there are a number of known encryption techniques which may be utilized.

The Session Manager X 31 sends the encoded message to Session Manger Y 31 which in turn decodes the message using its Symmetric Key Y 45 (Steps 4–8).

Continuing with FIG. 32, the Session Manger Y responds to the termination notice sent by also undoing any changes it may have made towards establishing the session, and noting the aborted session (Steps 514–516). If it is a Transaction money module 4 that is now shutting down, the To Subscriber application 33 alerts the subscriber of the condition (Steps 518 & 524). Correspondingly, in a Teller money module 5, the To Bank application 47 will reverse all accounting transactions that have been undertaken (Steps 518–522).

Returning to FIG. 34B, assuming that the money module B certificate is valid, in Step 228 Maintain Security A checks to see if money module B is on the list of compromised money modules. If money module B is on the list (Step 230), the session reverts to the abort transaction procedure, Steps 500– 524. Thereafter, the communications session is dissolved.

More typically, money module B will not be on the list of compromised money modules, and the Clock/Timer A 43 will retrieve the date and time (Step 232) and send this information to the Maintain Security application A 37 so that the verification message may be assembled with the date and time (Step 234).

Figure 34C:
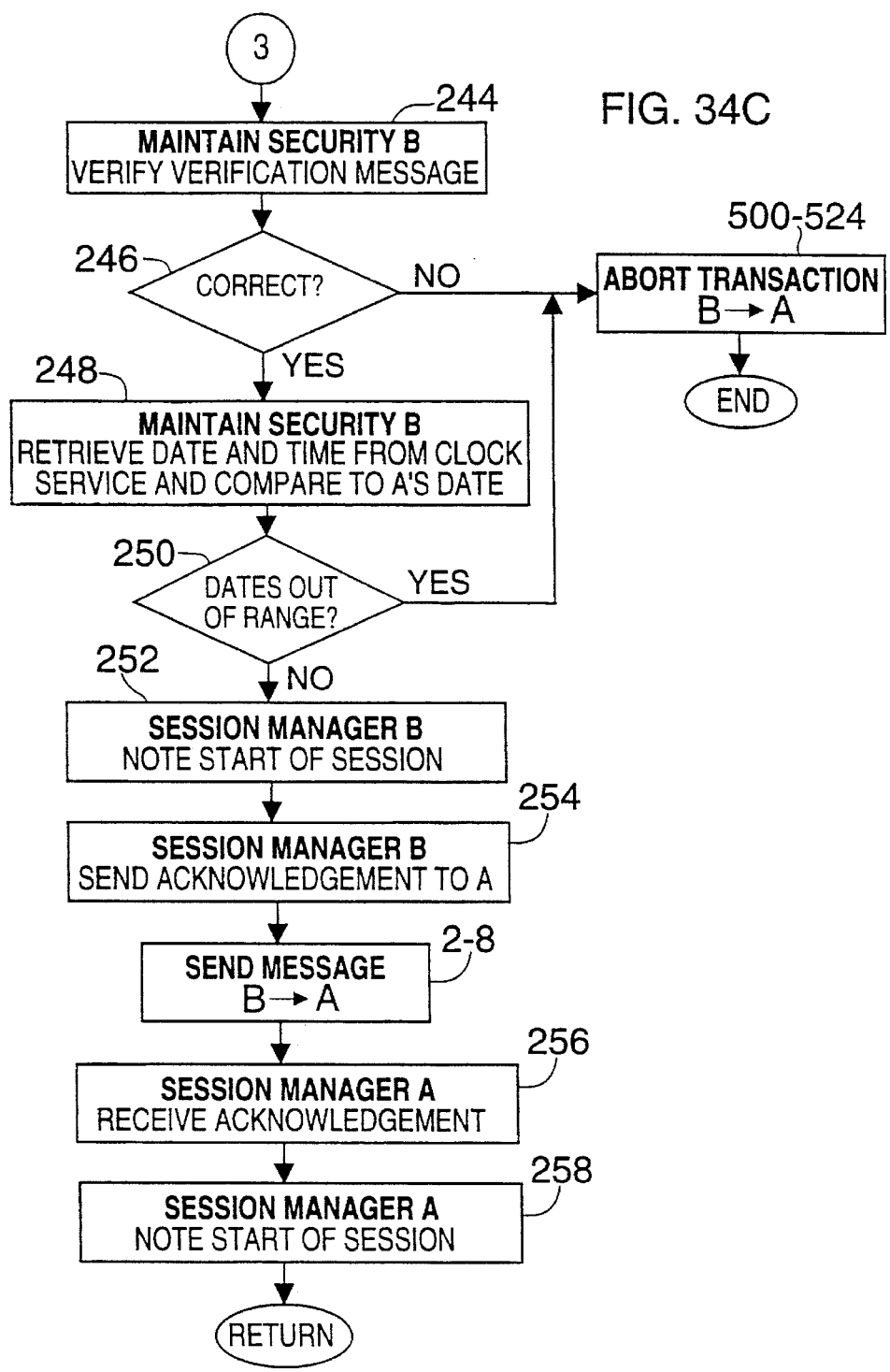

Symmetric Key A 45 then encrypts the verification message with the date and time information, using the random session key provided by money module B (Step 236). Session Manager A 31 sends this encrypted message (Step 238) to Session Manager B 31 (Step 240). From there, the Symmetric Key application B 45 decrypts the message (Step 242) and passes it to the Maintain Security B 37 for message verification (Step 244, FIG. 34C). An incorrect message will cause the session to be aborted through Steps 500–524, while a correct message will advance the procedure so that Maintain Security B 37 can compare the time and date with that of money module A (Step 248).

Clock/Timer B 43 will verify that money module A's clock is within a preset amount of deviation from the clock of money module B (Step 250). If the discrepancy between the two clocks is greater than a predetermined amount, the session will be aborted by branching to Steps 500–524.

If there is no discrepancy that is greater than the permissible amount, Session Manager B 31 will note its start of a session (Step 252), and send an acknowledgement to money module A to start the transaction (Step 254). After the encoded message is sent from money module B to Session Manager A 31 using process steps 2–8, FIG. 37, Session Manager A 31 acknowledges the message receipt and also notes the start of session (Steps 256– 258).

Request Withdrawal

After a session is established between the Transaction money module 4 and Teller money module 5, the Transaction money module 4 makes a withdrawal request from the Teller money module 5. See FIG. 29. Referring now to FIG. 30, a process for requesting a withdrawal will now be described. It should be noted that although the figure denotes the parties as "X" and "Y," in the process steps described below, they are applicable to any money module transacting with a Teller money module 5.

To begin, the To Teller X 34 sends a withdrawal request to the Teller money module 5, requesting a certain amount of money to be withdrawn from a specific account. In its transmission of the withdrawal request, the account number and the account profile will be transmitted from the requesting money module to the Teller money module 5 (Step 700). To send this request, the process Steps 2–8 are repeated, in which the message is encrypted using the previously described cryptographic techniques.

Validate Account Number

Figure 38:
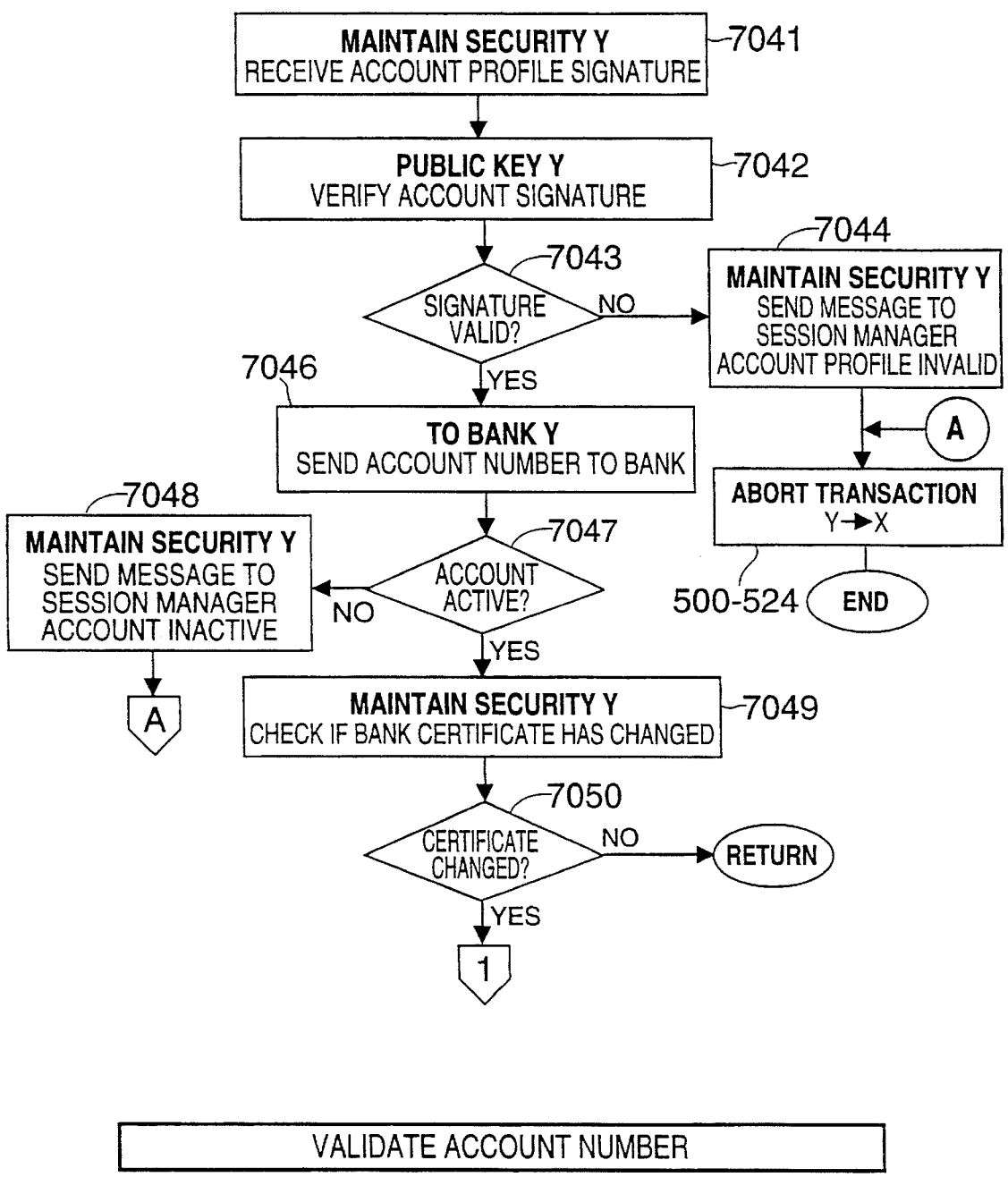

Once the withdrawal request and the account number and profile are transmitted to the Teller money module 5, a procedure to validate the account number is initiated (Steps 7041–7056). A flow diagram depicting how an account number is validated is shown in FIG. 38.

In this process, the Maintain Security application 37 of the Teller money module 5 receives the account profile and signature and conveys them to its Public Key application 44 to verify the profile signature (Steps 7041–7042). The signature is tested using the public key generated and distributed by the Bank's Security Server 27. An invalid signature causes the Maintain Security 37 application to inform the Session Manager that the account profile is invalid (Step 7044), whereby Steps 500–524, FIG. 32, are followed to abort the transaction between the two money modules.

If the signature test confirms a valid signature, the procedure advances to the To Bank application 47 which sends the account number it has received to the bank's computer systems (Step 7046). An inactive account will cause the Maintain Security application 37 to inform the Session Manager of the inactive account (Step 7048) and have the transaction aborted following steps 500–524; an account that has not been inactivated will allow the Maintain Security application 37 to check if the account profile needs to be recertified (Steps 7047–7050).

Figure 38A:
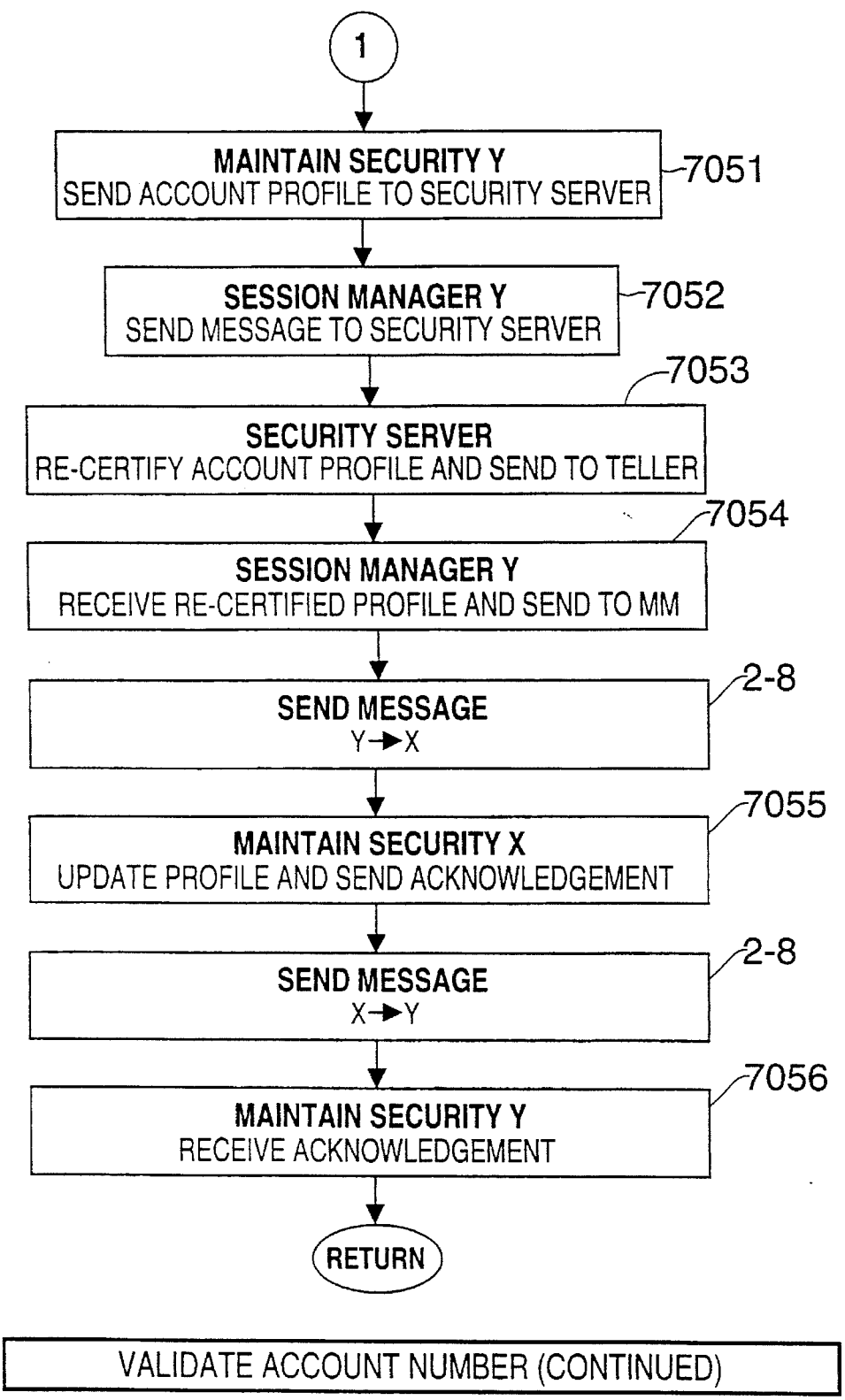

If the account profile does need to be recertified, the Maintain Security application 37 will send the account profile to the Security Server 27 (FIG. 38A, Steps 7051–7052), which will recertify the account profile and send it to the Teller money module 5 (Step 7053). In response, the Teller money module 5 sends it to the money module making the withdrawal request (Step 7054).

The communication from the Teller money module 5 to the money module utilizes the previously described routine for sending messages Steps 2–8. The Maintain Security application 37 then updates the account profile in the money module and returns an acknowledgement to the Maintain Security application 37 in the Teller money module 5 (Step 7055), also using Steps 2–8. The electronic message is received by the Maintain Security application 37 of the Teller money module 5, and acknowledged in Step 7056.

With the account information checked, the process returns to Step 704 of FIG. 30. The To Bank application 47 now verifies that there are sufficient funds to support the withdrawal request (Step 704). Sufficient funds will prompt the return of an acknowledgement to a Transaction money module 4, utilizing process Steps 2–8 to transmit the acknowledgement to its To Teller 34 application function (Steps 706–714). In the case of a Teller money module 5, no acknowledgement is required.

Figure 30A:
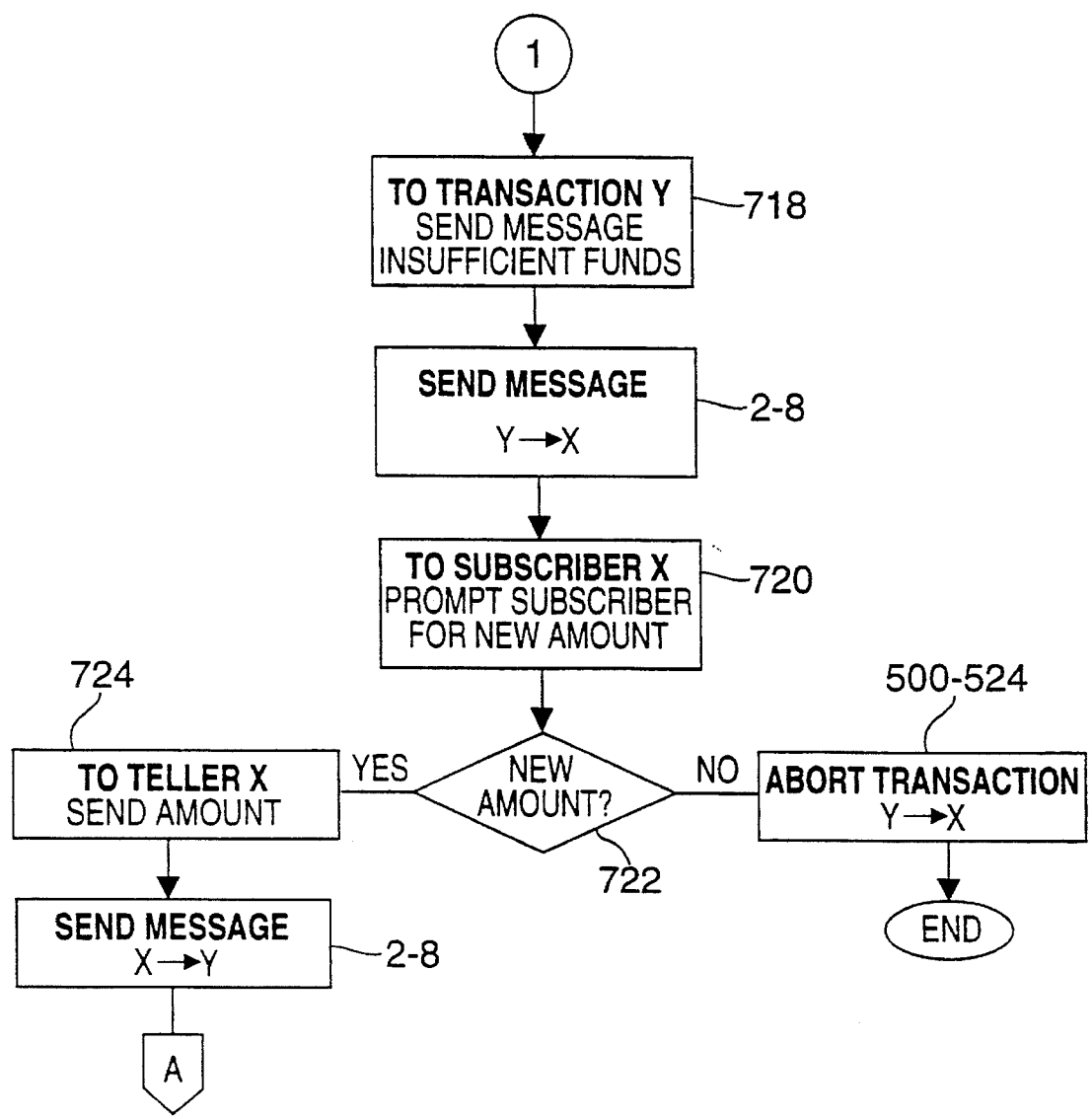

In the case of a Transaction money module 4, an insufficient amount of funds will cause the subscriber to be prompted to enter a new amount for the withdrawal (Steps 718–720, FIG. 30A). As shown by Step 724, the newly entered amount causes the To Teller application 34 to send the new request to the To Bank application 47 (using Steps 2–8) of the Teller money module 5 to verify if there are sufficient funds to cover the latest requested amount, returning to Step 704 of FIG. 30. If the new request is still greater than the funds on balance at the bank, the Teller money module 5 will initiate Steps 500–524 to abort the transaction between the two money modules. In the case of a Teller Money Module 5, the transaction is allowed to overdraw the account.

Transfer Notes

Referring back to FIG. 29, To Teller A 34 transfers the total of its currency notes 11 to the Teller money module 5 (Step 45). If there are no notes 11 being held in the Transaction money module 4 at the time the withdrawal request is made, the To Teller A application 34 sends a message to the Teller money module 5 that there are no notes 11 present (Step 47), using process Steps 2–8.

Electronic notes 11 are transferred between money modules using the procedure described below (referring now to FIG. 39). The Note Directory application 39 of the transferor money module chooses the notes of proper values for the transfer and updates the current amount of each electronic note after transfer (Step 750), and has the Notes application 40 create a transfer for each note 11 (Step 752). The Public Key application 44 creates signatures for all the notes 11 (Step 754) and sends the notes 11 to the Packet Manager application 41, for assembling the note 11 transfers and signatures into a packet to be sent to the requesting money module (Step 756).

Steps 2–8 are utilized to transfer the packet of electronic notes 11 to the Packet Manager application 41 of the requesting money module for receipt and disassembly (Step 758). The Verifier application 42 verifies the transfers appended to the certificates, and verifies that the total amount conforms to the notes 11 that should be sent (Step 760).

Any invalid information will cause the transaction between the two money modules to be aborted, using the procedure outlined in steps 500–524 above (Step 761). Valid notes 11 will have their expiration dates checked (Step 762) by the Verifier application 42 when it is a Transaction money modules 4 that has conveyed the notes 11 (Step 763). Any expired notes 11 (Step 764) will cause the sessions to be aborted using the procedures outlined in Steps 500–524, FIG. 32.

Figure 39:
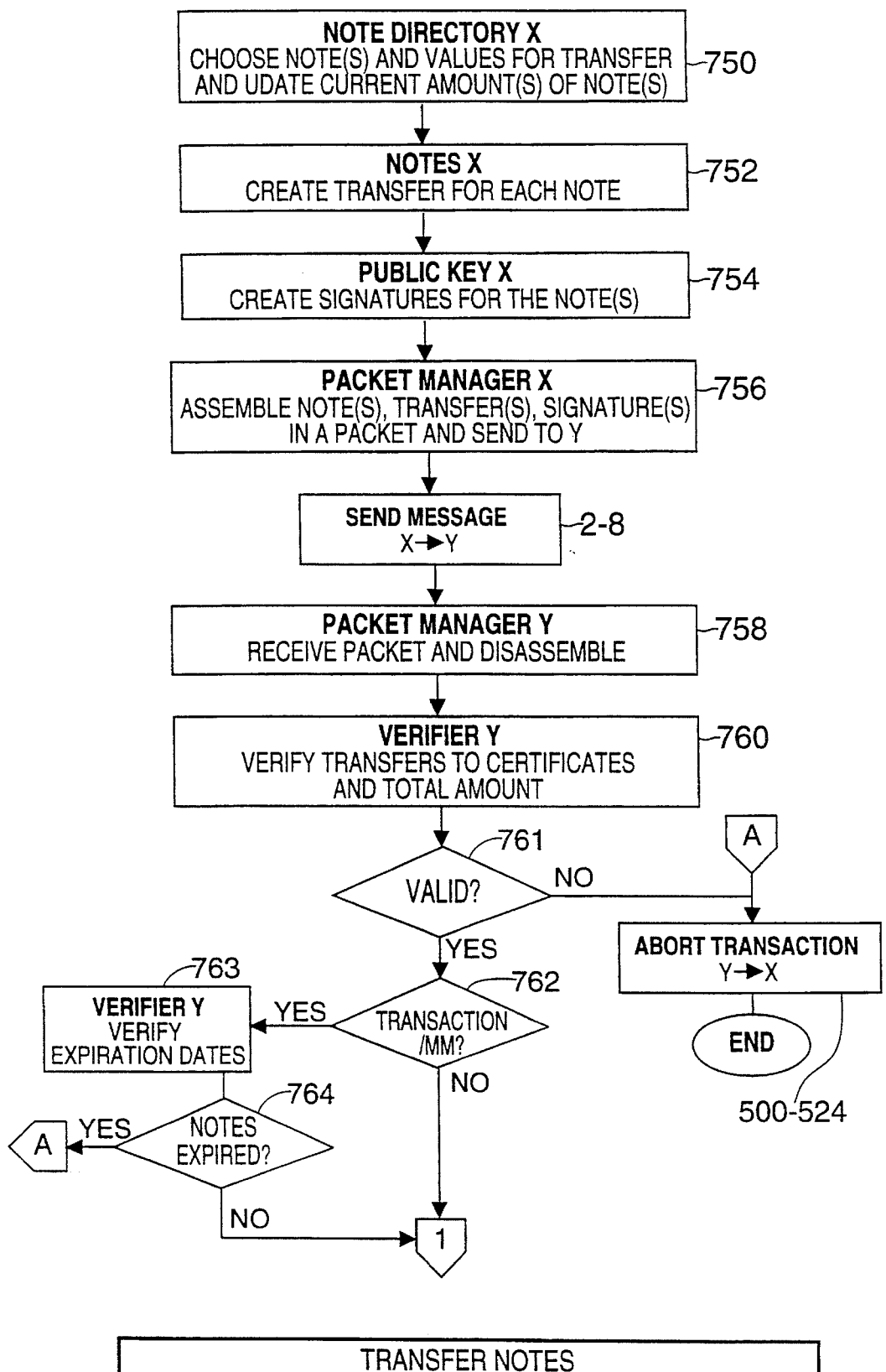
Figure 39A:
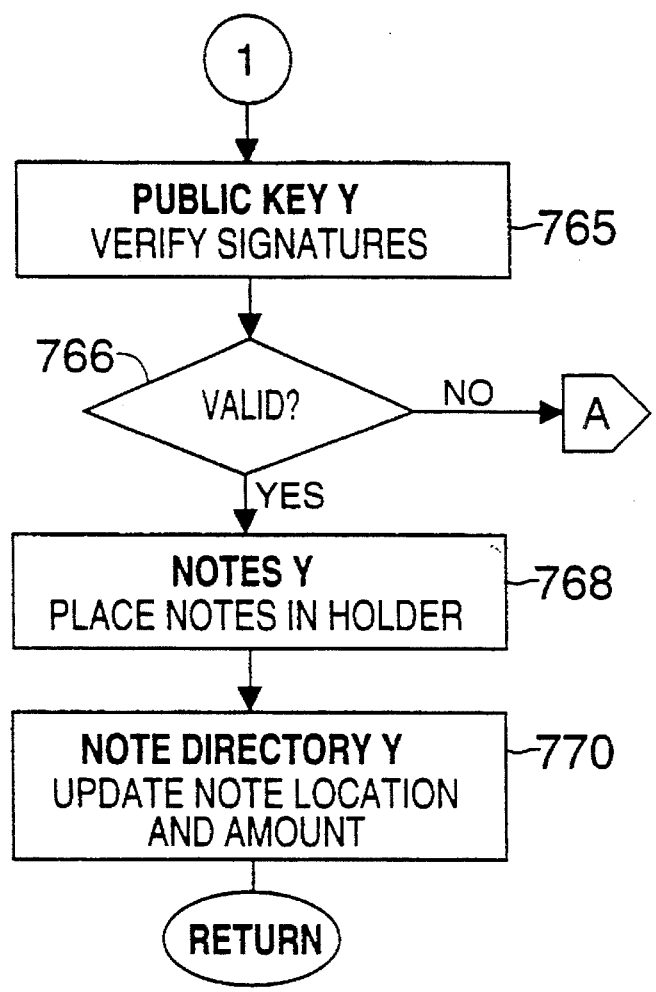

Assuming the notes 11 have not expired, or in the case where a Teller money module 5 is accepting them, the process flow resumes at Step 765, FIG. 39A. In this Step, the Public Key Y application 44 verifies the digital signatures. Invalid signatures invoke the transaction abort process of Steps 500–524.

Valid electronic notes 11 are then sent to the Notes application 40 (Step 768) and the Note Directory 39 is updated with the new note locations and amount (Step 770).

Returning to FIG. 28, the To Transaction B 49 checks if any electronic notes 11 have been transferred (Step 772), and if notes 11 have indeed been transferred from a Transaction money module 4, accounting transactions are posted to reflect this situation (Step 776; see also FIG. 14, Step 1) by the To Bank application B 47. Both in the case when no notes 11 have been transferred from the money module and after the latter accounting transactions are posted in Step 776, a session is established between the Teller money module 5 and the Money Generator module 6 using the procedure outlined above in Steps 190–258, FIGS. 34, 34A–C.

As notes 11 are requested to satisfy the withdrawal, an account posting occurs to reflect the request. The To Bank application B 47 will post the proper accounting transactions (Step 778, FIG. 28) as also illustrated in FIG. 14, Step 2.

Request Notes

Directing attention to FIG. 40, notes 11 may be requested between Teller money modules 5 and Money Generator modules 6 using the following procedure described below.

The To Money Generator application 48 of the requesting Teller money module 5 will issue a request for a specific amount of electronic money to be created (Step 780). The request will be sent using the above described Steps 2–8 for encrypted transmission, to the To Teller application 34 of the Money Generator module 6 so that the Money Creator application 50 may be activated (Step 784) to create the electronic notes 11 (Step 786).

After the creation of electronic notes 11, they are signed by the Public Key application 44 of the Money Generator module 6 (Step 788) and placed in a holder by its Notes application 40 (Step 790). Finally, the Note Directory 39 is updated with the information about the newly created electronic notes 11 (Step 792).

The process flow now returns to the procedures shown in FIG. 28. The requested notes in the Money Generator module 6 are transferred to the Teller money module B 5 using process Steps 750–770 outlined above for transferring electronic notes 11. The notes 11 are then transferred from the Teller money module B 5 to the Transaction money module 4 using these same process Steps 750–770 for transferring electronic notes 11.

Figure 41:
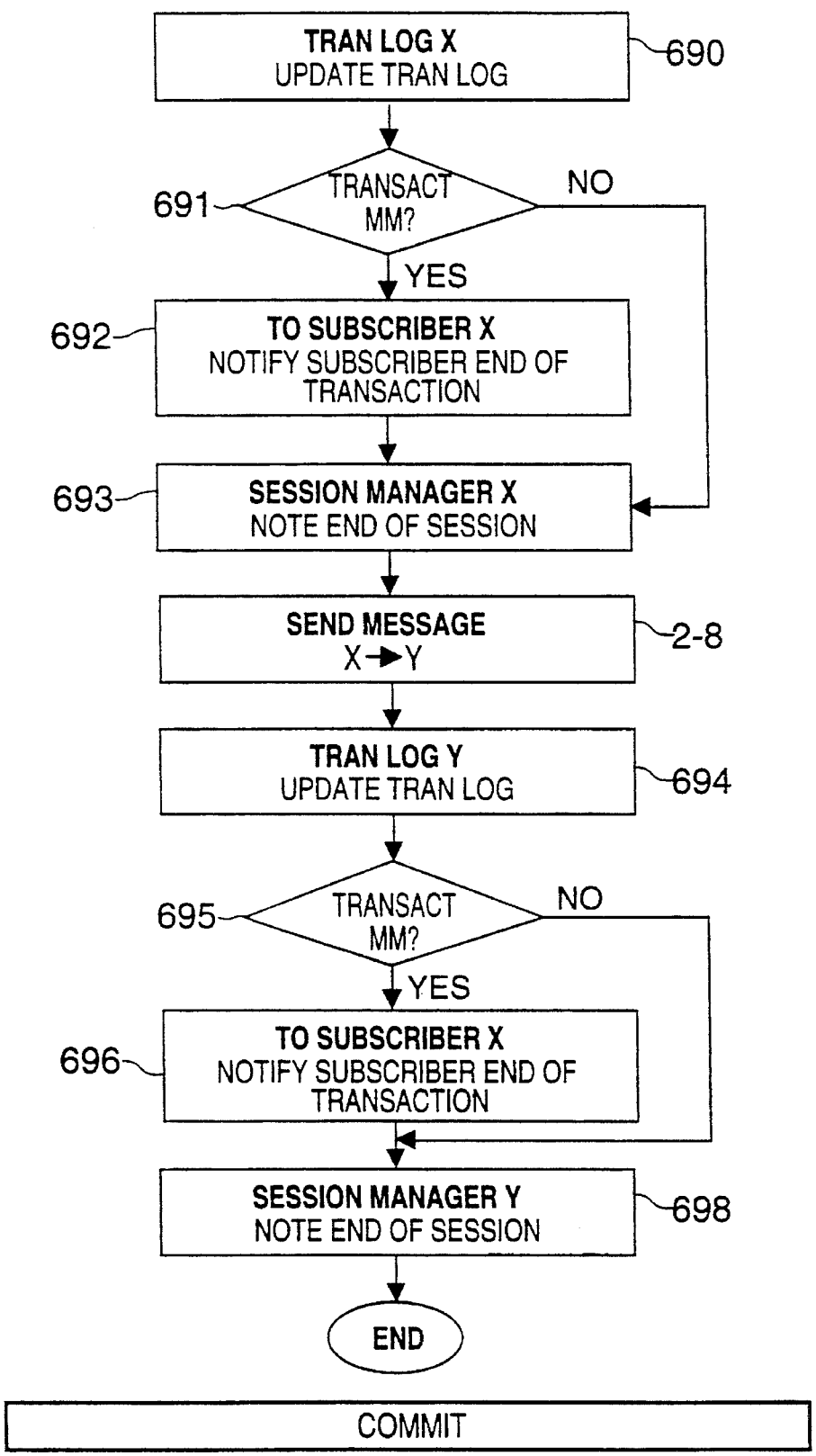

Finally, to successfully complete the withdrawal of electronic notes 11, the money modules will "commit" to or finalize the transaction by utilizing the following procedure. Referring now to FIG. 41 for a detailed description of this process, the Tran Log Mgr. application 36 updates its Tran Log to record the transaction that has occurred above (Step 690). When it is a Transaction money module 4 that is committing to the exchange (Step 691), the To Subscriber application will notify the subscriber that the transaction has been successfully completed (Step 692). Of course, the Session Manager application A 31 will note the end of session (Step 693), and employ process Steps 2–8 to send the message to the money module it is transacting with.

With this end of session notice received, the other money module, in this example a Teller money module 5, will use its Tran Log Mgr. application 36 to update its own Tran Log (Step 694). Assuming, however, the second money module receiving the end of session notice is not a Teller money module 5, an additional step of having the To Subscriber application 33 notify the subscriber of the end of the transaction occurrence (Step 696) will be necessary. Thereafter, the Session Manager 31 of the second money module in both cases will also make note of the end of the session (Step 698).

Directing attention back to FIG. 28, the process to commit is initiated first by the Transaction money module 4 committing its transaction with the Teller money module B 5 (steps 690–698). The process steps are also applied to commit the transaction between Teller money module B 5 and the Money Generator module 6 (Steps 690–698). That completes the processing for one complete withdrawal of electronic money from an Issuing Bank 1.

Withdrawal From A Correspondent Bank

Figure 35:
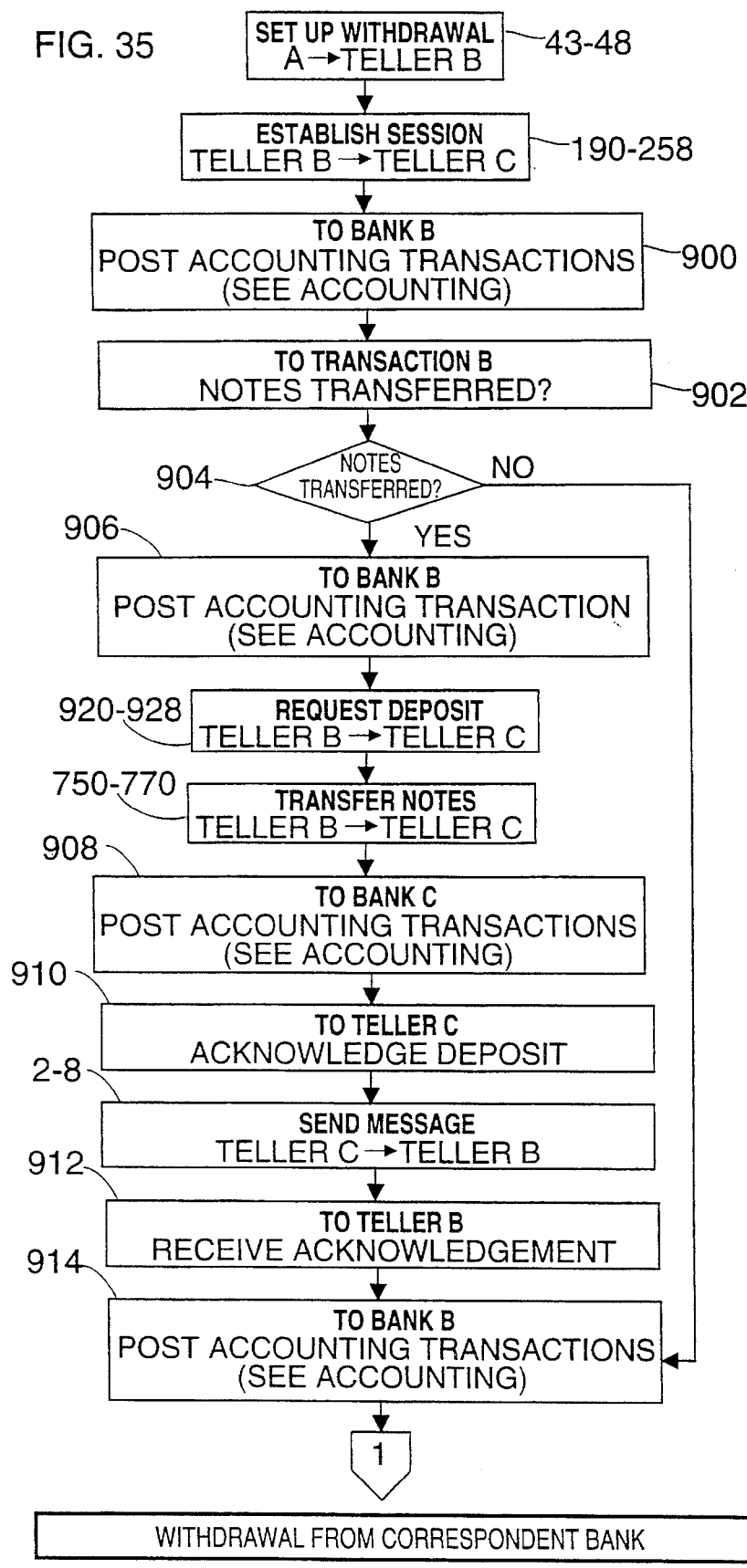
Figure 35A:
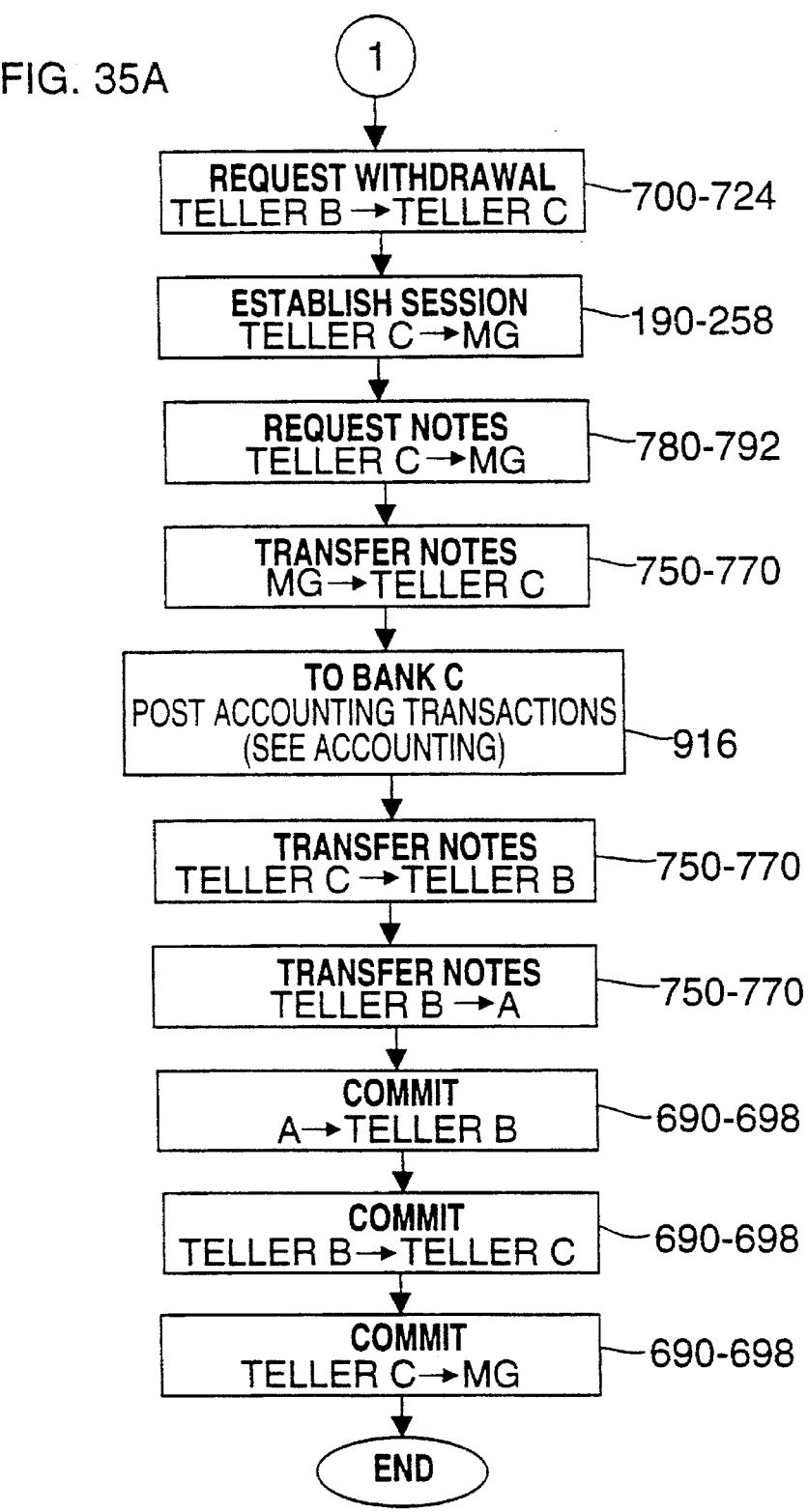

A withdrawal from a Correspondent Bank 2 will now be described, aided by reference to FIG. 35. To begin, the previously described Steps 43–48 to set up a withdrawal are undertaken by a Transaction money module A 4, in conjunction with a Teller money module B 5. Next, Steps 190–258, used to establish a session, also described above, are initiated between Teller money module B 5 and Teller money module C 5. After the sessions have been established, the To Bank application B 47 will post the accounting transaction corresponding to the withdrawal that is going to subsequently occur (Step 900; see also FIG. 13, Step 1).

As previously noted, it is contemplated that whenever a Transaction money module 4 interacts with a bank, both Issuing 1 and Correspondent 2, all electronic notes 11 that are stored within the Transaction money module 4 are removed and replaced with electronic notes 11 containing the most recent certificate. To perform this operation, To Transaction B 49 will check to see if there are notes 11 stored within the money module 4 (Steps 902–904). If there are notes 11, To Bank B 47 will post the appropriate accounting transactions (see accounting procedure illustrated in FIG. 13; Step 2) (Step 906), and perform a deposit request to the Teller money module C 5 (associated with an Issuing Bank 1) to return the notes that need to be replaced.

Figure 44:
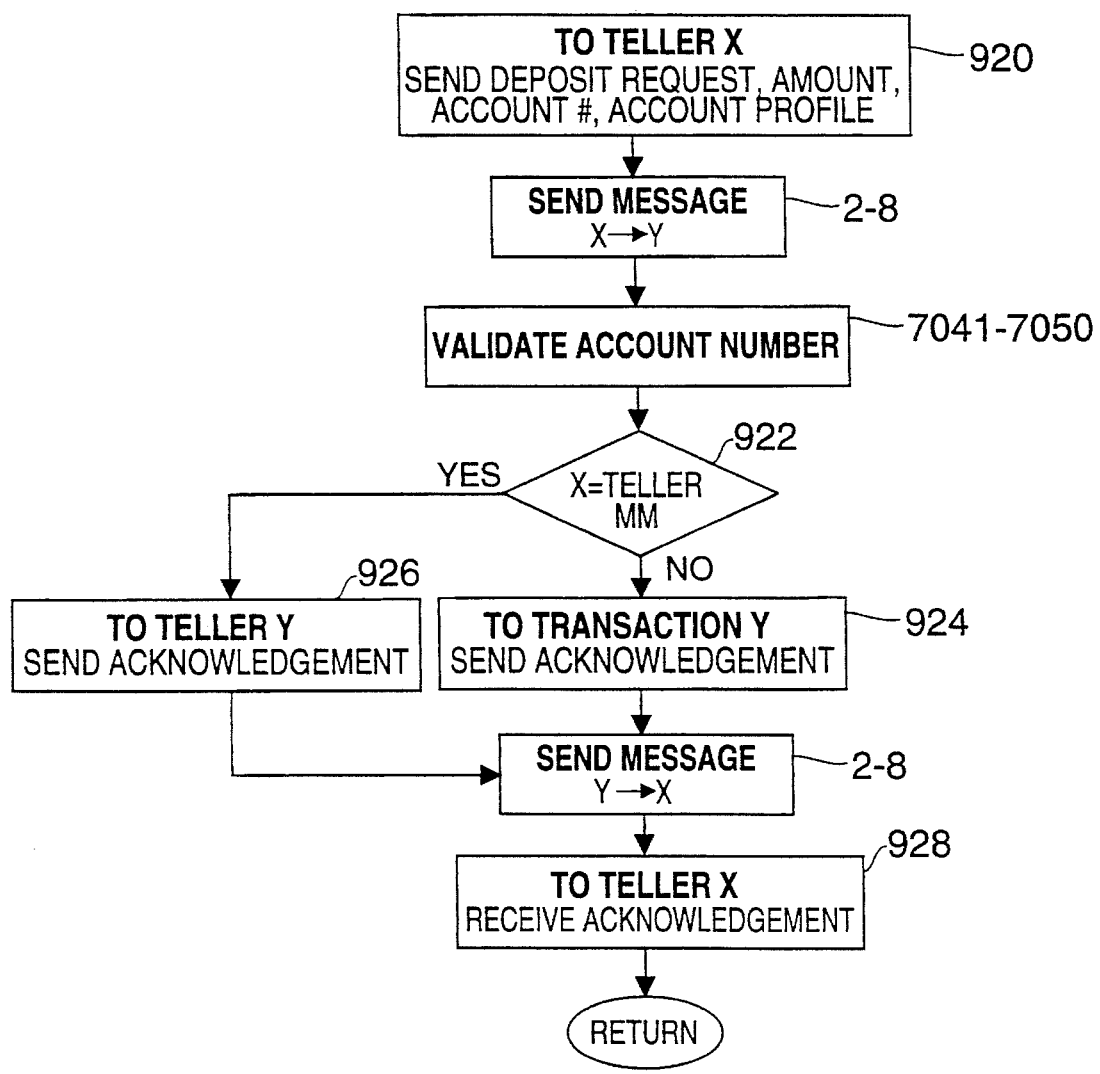

For a detailed description for performing a deposit request, attention will be directed to FIG. 44. Here, the To Teller application 34 sends a deposit request message, the amount of the deposit to be sent, the account number and the account profile of the account to which the notes 11 will be deposited (Step 920). This information is transferred to the Teller money module 5 using Steps 2–8 for sending messages, and then Steps 7041–7056 (see FIG. 38) are performed to validate the account profile and number.

In the case where the depositor is a Transaction money module 4, the To Transaction application 49 of the Teller money module 5 will send an acknowledgement to the Transaction money module 4 that the transfer of notes 11 is ready to proceed (Step 924). Alternatively, if it is another Teller money module 5 that is making the deposit, it is the To Teller application 34 that issues the acknowledgement to the Teller money module 5 (Step 926).

In either case, the acknowledgement is encrypted and transmitted using the procedure outlined in Steps 2–8, whereby it is received by a To Teller application 34 of the depositing money module (Step 928).

Referring back to FIG. 35, once the deposit request is completed, the notes 11 are transferred from the Teller money module B 5 to the Teller money module C 5 using Steps 750–770, FIGS. 39, 39A detailed above for transferring notes. Accordingly, To Bank C 47 posts the proper accounting transactions (see FIG. 13, Step 2) to reflect this transfer of notes 11 (Step 908). In Teller money module C 5, the To Teller application 34 acknowledges the deposit by sending a message back to the To Teller B 34 application (Steps 910–912), using Steps 2– 8. Naturally, the To Bank B 47 will now post accounting transactions to reflect the withdrawal request it will make to Teller money module C 5 (Step 914; see also FIG. 13, Step 3).

After all electronic notes 11 have been removed from the Transaction money module 4 and the proper accounts have been posted, a withdrawal is requested of a total amount that includes both the amount originally requested to be withdrawn from the subscriber's bank account and the amount that was removed from the Transaction money module 4 to be replaced with updated electronic notes 11.

The withdrawal request is performed between Teller money module B 5 and Teller money module C 5 using the process Steps 700–724, FIGS. 30, 30A, described above. Teller money module C 5 transacts with a Money Generator module 6 to withdraw new electronic money and in doing so it establishes a session between the two modules using the process Steps 190–258, FIGS. 34, 34A-C.

Figure 40:
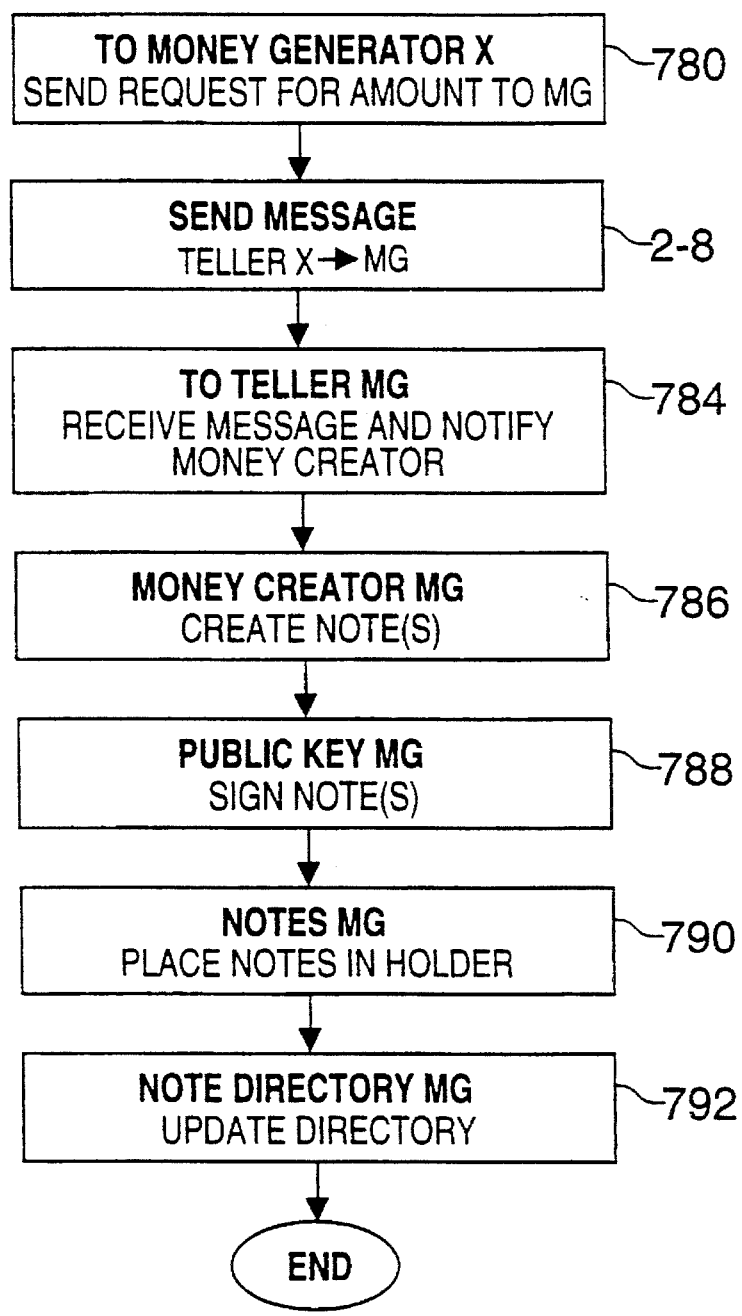

The electronic notes 11 are requested by the Teller money module C 5 from the Money Generator module 6 using process Steps 780–792, FIG. 40, and the notes 11 are transferred from the Money Generator module 6 to the Teller money module C 5 using the Steps 750–770, FIGS. 39, 39A.

Figure 13:
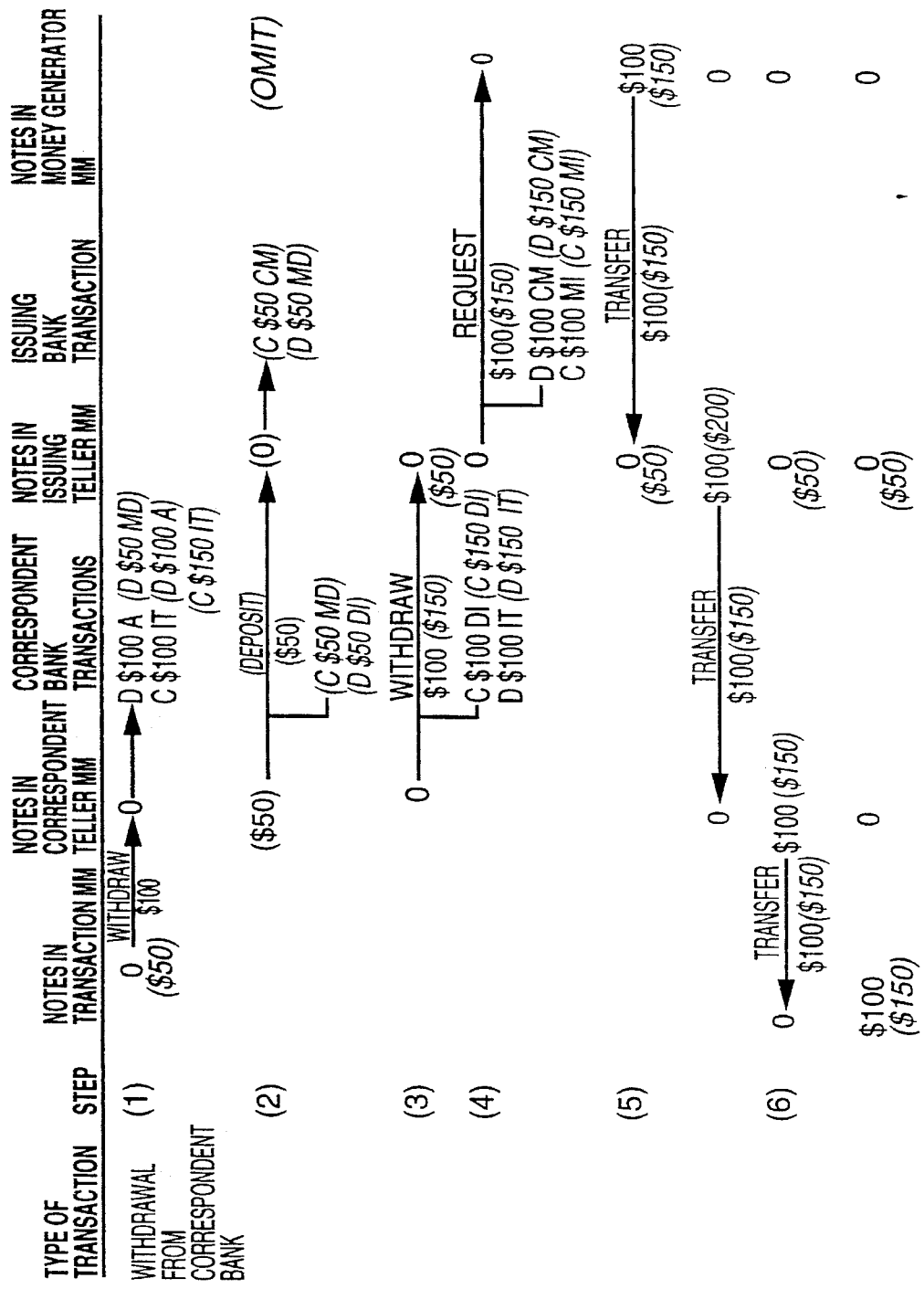

The To Bank application C 47 performs the accounting postings (Step 916; see also FIG. 13, Step 4). After this, the electronic notes 11 are transferred from Teller money module C 5 to Teller money module B 5 using the Steps 750–770; the notes 11 are than transferred to Transaction money module A 4 also using Steps 750–770.

To finalize the withdrawal from the Correspondent Bank 2, each money module must commit to the transaction it has just had with the corresponding money module. Thus, Transaction money module A 4 commits to Teller money module B 5 using Steps 690– 698, FIG. 41, and thereafter Teller money module B 5 commits to Teller money module C 5. Finally, Teller money module C 5 commits to the Money Generator module 6, using the same process Steps 690–698.

Deposit To An Issuing Bank

Figure 42:
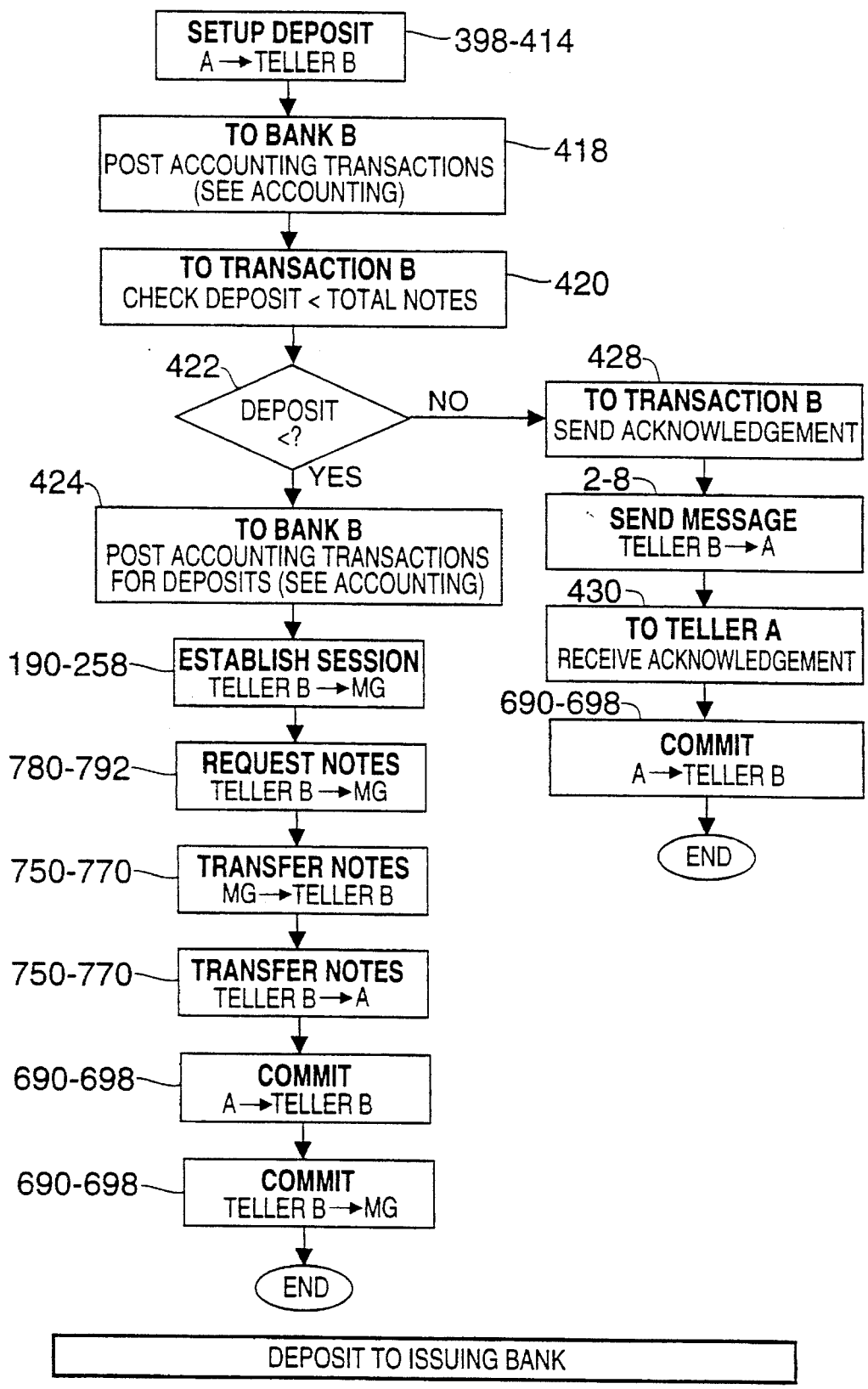

Referring to FIG. 42 in combination with FIG. 43, an example of a deposit to an Issuing Bank 1 will now be described in detail. To start the transaction, a deposit set up must be done which uses the process steps shown in FIG. 43.

Figure 31A:
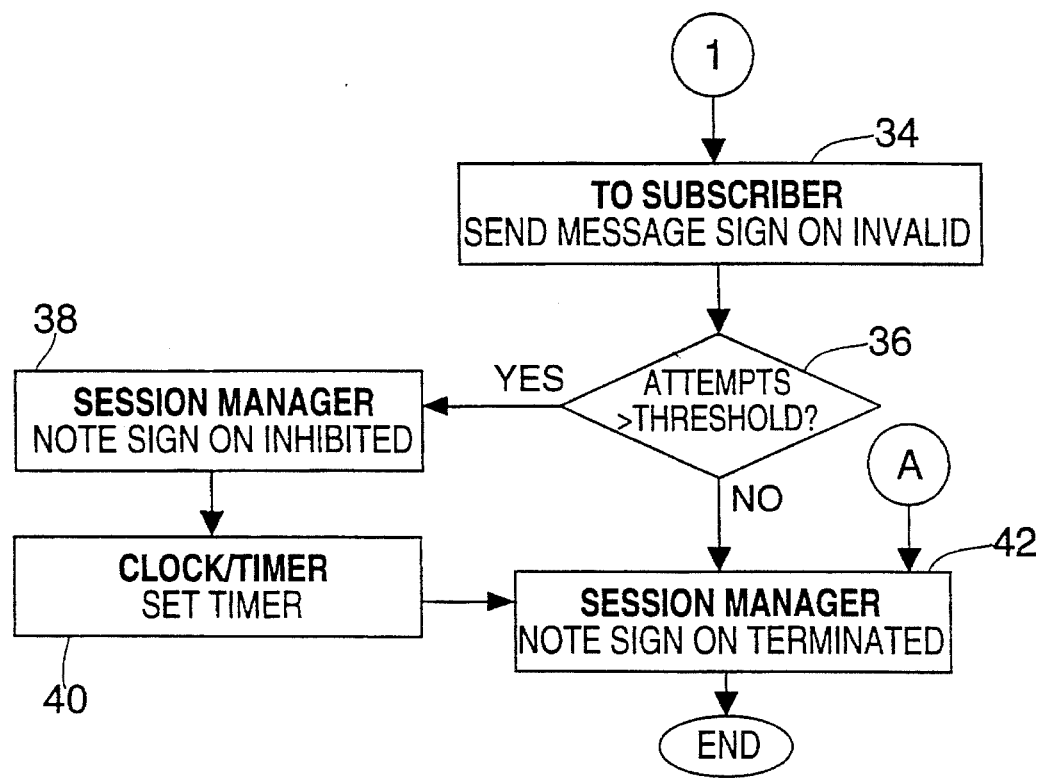
Figure 43:
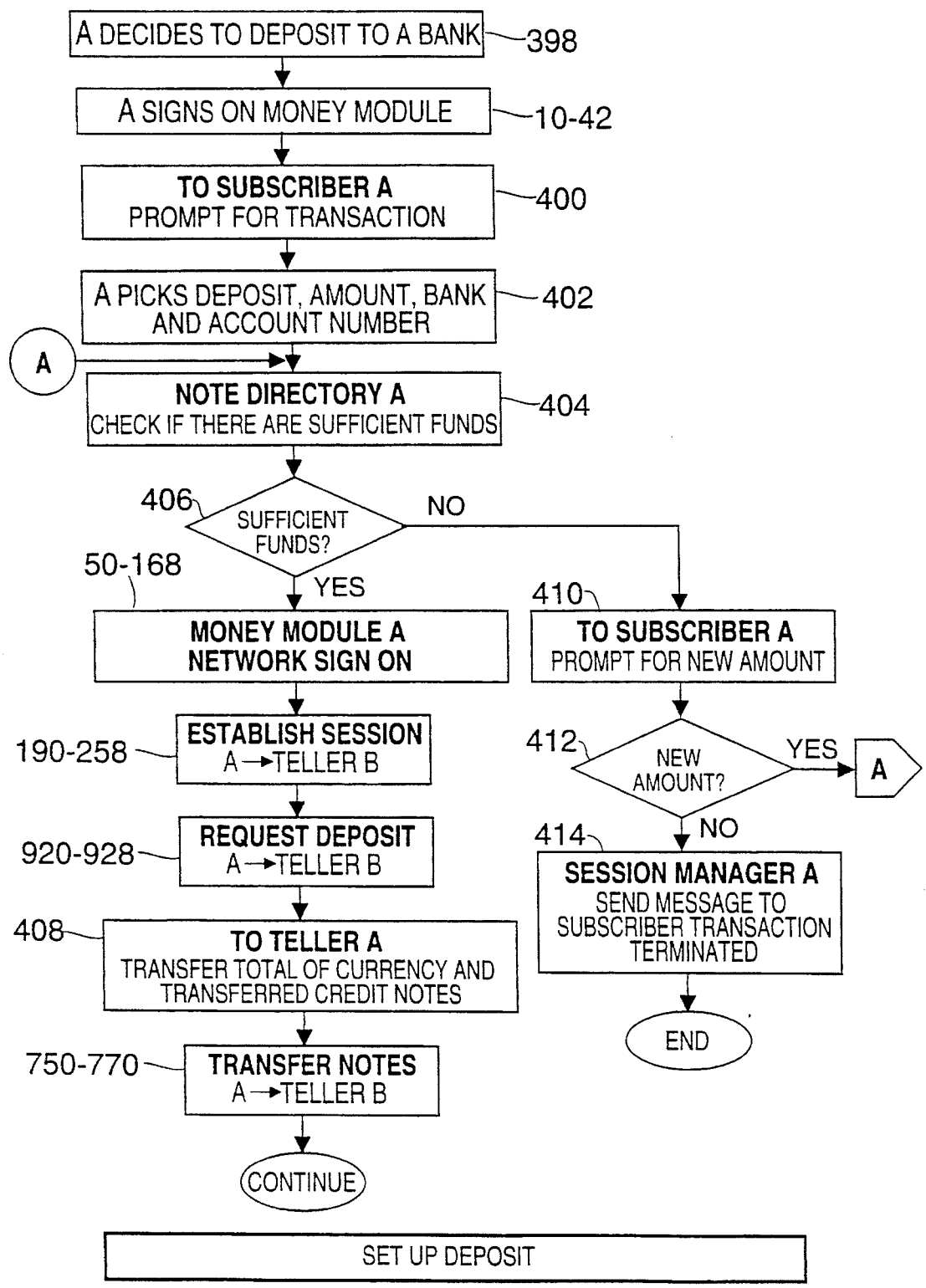

In Step 398 at the top of FIG. 43, the subscriber decides to deposit some money to a bank. After performing the sign on routine for a Transaction money module 4 (following Steps 10–42, FIGS. 31–31A), the To Subscriber A 33 prompts the subscriber for the transaction desired (Step 400).

In this example, the subscriber chooses the deposit transaction, the amount to be deposited, and the bank and account number in which to deposit the electronic money (Step 402). Before any other procedures, Note Directory A 39 checks to see if the money module contains funds sufficient to support the deposit request (Step 404).

Assuming there are insufficient funds for the deposit, To Subscriber A 33 prompts the subscriber for a new amount (Step 410) and if no new amount is selected, the Session Manager A 31 informs the subscriber that the transaction must be terminated (Step 414). If the subscriber enters a new amount, Step 412, the process flow returns to Step 404, wherein the Note Directory 39 application again checks for sufficient funds for the transaction.

Assuming there are adequate funds within the money module, the process flow advances to the Network 25 sign on procedures outline in Steps 50–168, FIGS. 33–33A. A successful Network 25 sign on then advances the process flow to Steps 190– 258, for establishing a session between the Transaction money module A 4 and Teller money module B 5.

Once the session is established between the two money modules, the deposit request steps outlined in procedures 920–928 are followed conveying the request from Transaction money module A 4 to the Teller money module B 5. The To Teller A 34 transfers all of the electronic notes 11 stored within the money module to the Teller money module B 5 (Step 408) using the Steps 750–770 described above for transferring electronic notes 11 between two money modules.

Continuing with FIG. 42, the To Bank B 47 posts the accounting transactions for the notes deposited (Step 418, see FIG. 12 Step 1). In Teller money module B 5, the To Transaction application 49 checks to see if the amount deposited is less than the total notes 11 that were stored in module A and then transferred to the Teller money module 5 (Step 420). If the deposit is less than the total amount of transferred notes 11, updated notes 11 must be generated and sent back to the Transaction money module 4.

When all the notes that are contained in the Transaction money module 4 are deposited, i.e., the amount to be deposited is not less than the total amount of electronic notes 11, the To Transaction B 49 will send an acknowledgement to the Transaction money module 4 (step 428) using the Steps 2–8 for sending messages between money modules. The To Teller A 34 receives the acknowledgement (Step 430) and initiates the Steps 690–698 to commit the deposit transaction between the two money modules.

When the electronic notes 11 removed exceed the desired deposit amount, new updated notes 11 must be returned to the Transaction money module 4. To perform this, the To Bank application B 47 of the Teller money module B 5 posts the proper accounting transactions (Step 424; FIG. 12, Step 2). Thereafter, Teller money module B 5 establishes a session with the Money Generator module 6 using process Steps 190–258, and requests electronic notes 11 from the Money Generator module 6 in the amount that should be returned to the Transaction money module 4, by performing Steps 780–792.

The electronic notes 11 are created by the Money Generator module 6 and transferred to the Teller money module B 5 using Steps 750–770. With the electronic notes 11 in the possession of the Teller money module B 5, they are transferred to the Transaction money module A 4 using Steps 750–770.

After Transaction money module A 4 receives the electronic notes 11, it must finalize the transaction by committing Teller money module B 5 to Transaction money module A 4 using Steps 690–698. Likewise, Teller money module B 5 must commit to the Money Generator module 6 using the same Steps 690– 698.

Deposit To A Correspondent Bank

Figure 45:
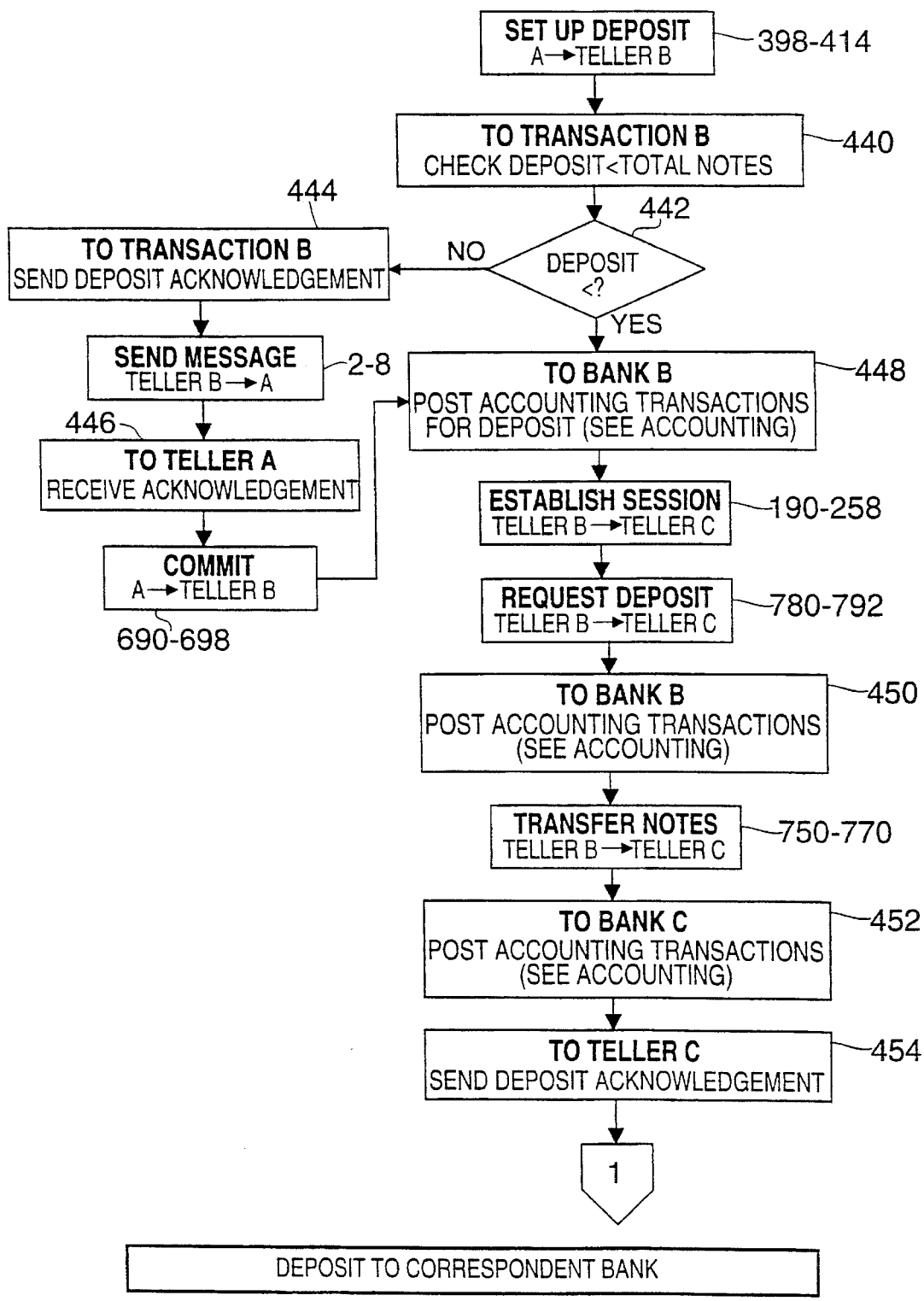

FIG. 45 illustrates the process flow for a deposit at a Correspondent Bank. In depositing to a Correspondent Bank 2, the deposit set up described in Steps 398 through 414 are repeated in the first stage of the transaction. From there the To Transaction B 49 tests to see if the deposit is less than the total amount of electronic notes 11 that have been withdrawn in the deposit set up procedures that were just processed (Step 440).

In the case where all the electronic notes 11 stored in the Transaction money module 4 are equal to the amount of notes 11 to be deposited, then To Transaction B 49 sends a deposit acknowledgement back to the Transaction money module 4 (Step 444), using steps 2–8 to send the message from the Teller money module B 5 to Transaction money module A 4.

On the Transaction money module 4 side, the To Teller 34 application receives the acknowledgement (Step 446) and uses Steps 690–698 to commit the transaction with Teller money module B 5. The Transaction money module 4 is now finished and removed from the process. The finalization of the deposit provides for the account posting transactions to be made by the To Bank application 47 (Step 448). See FIG. 11, Step 1 for the accounting transactions.

A session is now established between Teller money module B 5 and Teller money module C 5 using Steps 190–258.

Teller money module B 5 issues a request to make a deposit, to the Teller money module C 5 by using process Steps 780–792. The To Bank B 47 then posts the accounting transactions (Step 450; see also FIG. 11, Step 2).

Figure 45A:
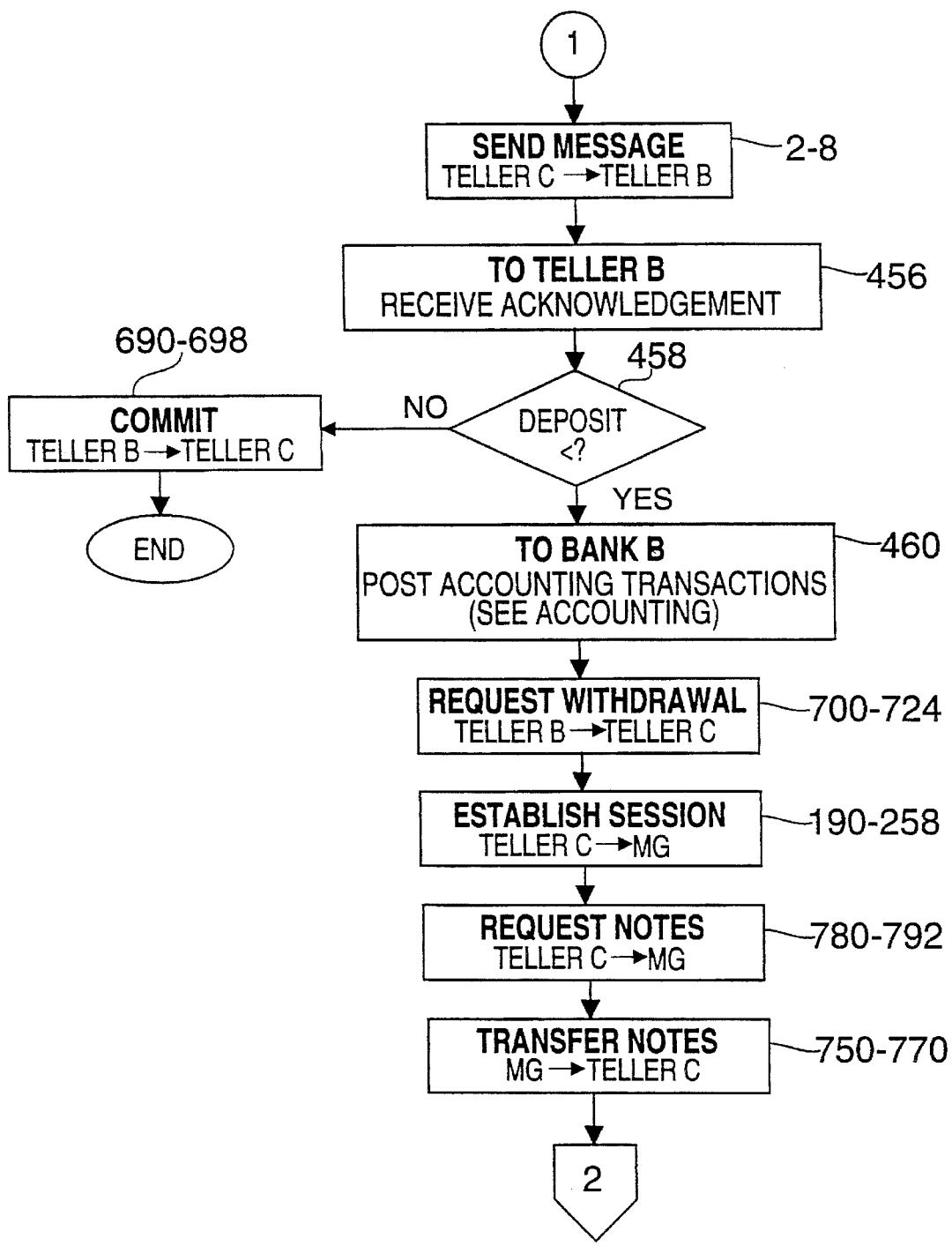

Notes 11 are now transferred from the Correspondent Bank B 2 to the Issuing Bank C 1 using Steps 750–770; the Issuing Bank C 1 posts the corresponding accounting transactions (Step 452; see also FIG. 11, Step 2). The To Teller C 34 responds by sending the deposit acknowledgement (Step 454) using Steps 2–8, to To Teller application 34 of Teller money module B 5 (FIG. 45A, Step 456).

Here again, the deposit is checked to see if it is less than the amount of electronic notes 11 that have been removed earlier, and when it is not, the withdrawal is completed with the process Steps 690–698, FIG. 41, to commit Teller money module B 5 to Teller money module C 5.

A deposit request that is less than the amount of notes 11 that are withdrawn requires account updating (Step 460; see also FIG. 11, Step 3), and new notes 11 to replace the additional notes 11 that were taken. Accordingly, a withdrawal request following the process Steps of 700–724 from Teller money module B 5 to Teller money module C 5 is made to provide these new electronic notes 11.

Teller money module C 5 must first establish a session with the Money Generator module 6, using the process Steps 190– 258. The new electronic notes 11 are requested by the Teller money module C 5 from the Money Generator module 6 following process Steps 780–792, which are then transferred to the Teller money module C 5 using Steps 750–770 to transfer notes 11 between money modules.

Figure 45B:
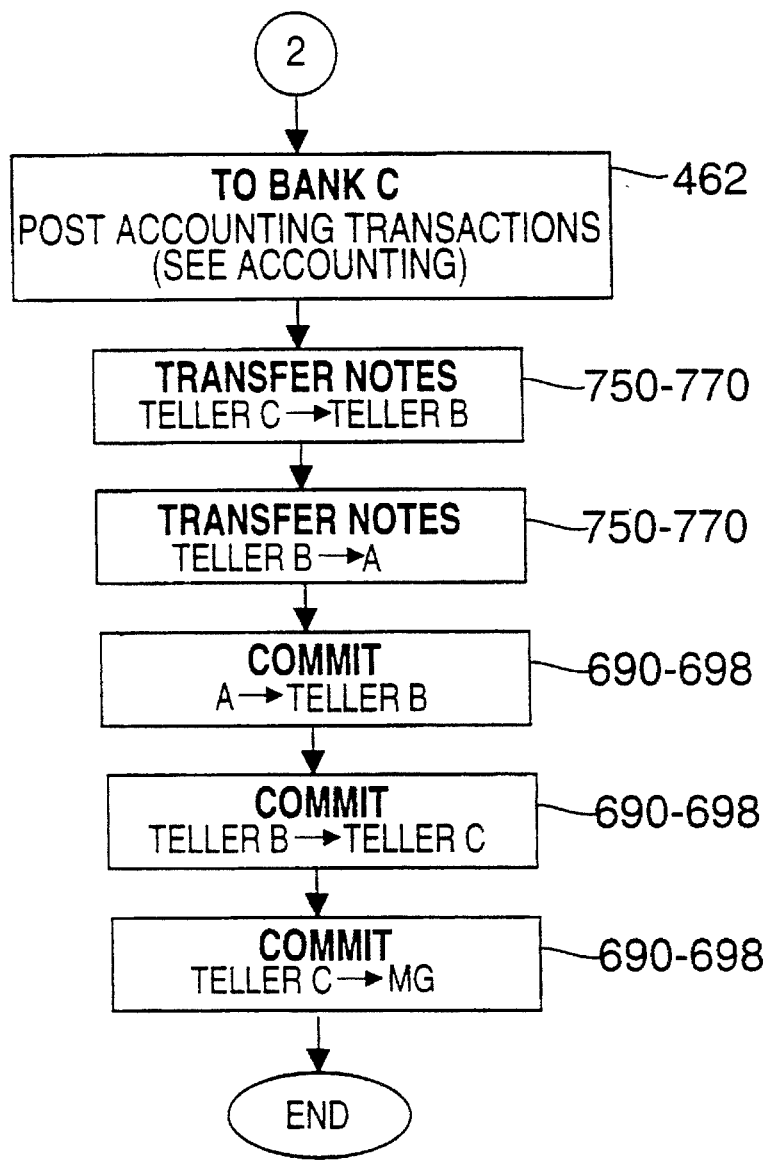

This transfer of electronic notes 11 to the Teller money module C 5 requires that accounting transactions be posted by the To Bank application C 47 (Step 462, FIG. 45B; see also FIG. 11, Step 3).

From there, the notes 11 are transferred from the Issuing Bank's 1 Teller money module C 5 to the Correspondent Bank's 2 Teller money module B 5 and to the Transaction money module 4 by using Steps 750–770 for transferring notes 11. Thereafter, each money module must commit to the money module with which it has established a session. Thus, Transaction money module A 4 commits to Teller money module B 5, Teller money module B 5 subsequently commits to Teller money module C 5, which then commits to the Money Generator module 6. All three of these commitment transactions use process Steps 690–698, described above.

Subscriber To Subscriber Payment

Figure 36:
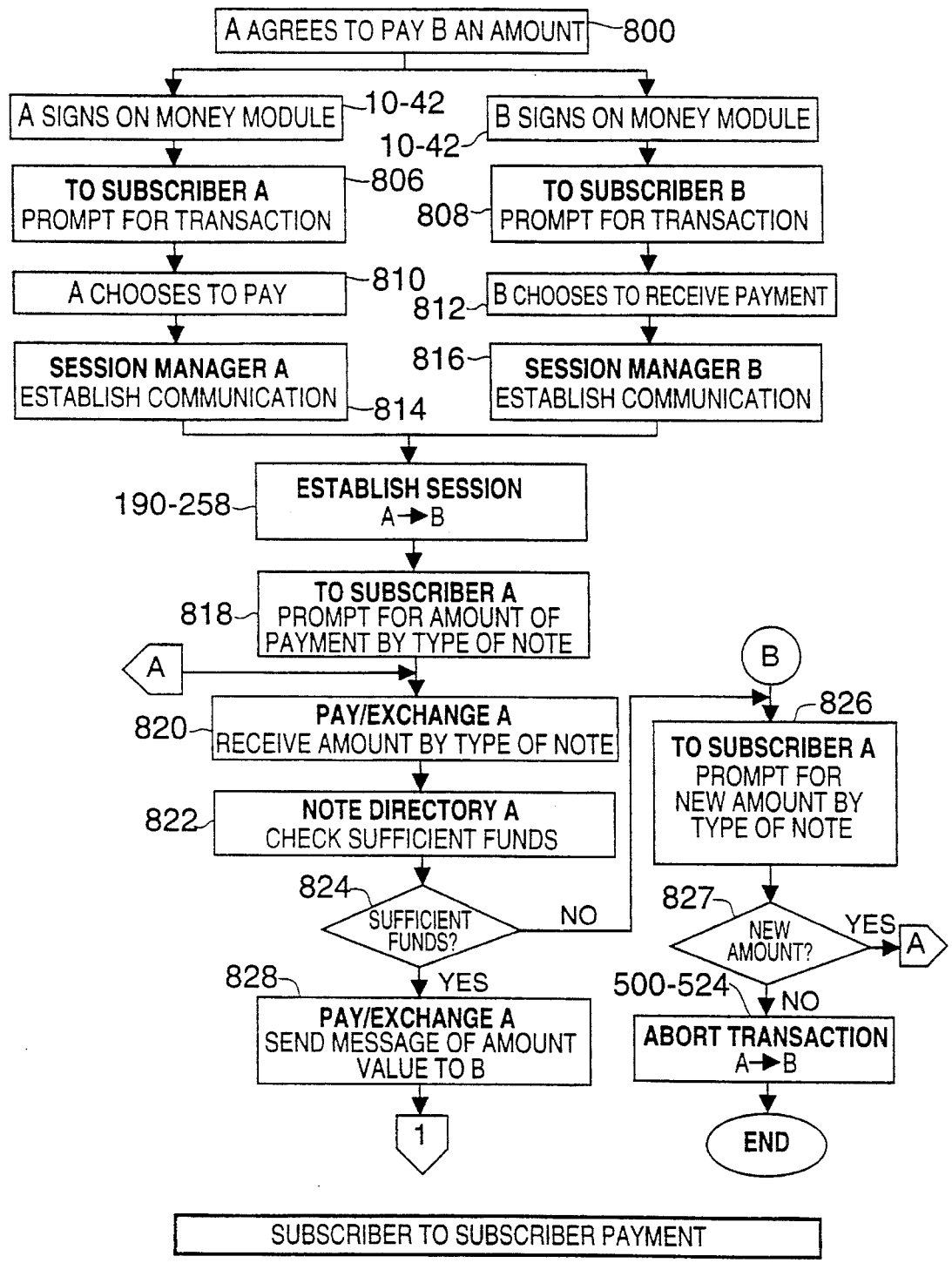

FIG. 36 illustrates the process flow for a payment transaction from one Transaction money module 4 to another and in this example of a preferred embodiment, Alice (or a hypothetical payor corporation, is denoted "A" in FIG. 36) will agree to pay Bob (or a hypothetical payee corporation, is denoted "B" in FIG. 36) a specific amount of electronic money (Step 800). Both Alice and Bob sign on to their respective Transaction money modules 4 using the process Steps 10–42 described above. Through the To Subscriber A 33 application, Alice directs her Transaction money module 4 to make a payment (Steps 806 & 810), while Bob operates his Transaction money module 4 such that the To Subscriber B 33 application will issue an entitlement to receive payment (Steps 808 & 812).

In Steps 814 & 816, the Session Managers 31 of both Alice's Transaction money module 4 and Bob's Transaction money module 4 establish communications. From there, a session is established, as described in Steps 190–258 above for transacting between any two money modules.

With a session established, To Subscriber A 33 prompts the subscriber to enter the amount of payment that she desires to transfer (Step 818), which is displayed to the subscriber.

Alice enters the amount that she wishes to transfer to Bob. Pay/Exchange application A 35 receives the amount entered (FIG. 36, Step 820). The amount entered by type (currency or credit) is now compared by Note Directory A 39 to the balance of the value of the electronic money stored in the Transaction money module 4, to see if there are sufficient funds available to permit the transaction to proceed (Step 822).

If there are insufficient funds, To Subscriber A 33 sends the subscriber a notice that there are not sufficient funds to cover the transaction desired (Steps 824–826), and prompts the subscriber again for a new amount of payment (Step 827). If the subscriber prefers not to enter a new amount, the abort transaction process Steps 500–524 are activated to terminate the communications link between the two Transaction money modules 4. On the other hand, a newly entered amount will return the process to Step 820, to check for sufficient funds again.

Figure 36A:
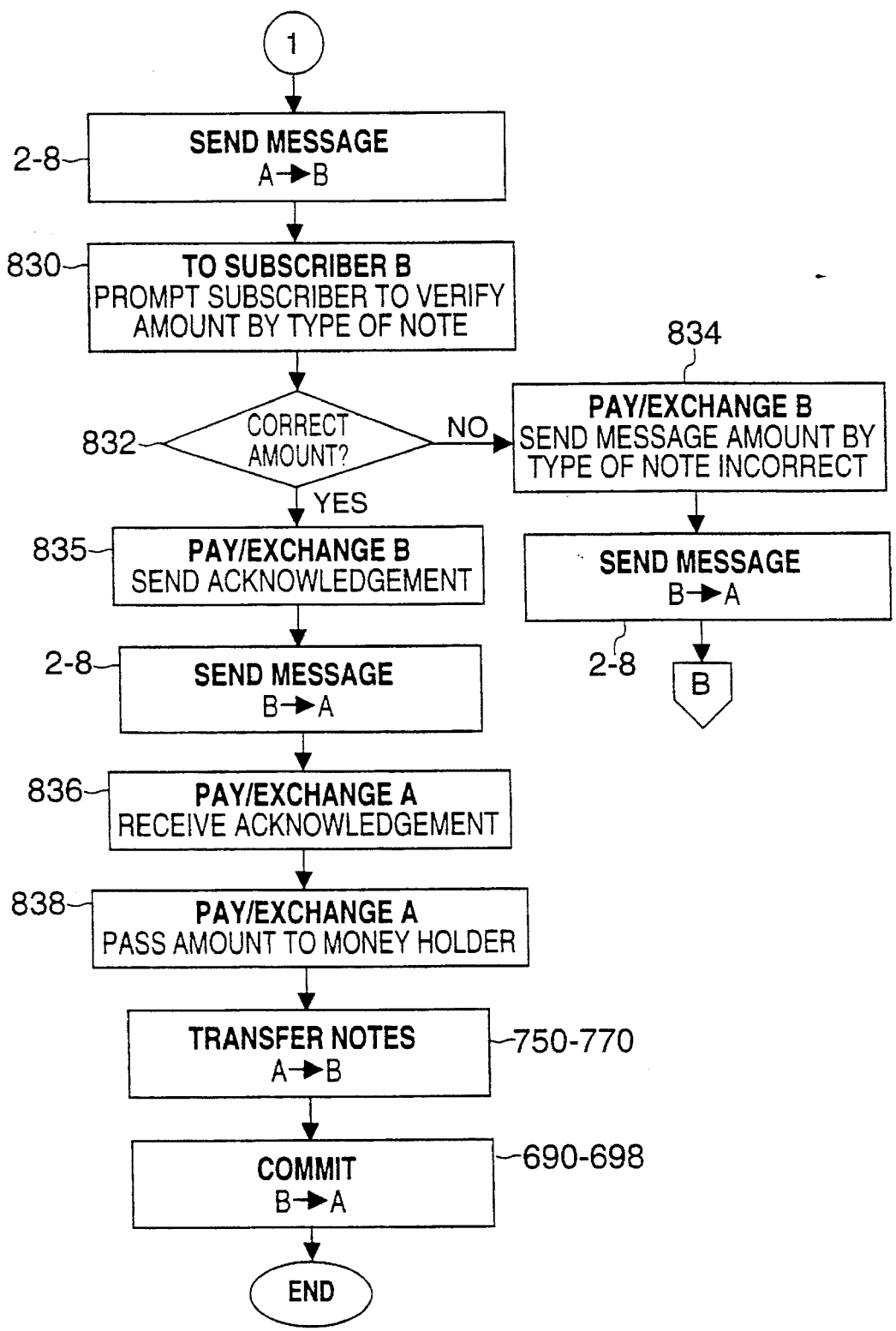

When there are sufficient funds stored in Transaction money module A 4 to process the transfer, Pay/Exchange A 35 sends a message disclosing the amount of the transfer to Bob's Transaction money module 4 (Step 828), using the process disclosed in Steps 2–8. See FIG. 36A. From there, To Subscriber B 33 prompts the owner to verify that the amount to be transferred will be accepted by him (Step 830). Bob can then decide whether to accept or reject the amount to be transferred (Step 832).

If Bob responds in the negative, then Pay/Exchange B 35 will send a message back to Transaction money module A 4 using Steps 2–8, that the amount to be transferred is incorrect (Step 834); the process again returns to Step 826, FIG. 36, to prompt Alice for a new amount to be entered.

When Bob responds in the affirmative in Step 832, Pay/Exchange B 35 will send an acknowledgement to Transaction money module A 4 using Steps 2–8 (Step 835). Back in Transaction money module A 4, the message will be conveyed to Pay/Exchange A 35 to receive the acknowledgment sent by Transaction money module B 4 (Step 836).

With this acknowledgement received, Pay/Exchange A 38 will send the amount desired to be transferred to the Money Holder 38 (Step 838) so that the electronic notes 11 may be transferred using Steps 750–770. With the transfer completed, the two Transaction money modules 4 must commit to the transfer using Steps 690-698 described above. The communication link between the two transaction modules may now be terminated.

Subscriber to Subscriber Foreign Exchange

Figure 46:
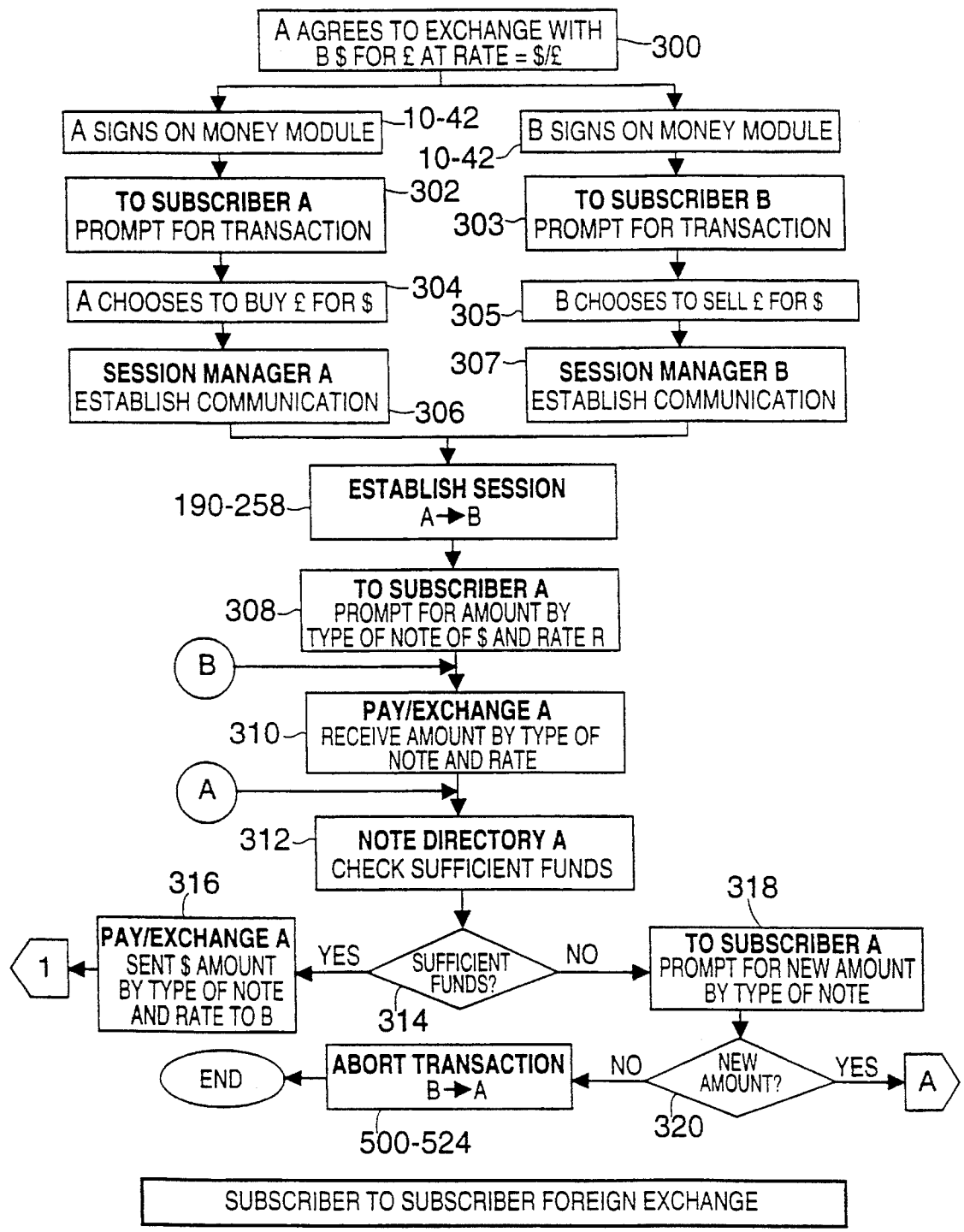
Figure 47A:
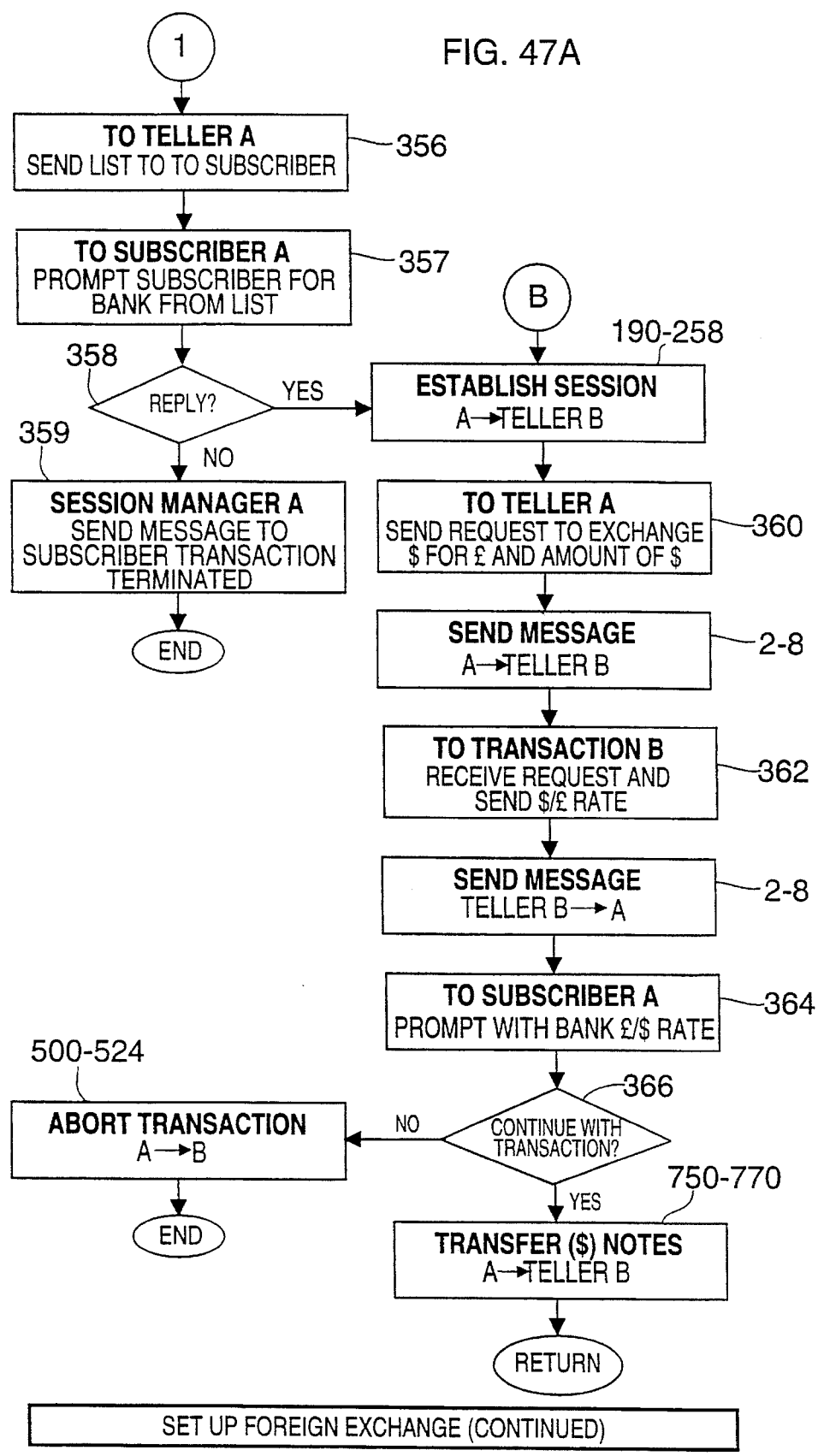

Referring to FIG. 46, the process flow for an exchange of foreign currencies between two Transaction money modules 4 will now be illustrated. In this example Alice (or a hypothetical corporation, denoted "A" in FIGS. 46–46A) agrees to exchange dollars for pounds with Bob (or a hypothetical corporation, denoted "B" in FIGS. 46–46A). The exchange rate that they have agreed to will be a ratio of dollars to pounds (Step 300).

Alice begins by signing on to her Transaction money module 4 (using Steps 10–42 described above) while Bob signs on to his Transaction money module 4 (using Steps 10–42). Thereafter, the To Subscriber 33 applications of both Transaction money modules 4 prompt the respective users to select a type of transaction (Steps 302–303). In this example, Alice and Bob agree to exchange her dollars for his pounds.

By requesting the foreign exchange transaction, Session Manager A 31 will establish a communications link with Session Manager B 31 (Steps 306, 307) so that a session may be established between the two money modules using Steps 190–258. Alice is then prompted by To Subscriber A 33 for the amount of dollars she will sell, and the exchange rate that she will use in the transaction (Step 308).

Pay/Exchange A 35 receives the input (Step 310) and Note Directory A 39 checks for sufficient funds by comparing the amount requested to the amount of value contained in the Transaction money module 4 (Step 312). An insufficient funds condition will cause the To Subscriber A 33 to send an insufficient funds message to Alice and prompt the subscriber to select another amount of dollars and exchange rate (Steps 318– 320). When new selections are entered, the process flow returns to Step 312 and continues from there. If Alice does not select a new amount, the session is dissolved using abort transaction Steps 500–524.

When the funds are sufficient to meet the amount requested, the Pay/Exchange A 35 sends the amount of the dollars and the proposed dollar/pound exchange rate (Step 316) to the To Subscriber application 33 of Transaction money module B 4 using the Steps 2–8 (see FIG. 46A). At this point, To Subscriber B 33 prompts Bob with the amount and rate proposed by Alice, to determine if the values are what Bob will agree to exchange (Step 322).

The Pay/Exchange B 35 receives the dollar amount and the rate that is proposed by Alice and if the amount and rate are not agreed to by Bob, Pay/Exchange B 35 will send a message indicating that the value or exchange rate is incorrect (Step 326), through the Steps of 2–8 for sending messages. To Subscriber A 33 prompts Alice for the dollar amount and exchange rate over again (Step 327). Entry of new values returns the process to Step 310 for continuation, see FIG. 46, while the lack of new values entered causes the abort transaction process of Steps 500–524 to be initiated.

If the amount and rate are agreed to by Bob, Pay/Exchange B 35 will calculate the equivalent amount in pounds, based on the rate provided (not shown), and then initiate the step of having Note Directory B 39 check to see that Transaction money module B 4 contains sufficient funds to fulfill the exchange (Step 323). When the funds in Transaction money module B 4 are insufficient to meet the exchange, Pay/Exchange B 35 sends a message to Alice of insufficient funds (Step 325) using Steps 2–8. The process flow returns to Step 327.

Proceeding with the case in which sufficient funds do exist in Transaction money module B 4, Pay/Exchange B 35 will send an acknowledgement using Steps 2–8 to Transaction money module A 4 (Step 329). After receiving this acknowledgement, Pay/Exchange A 35 sends the amount of dollars requested to its corresponding Money Holder 38 application in Step 330. The dollars are transferred from Alice to Bob via the Steps 750–770 described above for transferring notes 11.

Pay/Exchange B 35 receives the notes 11 and then transfers the amount of pounds to its Money Holder 38 application (Step 331). From there, the electronic pounds are transferred to Alice using the transfer notes process described in Steps 750– 770. To record this exchange, Transaction money module A 4 commits with Transaction money module B 4 by using process Steps 690–698 described above. With a satisfactory exchange, the communications link between the two transaction money modules may now be terminated.

Foreign Exchange At An Issuing Bank

Figure 48:
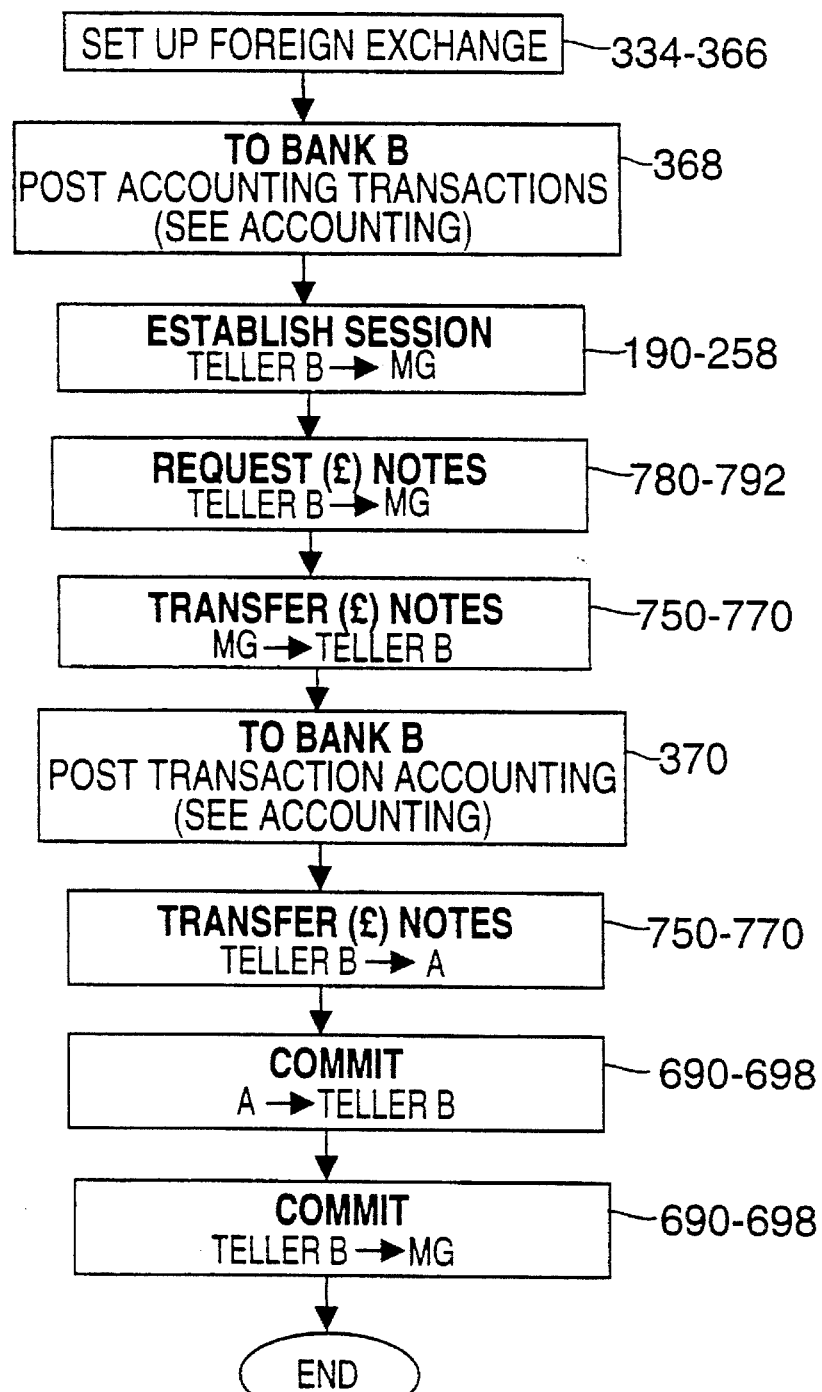

Turning attention now to FIG. 48, if a subscriber were to exchange his/her dollars for pounds with an Issuing Bank 1 instead of with a subscriber, the following process is followed.

Subscriber A sets up the foreign exchange transaction by signing on to his/her Transaction money module 4 (referring now to FIG. 47) using Steps 10–42 described above. To Subscriber A 33 prompts the subscriber for the transaction desired (Step 334), and in this example, the subscriber chooses the dollar/pound exchange, and the amount of dollars the subscriber will exchange. It is anticipated that the choice of the bank to transact with may be an option offered to the subscriber (Step 336).

The Note Directory A 39 checks for a sufficient balance to complete the request (Step 338). An insufficient balance permits the subscriber to again enter the amount he/she will exchange (Steps 340–342), whereby Session Manager A 31 will terminate the transaction (Step 345) if no new amount is entered. Entry of a new amount returns the process to Step 338 to check for sufficient funds to meet the new request. When the funds are sufficient for the exchange request, a Network 25 sign-on using Steps 50–168 is commenced.

After the Network 25 sign-on, the Network 25 checks if a bank or financial institution has been selected (Step 346). If a bank or financial institution was not chosen earlier, To Teller A 34 must prompt the Network Server 26, through Session Manager A 31, for a list of banks or financial institutions that will provide the exchange (Steps 348–350). The Network Server 26 sends the list (along with rates) to the subscriber through the To Teller A 34 and the To Subscriber A 33 applications (Steps 352–356).

After the prompting (Steps 357, FIG. 47A), the subscriber chooses a bank or financial institution, or ends the transaction (Step 359). When a bank or financial institution is chosen, a session is established with the Teller money module 5 chosen using steps 190–258 described above. After a session is established, To Teller A 34 sends the amount of dollars to be exchanged for pounds (Step 360) using Steps 2–8 for encrypting and transmitting a message.

To ensure that the subscriber still wants to proceed with the exchange, To Transaction B 49 sends the current exchange rate to the subscriber using process Steps 2–8 (Step 362). At this point, To Subscriber A 33 prompts the subscriber with the bank's exchange rate and if the subscriber does not wish to proceed, the transaction is aborted by following Steps 500–524 (Steps 364–366). If the transaction is to proceed, the dollars are transferred from Transaction money module A 4 to Teller money module B 5 using Steps 750–770 described herein.

Returning to FIG. 48, once the set up of the foreign exchange transaction is accomplished, the proper accounting transactions are posted (Step 368; also illustrated in FIG. 15, Step 1) to reflect the dollars that have just been transferred. A session is established between Teller money module B 5 and a Money Generator module 6 via Steps 190–258. Teller money module B 5 requests the proper pound notes 11 through process Steps 780– 792. The notes 11 are returned from the Money Generator module 6 to the Teller money module B 5 using Steps 750–770.

This latter transfer of notes 11 requires a corresponding updating of the accounts involved (Step 370; see also FIG. 15, Step 2). The notes 11 are transferred to the Transaction money module A 4 through process Steps 750–770. To complete the exchange, Transaction money module A 4 commits to Teller money module B 5 who subsequently commits to the Money Generator module 6 using process Steps 690–698.

Foreign Exchange At A Correspondent Bank

Figure 49:
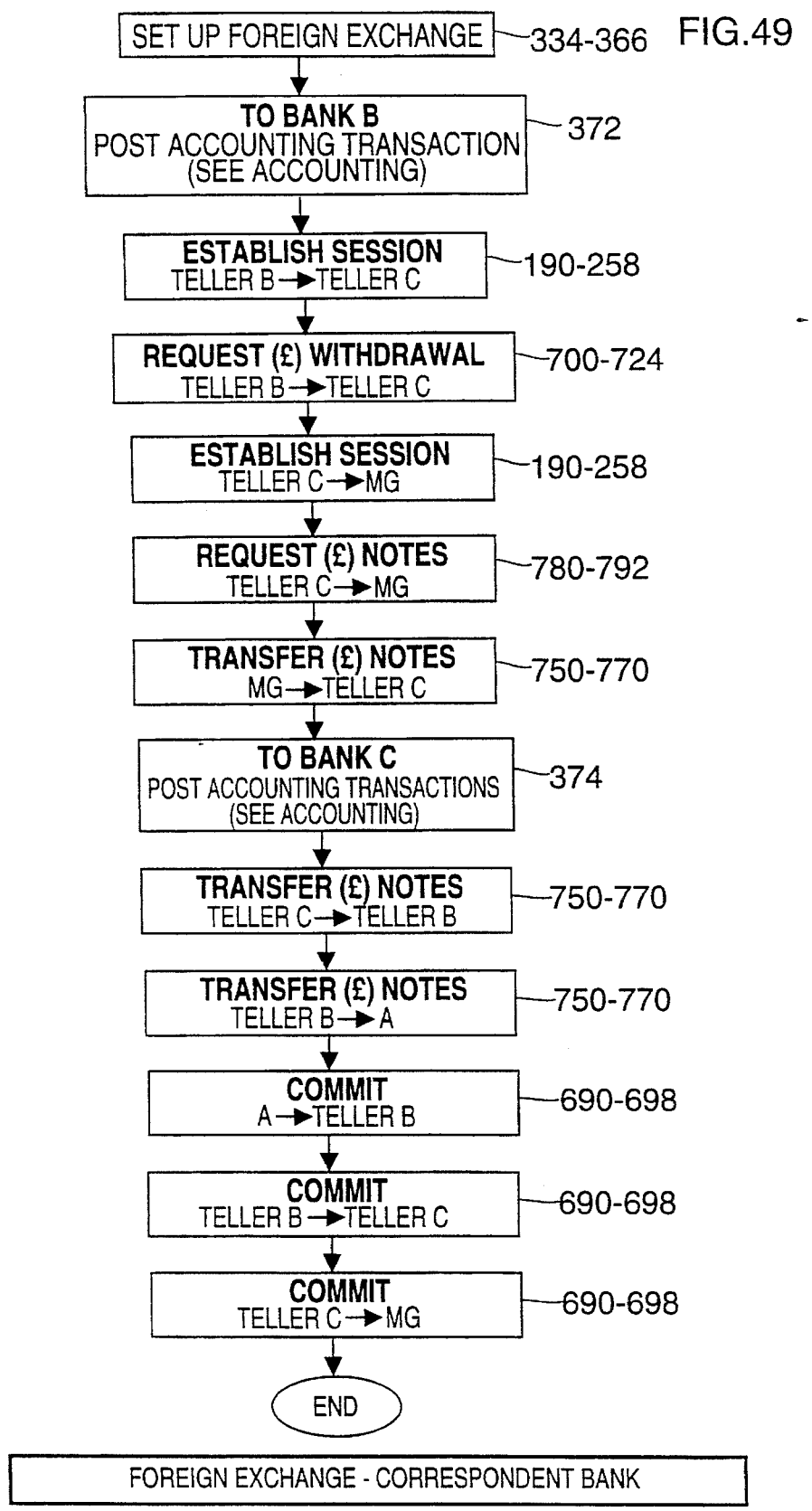

The foreign exchange with a Correspondent Bank 2 is described with the aid of FIG. 49. Initially, the foreign exchange transaction is set up by repeating process Steps 334– 366, (FIGS. 47–47A) and updating the proper accounts (see FIG. 16, Steps 1–2) to reflect the notes 11 that have just been transferred from the subscriber's money module 4 to Teller money module B 5 (Step 372). Thereafter, Teller money module B 5 will establish a session with Teller money module C 5 at an Issuing Bank 1, by performing process Steps 190–258.

A withdrawal is requested by Teller money module B 5 to Teller money module C 5 using process Steps 700–724 described above. To obtain the notes 11 for the request, Teller money module C 5 must get them from a Money Generator module 6. Accordingly, a session is established between the two money modules via Steps 190–258, and the notes 11 are requested following process Steps 780–792 outlined above.

The Money Generator module 6 will create the notes 11 requested and transfer them to Teller money module C 5 using process Steps 750–770. This is followed by a posting to the proper accounts in the bank C's systems (Step 374, see FIG. 16, Step 3 for accounting transactions). The notes 11 are now transferred from Teller money module C to Transaction money module A 4 via Teller money module B 5 using for each transfer the process Steps 750–770. Finally, all the sessions must be committed, and Transaction money module A 4 commits to Teller money module B 5 who in turn commits to Teller money module C 5 using Steps 690–698. Teller money module C 5 commits to the Money Generator module 6 to complete the exchange of dollars for pounds.

Updating Notes, Certificate

As mentioned above, it is anticipated that the date of expiration of a note, used as a security measure, may expire while it is stored in a Transaction money module 4. If this occurs, the holder of expired notes 11 will not be able to transfer them to another Transaction money module 4, but the holder may deposit them or exchange them for new notes 11 by transacting with a participating bank or financial institution.

Additionally, if the certificate associated with a particular Transaction money module 4 expires, the subscriber must sign on the Network 25 to update the certificate in order to transact with another money module 4. The following is a description of the process flow for updating an expired certificate or expired notes 11.

Figure 50:
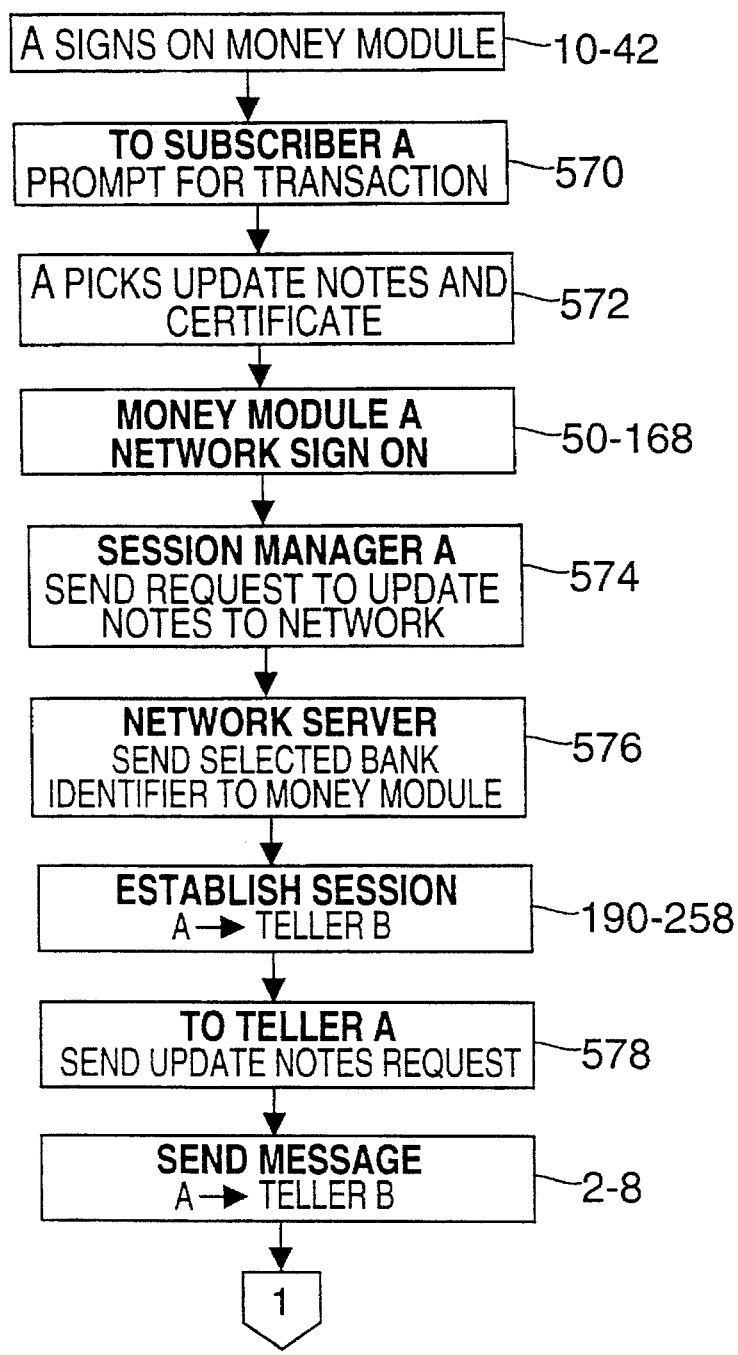
Figure 50A:
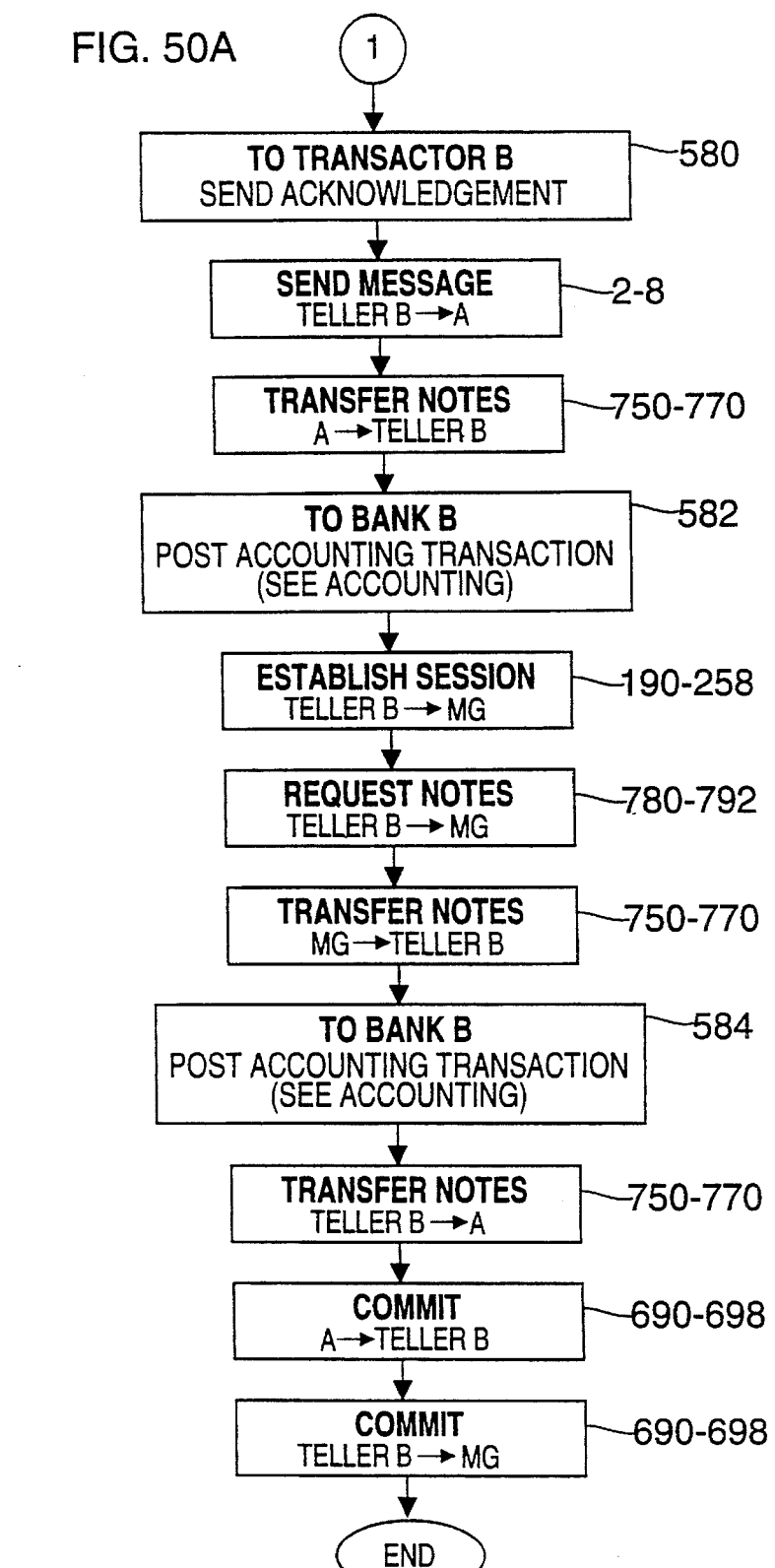

Beginning at the top of FIG. 50, a subscriber signs on to the Transaction money module 4 using the Steps 10–42 described above, and is prompted by To Subscriber A 33 to select a transaction (Step 570). After selecting the transaction for "updating" (Step 572), a sign-on to the Network 25 is performed using Steps 50–168. The sign-on to the Network 25 will perform the updating of the certificate, as described above with reference to FIG. 33–33A.

For updating the notes 11, the Session Manager A 31 sends the update notes request to the Network 25 (Step 574); The Network Server 26 responds by sending the selected bank identifier back to the Transaction money module 4 (Step 576). Now, a session may be established between the Transaction money module A 4 and a Teller money module B 5 of the bank selected, using Steps 190–258.

Once the session is established, To Teller A 34 sends the request to update notes 11 (Step 578) using the message sending routine in Steps 2–8. To Transactor B 32 responds, FIG. 50A, with an acknowledgement (Step 580) sent using Steps 2–8. Transaction money module A 4 can now transfer the expired notes 11 to Teller money module B 5 using Steps 750–770. Thereafter, the corresponding accounting (see FIG. 24, Step 1) is performed in the bank's records (Step 582), and a session is established between Teller money module B 5 and the Money Generator module 6 through Steps 190–258.

The request notes routine of Steps 780–792 is then performed. The Money Generator module 6 sends the requested notes 11 via Steps 750–770, and updates the accounts at the bank (Step 584; see also FIG. 24, Step 2). Teller money module B 5 takes the updated notes 11 and passes them to Transaction money module A 4 using the same Steps 750–770.

Now that the notes 11 have been updated in the Transaction money module 4, the sessions are completed by having Transaction money module A 4 commit to Teller money module B 5, and having Teller money module B 5 then commit the transaction with the Money Generator module. Finally, both committing routines are performed using Steps 690–698 described above.

The above described process flows illustrate the capability of the invention to provide an improved system for exchanging electronic representations of economic value, while avoiding the inherent limitations of paper based monetary systems.

Operation of the invention has been described primarily with currency notes and credit notes that can be used by subscribers in the same processes. It will be understood that the described system can also be adapted to other monetary instruments. For example, personal and corporate checks and bank drafts could be provided by enhancing several of the Transactor applications. More complicated multiparty payment processes such as letters of credit and banker's acceptances could also be provided with appropriate changes to the system. It may also be possible to adapt the system of the invention to provide corporate financial obligations such as commercial paper.

Moreover, although the invention has been described in detail with particular reference to a preferred embodiment thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

I claim:

1. An electronic monetary system comprising:

an issuing bank having a first on-line accounting system;

electronic representations of money that are credited in said first on-line accounting system as current liabilities of said issuing bank;

a money generator module that generates said electronic representations of money;

a first teller module, associated with said issuing bank, that stores said electronic representations of money;

a plurality of correspondent banks, each having a second on-line accounting system and each maintaining an account at said issuing bank;

a plurality of second teller modules, each associated with one of said correspondent banks, that each store said electronic representations of money;

a transaction module that stores said electronic representations of money, performs on-line transactions with said plurality of correspondent banks, and exchanges said electronic representations of money with other transaction modules in off-line transactions;

where said first teller module has a first processor that intermediates transactions among said first on-line accounting system, said money generator module, and said second teller module; and where said second teller module has a second processor that intermediates transactions among said second on-line accounting system, said first teller module, and said transaction module.

2. A time-based transaction module transfer system, comprising:

a plurality of tamper-proof electronic transaction modules each having a memory that stores electronic notes that include an expiration date, a clock that maintains a system time, a processor adapted to provide a cryptographically secure channel for transferring and receiving said electronic notes, where said processor is further adapted not to permit a transfer of said electronic notes between said transaction modules if said transfer would occur after said expiration date of said electronic notes.

3. The system of claim 2, wherein said electronic notes are electronic representations of currency that are credited as current liabilities in an on-line accounting system of an issuing bank.

4. The system of claim 3, wherein said electronic representations of currency stored in said transaction module are updated when transacting with an electronic monetary system including said issuing bank.

5. The system of claim 2, wherein said electronic notes are electronic credit authorizations that are drawn on a subscriber's loan account in an on-line accounting system so as to reduce said subscriber's available credit line.

6. A transaction module transfer system, comprising:
a plurality of tamper-proof electronic transaction modules each having a memory that stores electronic notes that include a transfer record having a transferred monetary value, a processor adapted to provide a cryptographically secure channel for transferring and receiving said electronic notes, where said processor is further adapted to generate said transfer record and append said transfer record to said electronic notes upon transfer.

7. The system of claim 6, wherein said electronic notes are electronic representations of currency that are credited as current liabilities in an on-line accounting system of an issuing bank.

8. The system of claim 6, wherein said electronic notes are electronic credit authorizations that are drawn on a subscriber's loan account in an on-line accounting system so as to reduce said subscriber's available credit line.

9. A transaction module based monetary transaction system, comprising:
a security server that implements the security of said monetary transaction system;
a plurality of tamper-proof electronic transaction modules each having a unique module identifier contained within a time-limited certificate that is digitally signed by said security server, a clock that maintains a system time, a memory that stores electronic representations of money, a processor adapted to provide a cryptographically secure channel for transferring and receiving said electronic representations of money; and
wherein said processor is further adapted not to allow a transaction module having an expired certificate to transact with other transaction modules until a new certificate is obtained.

* * * * *

UNITED STATES PATENT AND TRADEMARK OFFICE
CERTIFICATE OF CORRECTION

PATENT NO. : 5,455,407
DATED : October 3, 1995
INVENTOR(S) : Sholom S. Rosen

It is certified that error appears in the above-indentified patent and that said Letters Patent is hereby corrected as shown below:

Column 6, line 7, after "25" insert --is--.

Column 10, line 55, after "radio," insert --infrared,--.

Column 12, line 1, after "4" insert --,--.

Column 13, line 10, after "value of" insert --each of--.

Column 15, line 12, after "be" insert --a--.

Column 15, line 32, "is" should read --are--.

Column 16, line 44, "an" should read --a--.

Column 17, line 49, after "satellites" insert --,--.

Column 17, line 49, after "connective" insert --,--.

Column 22, line 65, after "above" insert --.--.

UNITED STATES PATENT AND TRADEMARK OFFICE
CERTIFICATE OF CORRECTION

PATENT NO. : 5,455,407

DATED : October 3, 1995

INVENTOR(S) : Sholom S. Rosen

It is certified that error appears in the above-indentified patent and that said Letters Patent is hereby corrected as shown below:

Column 29, line 28, "by" should read --be--.

Column 29, line 39, "X" should read --1--.

Column 50, line 1, "38" should read --35--.

Signed and Sealed this

Twenty-third Day of January, 1996

BRUCE LEHMAN

Attest:

Attesting Officer

Commissioner of Patents and Trademarks